(12) United States Patent
Steven et al.

(10) Patent No.: US 9,159,042 B2
(45) Date of Patent: Oct. 13, 2015

(54) FACILITATING REVENUE GENERATION FROM DATA SHIFTING BY DATA CENTERS

(71) Applicant: Viridity Energy, Inc., Philadelphia, PA (US)

(72) Inventors: Alain P. Steven, Lansdale, PA (US); Audrey A. Zibelman, Phoenixville, PA (US)

(73) Assignee: VIRIDITY ENERGY, INC., Philadelphia, PA (US)

( * ) Notice: Subject to any disclaimer, the term of this patent is extended or adjusted under 35 U.S.C. 154(b) by 0 days.

(21) Appl. No.: 13/774,994

(22) Filed: Feb. 22, 2013

(65) Prior Publication Data

US 2014/0039965 A1    Feb. 6, 2014

Related U.S. Application Data

(63) Continuation-in-part of application No. 12/850,918, filed on Aug. 5, 2010, now Pat. No. 8,457,802, which is a continuation-in-part of application No. 13/451,497, filed on Apr. 19, 2012, now Pat. No.
(Continued)

(51) Int. Cl.
*G06F 19/00* (2011.01)
*G06Q 10/06* (2012.01)
(Continued)

(52) U.S. Cl.
CPC .......... *G06Q 10/06315* (2013.01); *G06Q 10/00* (2013.01); *G06Q 10/06* (2013.01);
(Continued)

(58) Field of Classification Search
CPC ....... G06Q 50/06; Y04S 20/221; Y04S 50/10; Y04S 10/58; G05B 2219/2639

USPC .................................................. 700/300, 320
See application file for complete search history.

(56) References Cited

U.S. PATENT DOCUMENTS

| | | | |
|---|---|---|---|
| 5,544,036 A | 8/1996 | Brown et al. | |
| 5,566,084 A | 10/1996 | Cmar | |

(Continued)

FOREIGN PATENT DOCUMENTS

| | | |
|---|---|---|
| EP | 0791280 A1 | 8/1997 |
| WO | WO-2011/100736 A2 | 8/2011 |

(Continued)

OTHER PUBLICATIONS

"Data Center Energy Cost Minimization: a Spatio-Temporal Scheduling Approach", Luo et al, Stanford University, IEEE 2013.*
(Continued)

*Primary Examiner* — Michael D Masinick
(74) *Attorney, Agent, or Firm* — McCarter & English, LLP

(57) ABSTRACT

The disclosure facilitates management data center utilization for generating energy-related revenue from energy markets. Operating schedules are generated, over a time period T, for operation of an energy management system of energy assets of data center sites. Since CPU utilization (or computing load) can be correlated to energy consumption, the operating schedules can cause the energy management system to modulate the CPU utilization (or computing load) of energy assets within a data center, or to indicate shifting of CPU utilization (or computing load) from one data center site in a certain energy market price region to another data center site in a different energy market price region. When implemented, the generated operating schedules facilitates derivation of the energy-related revenue, over a time period T, associated with operation of the energy assets according to the generated operating schedule.

17 Claims, 23 Drawing Sheets

Related U.S. Application Data 8,892,264, application No. 13/774,994, which is a continuation-in-part of application No. 13/666,898, filed on Nov. 1, 2012.

(60) Provisional application No. 61/601,846, filed on Feb. 22, 2012, provisional application No. 61/279,589, filed on Oct. 23, 2009, provisional application No. 61/477,067, filed on Apr. 19, 2011, provisional application No. 61/552,982, filed on Oct. 28, 2011, provisional application No. 61/554,390, filed on Nov. 1, 2011.

(51) Int. Cl.
*G06Q 30/02* (2012.01)
*G06Q 50/06* (2012.01)
*G06Q 10/00* (2012.01)

(52) U.S. Cl.
CPC ............ *G06Q30/0202* (2013.01); *G06Q 50/06* (2013.01); *G05B 2219/2639* (2013.01); *Y04S 10/58* (2013.01); *Y04S 50/10* (2013.01)

(56) References Cited

U.S. PATENT DOCUMENTS

| | | |
|---|---|---|
| 5,794,172 A | 8/1998 | Matheson et al. |
| 6,076,964 A | 6/2000 | Wu et al. |
| 6,178,362 B1 | 1/2001 | Woolard et al. |
| 6,211,782 B1 | 4/2001 | Sandelman et al. |
| 6,681,155 B1 | 1/2004 | Fujita et al. |
| 6,757,591 B2 | 6/2004 | Kramer |
| 6,885,915 B2 | 4/2005 | Rehtanz et al. |
| 6,996,728 B2* | 2/2006 | Singh ..................... 713/300 |
| 7,088,014 B2 | 8/2006 | Nierlich et al. |
| 7,130,719 B2 | 10/2006 | Ehlers et al. |
| 7,135,956 B2 | 11/2006 | Bartone et al. |
| 7,162,878 B2 | 1/2007 | Narayanamurthy et al. |
| 7,206,670 B2 | 4/2007 | Pimputkar et al. |
| 7,209,838 B1 | 4/2007 | Wright et al. |
| 7,222,494 B2 | 5/2007 | Peterson et al. |
| 7,274,975 B2 | 9/2007 | Miller |
| 7,315,769 B2 | 1/2008 | Balan et al. |
| 7,379,997 B2 | 5/2008 | Ehlers et al. |
| 7,393,603 B1 | 7/2008 | Schumer et al. |
| 7,474,995 B2 | 1/2009 | Masiello et al. |
| 7,489,990 B2 | 2/2009 | Fehr et al. |
| 7,529,705 B1 | 5/2009 | Bartels et al. |
| 7,580,817 B2 | 8/2009 | Bing |
| 7,620,482 B2 | 11/2009 | El-Gasseir et al. |
| 7,663,502 B2 | 2/2010 | Breed |
| 7,742,830 B1* | 6/2010 | Botes ........................ 700/32 |
| 7,783,390 B2 | 8/2010 | Miller |
| 7,827,813 B2 | 11/2010 | Seem |
| 7,834,479 B2 | 11/2010 | Capp et al. |
| 7,843,184 B2 | 11/2010 | Wu et al. |
| 7,854,129 B2 | 12/2010 | Narayanamurthy |
| 7,873,442 B2 | 1/2011 | Tsui |
| 7,949,615 B2 | 5/2011 | Ehlers et al. |
| 7,957,845 B2 | 6/2011 | Chen |
| 7,967,754 B2 | 6/2011 | Knight |
| 7,970,482 B2 | 6/2011 | Srinivasan et al. |
| 7,991,513 B2 | 8/2011 | Pitt |
| 8,000,938 B2 | 8/2011 | McConnell et al. |
| 8,019,697 B2 | 9/2011 | Ozog |
| 8,024,073 B2 | 9/2011 | Imes et al. |
| 8,078,330 B2 | 12/2011 | Brickfield et al. |
| 8,090,476 B2* | 1/2012 | Dawson et al. ............ 700/276 |
| 8,126,685 B2 | 2/2012 | Nasle |
| 8,140,193 B2 | 3/2012 | Lee |
| 8,180,494 B2* | 5/2012 | Dawson et al. ............ 700/278 |
| 8,234,876 B2 | 8/2012 | Parsonnet et al. |
| 8,295,990 B2 | 10/2012 | Venkatakrishnan et al. |
| 8,367,984 B2 | 2/2013 | Besore et al. |
| 8,395,621 B2* | 3/2013 | Tung et al. ................ 345/440 |
| 8,396,602 B2 | 3/2013 | Imes et al. |
| 8,396,604 B2 | 3/2013 | Imes et al. |
| 8,412,382 B2 | 4/2013 | Imes et al. |
| 8,457,802 B1 | 6/2013 | Steven et al. |
| 8,521,337 B1 | 8/2013 | Johnson |
| 8,583,520 B1 | 11/2013 | Forbes, Jr. |
| 8,621,097 B2 | 12/2013 | Venkatakrishnan et al. |
| 8,689,020 B2 | 4/2014 | Massey et al. |
| 8,805,550 B2 | 8/2014 | Chemel et al. |
| 8,892,264 B2 | 11/2014 | Steven et al. |
| 2002/0124000 A1 | 9/2002 | Ooishi |
| 2004/0095237 A1 | 5/2004 | Chen et al. |
| 2004/0117330 A1 | 6/2004 | Ehlers et al. |
| 2004/0128266 A1 | 7/2004 | Yellepeddy et al. |
| 2004/0133314 A1 | 7/2004 | Ehlers et al. |
| 2004/0139038 A1 | 7/2004 | Ehlers et al. |
| 2004/0215529 A1 | 10/2004 | Foster et al. |
| 2005/0033707 A1 | 2/2005 | Ehlers et al. |
| 2005/0234600 A1 | 10/2005 | Boucher et al. |
| 2005/0240427 A1 | 10/2005 | Crichlow |
| 2006/0052918 A1 | 3/2006 | McLeod et al. |
| 2006/0276938 A1 | 12/2006 | Miller |
| 2007/0124026 A1 | 5/2007 | Troxell et al. |
| 2007/0168174 A1 | 7/2007 | Davari et al. |
| 2008/0000381 A1 | 1/2008 | Bartley et al. |
| 2008/0046387 A1 | 2/2008 | Gopal et al. |
| 2009/0093916 A1 | 4/2009 | Parsonnet et al. |
| 2009/0228388 A1 | 9/2009 | Axelrod et al. |
| 2009/0235097 A1 | 9/2009 | Hamilton et al. |
| 2009/0254225 A1 | 10/2009 | Boucher et al. |
| 2009/0281885 A1 | 11/2009 | Castelli et al. |
| 2009/0299537 A1 | 12/2009 | Rea et al. |
| 2009/0313034 A1 | 12/2009 | Ferro et al. |
| 2010/0063644 A1 | 3/2010 | Kansal et al. |
| 2010/0076835 A1 | 3/2010 | Silverman |
| 2010/0082172 A1 | 4/2010 | Ko et al. |
| 2010/0106342 A1 | 4/2010 | Ko et al. |
| 2010/0114387 A1 | 5/2010 | Chassin |
| 2010/0168932 A1 | 7/2010 | Van Zyl |
| 2010/0179704 A1 | 7/2010 | Ozog |
| 2010/0217651 A1 | 8/2010 | Crabtree et al. |
| 2010/0218108 A1 | 8/2010 | Crabtree et al. |
| 2010/0286937 A1 | 11/2010 | Hedley et al. |
| 2010/0292856 A1 | 11/2010 | Fujita |
| 2010/0324962 A1 | 12/2010 | Nesler et al. |
| 2010/0332373 A1 | 12/2010 | Crabtree et al. |
| 2010/0333105 A1* | 12/2010 | Horvitz et al. ................ 718/105 |
| 2011/0029461 A1 | 2/2011 | Hardin, Jr. |
| 2011/0066258 A1 | 3/2011 | Torzhkov et al. |
| 2011/0078092 A1 | 3/2011 | Kim et al. |
| 2011/0231320 A1 | 9/2011 | Irving |
| 2011/0246898 A1 | 10/2011 | Imes et al. |
| 2011/0246987 A1 | 10/2011 | Diwakar et al. |
| 2011/0257956 A1 | 10/2011 | Goel et al. |
| 2011/0270452 A1 | 11/2011 | Lu et al. |
| 2011/0276527 A1 | 11/2011 | Pitcher et al. |
| 2012/0010757 A1 | 1/2012 | Francino et al. |
| 2012/0245968 A1 | 9/2012 | Beaulieu et al. |
| 2012/0296482 A1 | 11/2012 | Steven et al. |
| 2013/0204443 A1 | 8/2013 | Steven et al. |
| 2013/0245847 A1 | 9/2013 | Steven et al. |
| 2013/0346139 A1 | 12/2013 | Steven et al. |
| 2014/0018971 A1 | 1/2014 | Ellis et al. |
| 2014/0039709 A1 | 2/2014 | Steven et al. |
| 2014/0039710 A1 | 2/2014 | Carter et al. |
| 2014/0039965 A1* | 2/2014 | Steven et al. ................ 705/7.25 |
| 2014/0067142 A1 | 3/2014 | Steven et al. |
| 2014/0257526 A1 | 9/2014 | Tiwari et al. |
| 2014/0304025 A1 | 10/2014 | Steven et al. |

FOREIGN PATENT DOCUMENTS

| | | |
|---|---|---|
| WO | WO-2012/019022 A2 | 2/2012 |
| WO | WO-2012/145563 A1 | 10/2012 |
| WO | WO-2013/063581 A1 | 5/2013 |
| WO | WO-2013/067213 A1 | 5/2013 |

(56) References Cited

FOREIGN PATENT DOCUMENTS

| WO | WO-2013/126800 A1 | 8/2013 |
|---|---|---|
| WO | WO-2013/166510 A1 | 11/2013 |
| WO | WO-2013/166511 A2 | 11/2013 |

OTHER PUBLICATIONS

"Cutting the Electric Bill for Internet-Scale Systems", Qureshi et al, SIGCOMM 2009.*

"Saving money by load balancing to where electricity is cheap", John Timmer, Aug. 17, 2009, arstechnica.com.*

"Capping the Electricity Cost of Cloud-Scale Data Centers with Impacts on Power Markets", Zhang et al, University of Tennessee, HPDC 2011.*

"Cutting Down Electrical Cost in Internet Data Centers by Using Energy Storage", Guo et al, University of Florida, IEEE 2011.*

"Electricity Cost Saving Strategy in Data Centers by Using Energy Storage", Guo et al, IEEE Transactions on Parallel and Distributed Systems, 2013.*

"Minimizing Electricity Cost: Optimization of Distributed Internet Data Centers in a Multi-Electricity-Market Environment", Rao et al, IEEE 2010.*

Albadi et al., "Demand Response in Electricity Markets: An Overview", IEEE Power Engineering Society General Meeting, 2007 (5 pages).

Athay, "An Overview of Power Flow Analysis", American Control Conference, 1983, pp. 404-410 (7 pages).

Choi et al., "A Daily Peak Load Forecasting System Using a Chaotic Time Series", International Conference on Intelligent System Application to Power Systems, 1996, pp. 283-287 (5 pages).

Gacek et al., "Implementing the Future Today in Naperville, Illinois", Power Systems Conference: Advanced Metering, Protection, Control, Communication, and Distributed Resources, 2007 (6 pages).

International Search Report and Written Opinion corresponding to International Application No. PCT/US2012/034326 mailed Aug. 10, 2012.

International Search Report and Written Opinion corresponding to International Application No. PCT/US2012/062439 mailed Dec. 31, 2012.

International Search Report and Written Opinion corresponding to International Application No. PCT/US2012/063109 mailed Mar. 14, 2013.

Jacobson et al., "Common Issues in Discrete Optimization and Discrete-Event Simulation", IEEE Transactions on Automatic Control,, vol. 47, pp. 341-345, 2002 (5 pages).

Liu et al., "Kalman Filtering with Partial Observation Losses", 43rd IEEE Conference on Decision and Control (CDC), 2004, pp. 4180-4186 (7 pages).

Mount, T. D., Videbaek, S., & Zimmerman, R. D. (2006). Testing alternative market designs for energy and VArs in a deregulated electricity market. Presented at the 25th Annual Eastern Conference, Advanced Workshop in Regulation and Competition, Rutgers Center for Research in Regulated Industries, May 17-19, Skytop, PA.

Notice of Allowance dated Mar. 7, 2013 from U.S. Appl. No. 12/850,918.

Notice of Allowance dated Apr. 11, 2013 from U.S. Appl. No. 12/850,918.

Office Action dated Aug. 16, 2012 from U.S. Appl. No. 12/850,918.

Pai et al., "A Preconditioned Iterative Solver for Dynamic Simulation of Power Systems", IEEE International Symposium on Circuits and Systems (ISCAS), 1995, pp. 1279-1282 (4 pages).

Stuart, "The Benefits of Integrated Systems: A Case Study", IEEE Seminar (Ref. No. 2002/070) on Open System Technologies for Integrated Building Control, 2002 (8 pages).

Tysseling et al., "Higher Education Facilities: The SmartGrid Earns a Doctorate in Economics", Facilities Manager, Mar./Apr. 2011, pp. 18-23 (6 pages).

Zibelman et al., "Empowering Consumers: Moving Intelligence to the Edge of the Grid", Energy Central Topic Centers, T&D Automation, Oct. 2009, vol. 4, Issue 21 (3 pages).

Zibelman et al., "Smart Markets for Smart Grids", Platts Strategic Media Solutions, Insight Magazine, Jun. 2009, pp. 8-9 (2 pages).

International Search Report and Written Opinion corresponding to International Application No. PCT/US2013/027466 mailed May 3, 2013.

Black, D. et al. "Demand Response and Building Energy Simulation." SIMUREX 2012—Conception optimisée du bâtiment par la SIMUlation et le Retour d'Expérience. EDP Sciences, 2012.

International Search Report and Written Opinion corresponding to International Application No. PCT/US2013/039761 mailed Sep. 6, 2013.

International Search Report and Written Opinion corresponding to International Application No. PCT/US2013/039762 mailed Aug. 26, 2013.

Kempton et al., "A Test of Vehicle-to-Grid (V2G) for Energy Storage and Frequency Regulation in the PJM System", University of Delaware Industry—University Research Partnership, Nov. 2008 (32 pages).

Kiliccote, S. et al., "Dynamic controls for energy efficiency and demand response; framework concepts and a new construction study case in New York." Lawerence Berkeley National Laboratory, 2006.

Notice of Allowance dated Jan. 15, 2015 from U.S. Appl. No. 13/888,309.

Notice of Allowance dated Sep. 17, 2014 from U.S. Appl. No. 13/451,497.

Notice of Allowance dated Dec. 3, 2014 from U.S. Appl. No. 13/888,323.

Office Action dated Jan. 29, 2014, in U.S. Appl. No. 13/451,497.

Office Action dated Oct. 24, 2014 from U.S. Appl. No. 13/774,994.

Surles, W. et al., "Evaluation of automatic price based thermostat control for peak energy reductio nunder seidential time-of-use utility tariffs." Energy and Buildings 49, 2012: 99-108.

Vosloo, J. C. et al., "Demand Market Participation (DMP) on small energy users." Industrial and Commercial Use of Energy Conference (ICUE), 2012 Proceedings of the 9th IEEE, 2012.

* cited by examiner

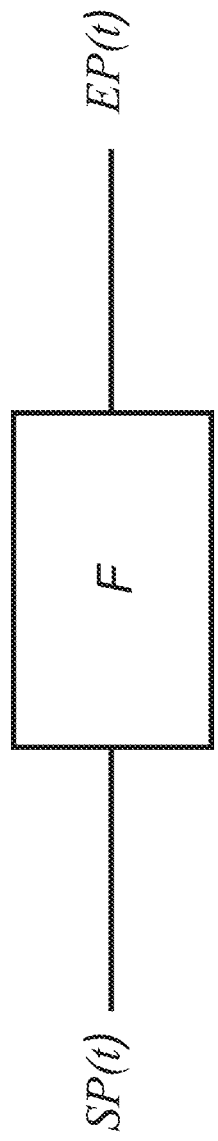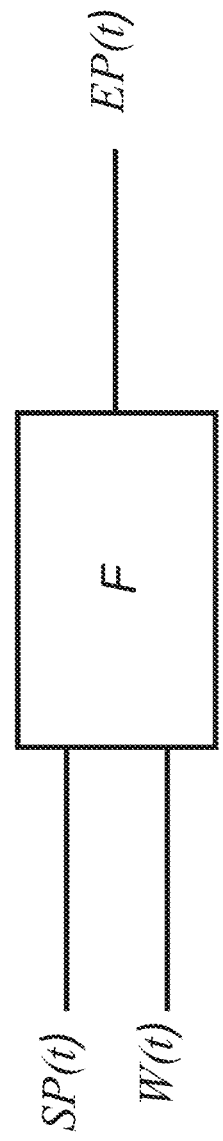

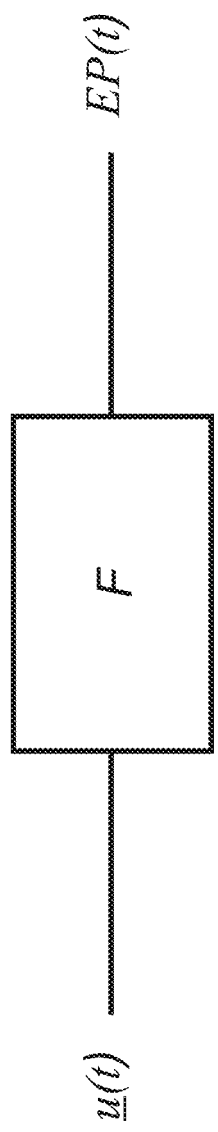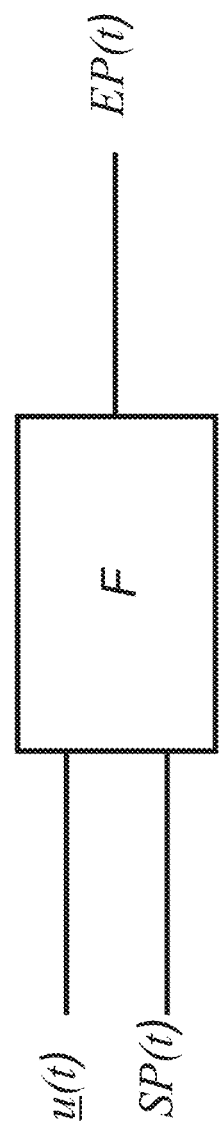

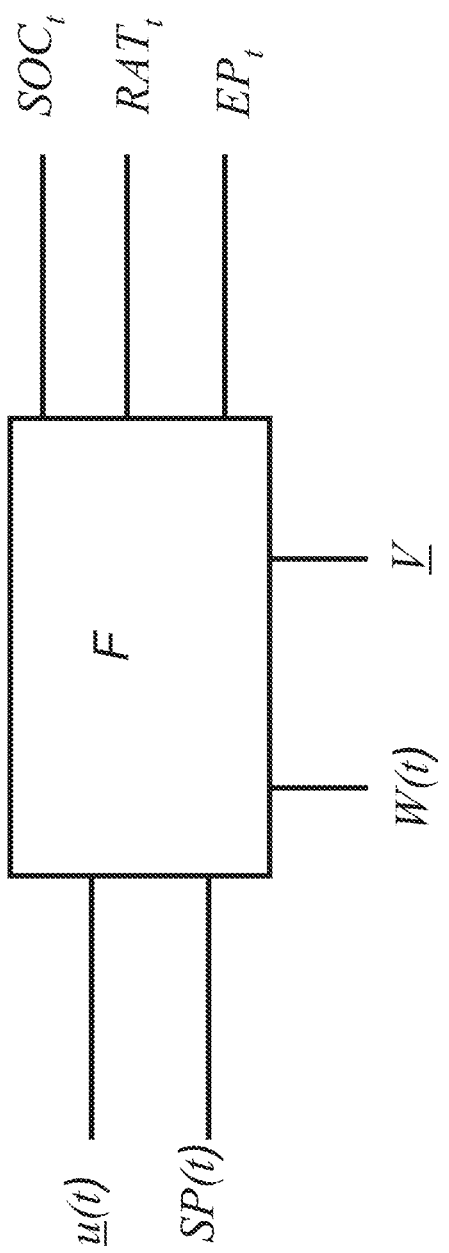

FACILITATING REVENUE GENERATION FROM DATA SHIFTING BY DATA CENTERS

CROSS-REFERENCES TO RELATED APPLICATIONS

This application claims priority to and benefit of U.S. Provisional Application No. 61/601,846, filed on Feb. 22, 2012, entitled "METHODS, APPARATUS AND SYSTEMS FOR PRICE-RESPONSIVE GEOGRAPHIC SHIFTING OF ELECTRICITY USAGE BY DATA CENTERS," the entire disclosure of which is incorporated herein by reference in its entirety, including drawings.

This application is a continuation-in-part of, and claims priority to U.S. Non-provisional application Ser. No. 13/666,898, filed on Nov. 1, 2012, entitled FACILITATING REVENUE GENERATION FROM WHOLESALE ELECTRICITY MARKETS, which claims priority to and benefit of U.S. Provisional Application No. 61/554,390, filed on Nov. 1, 2011, the entire disclosure of which is incorporated herein by reference in its entirety, including drawings.

This application also is a continuation-in-part of, and claims priority to and benefit of U.S. Non-provisional application Ser. No. 13/451,497, filed on Apr. 19, 2012, which claims priority to U.S. Provisional Application No. 61/477,067, filed on Apr. 19, 2011, and U.S. Provisional Application No. 61/552,982, filed on Oct. 28, 2011. The entire disclosure of these applications is incorporated herein by reference in its entirety, including drawings.

This application also is a continuation-in-part of, and claims priority to and benefit of U.S. Non-provisional application Ser. No. 12/850,918, filed on Aug. 5, 2010, which claims priority to U.S. Provisional Application No. 61/279,589, filed on Oct. 23, 2009. The entire disclosure of these applications is incorporated herein by reference in its entirety, including drawings

BACKGROUND

In various regions across the United States, "regional transmission operators" (RTOs) or "independent system operators" (ISOs) generally are responsible for obtaining electricity from electricity generators (e.g., operators of coal-fired plants, gas plants, nuclear plants, hydroelectric plants, renewable resources, etc.), and then transmitting the electricity provided by generators over particular geographic regions (e.g., New England, the greater New York area, the mid-Atlantic states) via an electricity transmission infrastructure (also commonly referred to as the electricity "grid"). RTOs generally are responsible for regional planning of grid expansion and/or ordering deployment of new electricity transmission infrastructure by transmission owners.

The Federal Energy Regulation Commission (FERC) presently requires that, in addition to generally managing the operation of the electricity grid in a given geographic area, RTOs/ISOs need to manage the price of electricity generated and consumed on the grid via "wholesale electricity markets." To this end, RTOs/ISOs establish pricing auctions to provide and support wholesale electricity markets. These pricing auctions, in addition to setting wholesale prices as a function of time, also foster sufficient electricity production for the grid at various locations to ensure that the grid is capable of delivering adequate electricity to respective locations of demand for electricity on the grid. Thus, some of the key objectives of the RTOs/ISOs in overseeing wholesale electricity markets include providing for efficient, economic and reliable operation of the grid.

In general, a given RTO/ISO supports a wholesale electricity market by allowing competing electricity generators to offer their electricity production output to the RTO/ISO. Retail electricity suppliers, also commonly referred to as "utilities," in turn supply electricity to end-users/consumers, or "energy customers" of the retail electricity suppliers, and are billed by the RTO/ISO for their purchases. With respect to the wholesale electricity market, the retail electricity suppliers make bids for the electricity production output offered by the electricity generators that, once accepted, establish market prices. The retail electricity suppliers in turn typically re-price the electricity they purchase from electricity generators on the wholesale market to sell to their retail electricity customers.

One significant issue facing RTOs/ISOs relates to various limitations that exist in connection with the grid that may impede a sufficient flow of electricity on the grid under certain circumstances. In particular, there may be time-dependent and/or geographically-dependent limitations on the grid's ability to support transmission of electricity, based on one or more of: 1) an available overall supply of electricity from electricity generators; 2) overall demand from retail electricity suppliers; 3) general conditions on the grid itself (e.g., aging, failing or dated equipment); and 4) "location-specific" or "congestion" issues, e.g., respective geographic locations on the grid of electricity generators, electricity consumers, particular demand conditions, and/or particular grid-related conditions that in some manner impede the transmission of available electricity to one or more portions of the grid). In some circumstances, a grid limitation may be caused by a particular branch of the grid reaching a thermal limit, or a failure of a generator or transformer on a branch of the grid; these limitations generally are referred to as "security constraints" (i.e., particular grid infrastructure cannot be overloaded without jeopardizing the grid). As such, the electricity grid is sometimes referred to as a "security constrained system."

In view of the foregoing, RTOs/ISOs may employ a process known as "security constrained economic dispatch" for establishing wholesale electricity prices on a wholesale electricity market. Pursuant to this process, an RTO/ISO managing a particular geographic region of an electricity grid determines particular locations on the grid, or "nodes," at which there is a possibility for security constraints to limit electricity transmission. Wholesale electricity prices as a function of time are then established independently for each node (i.e., on a geographically-dependent, or "locational" basis) by accepting bids from energy generators in sequence from the lowest priced offer to the highest priced offer, up to an amount of electricity needed to satisfy electricity demand conditions (e.g., bids from retail electricity suppliers) at the node, so as to develop a supply and demand equilibrium price. In this manner, the wholesale electricity price at a particular node reflects the highest-priced accepted generation offer needed to provide an adequate amount of electricity to that node, taking into consideration various security constraints that may be present at the node. This location-based approach to wholesale electricity prices, which takes into consideration security constraints on the grid, commonly is referred to as "locational marginal pricing," and the wholesale electricity price at a given node is commonly referred to a Locational Marginal Price (LMP). Thus, the wholesale electricity price generally varies at different locations on the grid, based at least in part on security constraints.

While electricity generators and retail electricity suppliers make up a significant constituency of the participants in wholesale electricity markets, applicable market rules in some wholesale electricity markets also permit electricity consumers/end-users (e.g., energy customers of retail electricity suppliers) and others to participate in wholesale electricity markets so as to earn an energy-related revenue and offset their energy-related expenditures. In particular, market rules now permit energy users (or their market representatives) to make offers to curtail or otherwise alter their electricity use, or to sell self-generated or stored electricity, to the wholesale market. If such an offer by an energy customer to provide an "electricity-related product or service" is accepted on the applicable wholesale market, the customer endeavors to appropriately control its various energy assets so as to make available to the grid the offered product/service, in return for payment pursuant to the terms of the offer. The concept of an energy customer providing an electricity-related product or service (e.g., electricity use curtailment) on a wholesale electricity market in exchange for payment to the energy customer by the RTO/ISO, commonly is referred to as "demand response" (DR).

Some of the currently more active wholesale electricity sub-markets in which energy customers of retail service providers may readily participate include the "energy markets" (e.g., "day-ahead" energy market, "real-time dispatched" energy market). While various pricing models exist for participation in these markets and other economic demand response wholesale electricity markets (as well as various penalty models for customer non-performance pursuant to an offer to reduce/curtail energy use), often any revenue generated by the energy customer from participation in these markets is based on the locational marginal price (LMP). The LMP may be calculated periodically at specified nodes (e.g., every 5 minutes, every half-hour, every hour) depending on the particular market in which the energy customer is participating. More generally, revenue generation relating to participation in an economic demand response wholesale electricity market is based on a prevailing "wholesale electricity price" for the particular market in question, which in turn generally is based on the LMP (calculated at various intervals), as discussed above.

To determine revenue earned by participating energy customers in a particular economic demand response wholesale electricity market such as an "energy market," the amount of electricity use reduction by the participating customer typically has to be measured; subsequently, this measured amount of electricity use reduction typically is multiplied by a price relating to the prevailing wholesale electricity price for the market in question (e.g., LMP). Electricity use reduction by the energy customer conventionally is measured against a reference electricity usage commonly referred to as a "customer baseline" (CBL). The CBL is intended to represent what the participating energy customer's electricity use normally would have been, over a particular time period and typical ("business-as-usual" or BAU) operating conditions for the customer's energy assets, absent the customer's voluntary electricity use reduction based on the incentive provided by the economic demand response wholesale electricity market.

Conventionally, a customer baseline (CBL) electricity use profile for an energy customer is derived by an RTO/ISO from an historical sample of actual electricity use by the customer over a particular time period and BAU operating conditions. In some cases, the particular time period for which an historical sample of the customer's actual electricity use is selected as a CBL may be based, at least in part, on similar conditions prevailing at the customer's site at the time of the historical sampling and participation in the economic demand response program (e.g., similar weather conditions, similar seasons/ time of year, similar occupancy conditions at the customer's site, etc.). In other instances, the time period for selecting an historical sample of actual electricity usage as a CBL is based on relatively recent actual electricity use by the energy customer just prior to the customer's participation in the economic demand response program. For example, the ISO PJM Interconnect calculates a market-participating customer's CBL for a given weekday as "the average of the highest four out of the five most recent highest load (electricity use) weekdays in the 45 calendar day period preceding the relevant load reduction event." In sum, revenue generation from the economic demand response wholesale electricity "energy markets" conventionally is based on an historical actual electricity usage of a participating customer, which historical actual electricity usage serves as a customer baseline (CBL) against which electricity use reduction is measured for purposes of paying the energy customer for the use reduction.

SUMMARY

The Inventors have recognized and appreciated that new opportunities for participation in wholesale electricity markets by electricity consumers/end-users (e.g., energy customers of retail electricity suppliers) have created a need for energy management tools to facilitate energy-related revenue generation from such markets. In view of the foregoing, various embodiments are directed generally to methods, apparatus and systems for determining operating schedules for energy assets so as to facilitate revenue generation from wholesale electricity markets. These energy assets include energy storage assets, energy consuming assets and energy generating assets. In different examples herein, an energy asset can include an energy storage asset, an energy consuming asset, and/or an energy generating asset.

Wholesale electricity markets in which the energy customer may participate to earn energy-related revenue, and to which the various methods, apparatus and systems according to the concepts disclosed herein may apply, include various economic demand response wholesale electricity markets, examples of which include, but are not limited to, a "real-time energy market," a "day-ahead energy market," a "day-ahead scheduling reserve market," a "synchronized reserve" market, a "regulation" market, a "capacity" market, and an "emissions" market. The various methods, apparatus and systems according to the concepts disclosed herein may also apply to facilitate the energy customer participating in a market based on a voltage/VAR ancillary service to earn energy-related revenue. In some examples, the methods, apparatus and systems described herein may be implemented in whole or in part by a curtailment service provider (CSP) or other entity acting as a "broker" between energy customers and an RTO/ISO to facilitate participation in various demand response programs supported by wholesale electricity markets.

Suggested Operating Schedules for Energy Assets

In example implementations discussed in greater detail below, the methods, apparatus and systems described herein determine a suggested operating schedule for one or more energy assets (including energy-consuming assets for which energy usage may be curtailed), over a given time period T, that are operated by an energy customer of a retail electricity supplier. The energy assets operated by the energy customer may include electricity-consuming assets as well as electricity-generating assets (e.g., fossil-fuel-based generators, renewable energy sources) and/or electricity storage assets (e.g., batteries). The time period T over which a suggested operating schedule for the energy asset(s) may be determined according to the inventive concepts disclosed herein may be a portion of an hour, an hour, a period of multiple hours, a day, or a period of multiple days, for example (which in some instances may be based, at least in part, on time-varying wholesale electricity prices on a particular wholesale electricity market from which revenue may be generated). Similarly, the suggested operating schedule(s) for the energy assets(s) may be determined based at least in part on wholesale prices of various wholesale electricity "products" offered on the wholesale electricity markets in which the energy customer may participate (e.g., based on a geographic region in which the energy customer is located) to earn energy-related revenue.

In one example implementation, as discussed in greater detail below, the suggested operating schedule for one or more energy assets is determined via a mathematical optimization process that reduces a net energy-related cost to the energy customer over the time period T by increasing projected energy-related revenue from one or more wholesale electricity markets in which the energy customer may participate.

Energy Asset Modeling

To facilitate the mathematical optimization process for generating a suggested operating schedule for one or more energy assets, a mathematical model representing the customer's energy asset(s) is formulated and employed in the mathematical optimization process. The energy asset model is specified by one or more mathematical functions for calculating an energy profile (i.e., electricity use and/or electricity generation as a function of time over the time period T) for the asset(s), based on a proposed operating schedule for the asset(s) applied as an input to the model. In one aspect, the mathematical function(s) defining the asset model at least in part represent physical attributes of the energy asset(s) themselves that relate to electricity use and/or electricity generation. Depending on the energy asset(s) operated by the energy customer, a given model may represent a single energy asset or an aggregation of multiple energy assets operated by the customer.

Also, depending on the type of energy asset(s) being modeled, the asset model may be formulated to accept additional inputs to facilitate calculation of an energy profile based on a proposed operating schedule. Herein, in various examples, energy storage assets, energy consuming assets and/or energy generating assets are being modeled. For example, in the case of energy consuming assets such as building assets including heating, ventilation and air conditioning (HVAC) systems for temperature control in one or more buildings, and/or other assets for which thermodynamic considerations are relevant (including weather- or temperature-dependent energy generating assets including photovoltaic cells and wind turbines), the mathematical model for the asset(s) may be configured to consider as an input to the model actual or forecast ambient environmental conditions (e.g., temperature, humidity, ambient light/cloud cover, etc.) as a function of time, as well as other variables that may impact thermodynamics or the energy profile in general (e.g., building occupancy, a presence of equipment such as computers and other instrumentation that may affect heating or cooling in an environment, etc.).

Customer Baseline (CBL) Energy Profiles for Business-as-Usual (BAU) Operating Schedules In some examples, the mathematical model for the energy asset(s) first is used to generate a simulated (or "predictive") customer baseline (CBL) energy profile corresponding to a typical operating schedule (also referred to herein as a "business-as-usual" (BAU) operating schedule, or "BAU conditions"). In particular, an energy customer's BAU operating schedule for its energy asset(s) is applied to the mathematical model, which in turn provides as an output a simulated CBL energy profile representing a typical electricity consumption or generation as a function of time, over a given time period T, for the modeled energy asset(s). In one aspect, the energy customer's BAU operating schedule represents the customer's typical behavior with respect to operating its energy asset(s), absent any incentive to reduce energy costs and/or earn energy-related revenue from the wholesale electricity market.

As discussed in greater detail below, a simulated and predictive CBL energy profile based on a mathematical model according to the concepts disclosed herein provides a significant improvement over conventional approaches to determine a frame of reference for typical energy profiles of energy customers (absent an incentive to generate revenue via wholesale electricity markets); as noted above, conventional approaches are limited to considering only historical actual energy use information. In particular, it is recognized and appreciated herein that conventional backward-looking assessment of CBL is not necessarily representative of what an energy customer's electricity usage actually would have been on a given day for which economic demand response revenue is being calculated—at best, such backward-looking historical actual-use-based assessments of CBL provide inconclusive estimates.

Additionally, it has been observed empirically that an historical actual-use CBL provides incentives for some energy customers to artificially inflate energy usage (i.e., by not operating energy assets pursuant to "business-as-usual" or BAU conditions, but instead purposefully adopting higher-consumption operating conditions) prior to a period in which the customer anticipates participation in economic demand response wholesale electricity markets; an artificially higher historic actual-use-based CBL, against which energy use reduction will be measured, provides a potentially higher economic demand response revenue. In this manner, the general goal of economic demand response programs to incentivize reduced electricity usage is undermined (by an artificially-increased electricity usage to establish a higher CBL).

Furthermore, the Inventors have recognized and appreciated that an historical actual-use-based CBL provides a long-term disincentive to participate in economic demand response wholesale electricity markets. In particular, as a given energy customer participates in economic demand response wholesale electricity markets over time, their average actual electricity use from retail suppliers is expected to decrease. If revenue from such markets continues to be calculated with reference to an historical actual-use-based CBL, the potential for economic demand response revenue will decrease over time, as an economic settlement approach based on historical actual-use CBL eventually will begin to treat incentivized electricity use reduction as "business-as-usual" operating conditions for the energy customer. This type of treatment arguably will ultimately discourage participation in wholesale electricity markets. At very least, continued reliance on historical actual-use-based CBL likely will compel an extension of a "look-back" period serving as a basis for determining CBL for energy customers who actively participate in economic demand response wholesale electricity markets for significant periods of time. As longer look-back periods are adopted, the accuracy and relevance of historic actual-use-based CBLs from more distant time periods arguably will significantly decrease.

Accordingly, for at least the foregoing reasons, a simulated and predictive CBL energy profile, based on a mathematical model of an energy customer's energy asset(s) according to the concepts disclosed herein (rather than an historical actualuse-based CBL as conventionally employed), provides a significant improvement for more accurately determining revenue earned from economic demand response wholesale electricity markets. In some examples, the mathematical model for the energy asset(s) may not be predicated on any significantly historical actual electricity use information for the energy asset(s), and instead may be based in part on physical attributes of the energy asset(s) themselves that relate to electricity use and/or electricity generation, as noted above. In this manner, simulated and predictive CBL energy profiles based on such mathematical models are not substantively influenced by significantly historical actual electricity use information.

A self-tuning energy asset model according to a principle herein may adapt itself to the current conditions of an energy asset. That is, the computation of the CBL calculations may reflect temporary changes or permanent changes in the physical characteristics of an energy asset. The historical actual-use-based CBL may capture permanent changes in the energy asset as well.

In other examples, the mathematical model for energy asset(s) may be predicated on some degree of essentially real-time or near real-time feedback (e.g., from one or more control systems actually controlling the modeled energy asset(s)), which feedback may represent actual electricity use. This feedback may be used, according to some examples of the methods, apparatus and systems disclosed herein, to refine some aspects of the mathematical model; however, even when real-time or near real-time feedback representing actual electricity use is employed, in some examples the mathematical model is may be based on physical attributes of the energy asset(s) themselves relating to electricity use and/or electricity generation.

Objective Cost Functions

In some examples, the mathematical model for the energy asset(s) is employed to determine a suggested operating schedule over a given time period T for the energy asset(s) (different than the BAU operating schedule) based on a mathematical optimization of an "objective cost function" representing the net energy-related cost to the energy customer for operating the asset(s). In example implementations, the objective cost function incorporates the mathematical model for the energy asset(s) and specifies energy-related revenues from one or more wholesale energy markets (e.g., based on forecasted wholesale energy prices over the time period T for the one or more wholesale markets of interest), from which possible revenue may be available to the energy customer. In some examples, the energy-related revenues specified in the objective cost function may take into consideration a simulated customer baseline (CBL) energy profile (discussed above) as a basis for determining such revenue.

The objective cost function employed in the mathematical optimization to determine a suggested operating schedule for the energy asset(s) also may specify energy-related costs which are offset by the energy-related revenues. In particular, in some examples, the energy-related costs included in the objective cost function may include "actual" energy-related costs (e.g., retail electricity costs, wholesale electricity costs representing revenue earned by the energy customer, fuel costs to run one or more electricity generation assets, operation and/or maintenance costs that may be associated with electricity generation and/or energy storage assets, emissions costs from the greenhouse gas emissions based on operation of the system, lifetime and/or replacement costs for electricity generation and/or energy storage assets, emissions-related costs, etc.). The energy-related costs included in the objective cost function additionally or alternatively may include "indirect" energy-related costs, such as convenience/comfort costs associated with the energy customer's adoption of a suggested operating schedule different than the BAU operating schedule (the convenience/comfort cost represents an "indirect" cost associated with a change in the customer's behavior with respect to operating its asset(s), based on the incentive of possible energy-related revenue from the wholesale electricity markets).

Optimization of Objective Cost Function for Generating Energy Asset Operating Schedules In one example, the objective cost function (which incorporates the mathematical model of the energy asset(s)) may be provided to an optimizer (a particularly-programmed processor, also referred to as a "solver") that implements a mathematical optimization process to determine a suggested operating schedule for the energy asset(s) over a given time period T. In one conceptual illustration of the mathematical optimization process, some number N of candidate operating schedules are successively applied to the mathematical model to generate simulated energy profiles corresponding to the candidate operating schedules. A net energy-related cost represented by the objective cost function is calculated for each simulated energy profile, and the candidate operating schedule that minimizes the objective cost function (i.e., minimizes the net energy-related cost) is selected as the suggested operating schedule. In some implementations, the amount of revenue available from the relevant wholesale electricity markets over the given time period T is a significant factor dictating the candidate operating schedule that is provided as an output of the optimizer. The energy-related costs may also include a reliability cost (such as based on any voltage/VAR control activity in a microgrid application) and/or an emissions cost based on an emissions market.

Adopting Operating Schedules, Market Bids and Settlement

The suggested operating schedule in turn may be transmitted to the energy customer (e.g., to an energy management system of the energy customer, including a building management system), and the customer may choose to adopt or not adopt the suggested operating schedule to actually operate its energy asset(s) over the particular time period T for which the optimization is performed. In some implementations, a given operating schedule is transmitted to the energy customer in the form of one or more bias signals representing a change in an operating set point of one or more assets, as a function of time over the time period T, from the typical or "business-as-usual" (BAU) operating set point for the asset(s). In some examples, the energy customer makes a choice to adopt a given suggested operating schedule in tandem with making an offer (a "bid") to provide one or more wholesale electricity market products to the appropriate market pursuant to the adopted operating schedule.

If the energy customer adopts the suggested operating schedule to actually operate its energy asset(s) so as to provide a particular wholesale electricity market product pursuant to an accepted bid (e.g., reduce its energy consumption), various information ultimately is obtained from the energy customer to facilitate a "settlement" process pursuant to which the customer is paid by the wholesale market operator (i.e., the RTO/ISO overseeing the wholesale electricity market(s) in which the customer is participating). For example, in one example relating to energy markets (wherein the "product" is energy use curtailment), the energy customer's "metered load" (i.e., actual energy use during the time period T in which the suggested operating schedule is adopted) is measured, and compared to a simulated CBL based on the mathematical model for the customer's energy asset(s). The energy customer may then be paid for its economic demand response electricity use reduction based on a difference between the simulated CBL and the actual metered load, multiplied by the actual wholesale energy price during the time period T for the market in question (e.g., LMP).

Data Centers

In response to increasing demands of industrial, developing, and information based economies, data centers and information technology networks continue to proliferate across the globe. This expansion takes various forms, including widely distributed computer networks that link together geographically disparate computing resources, as well as "data centers" that provide large scale memory and data storage applications and various computing resources. Herein, the term "data center" includes information technology networks. Data centers may include one or more "servers" to provide data storage and computing/data processing (CPU) resources, and further include power and cooling resources in connection with same. Servers of data centers consume increasing amounts of electricity over time. As additional functional blocks are squeezed into data processors to increase the data processing power of servers, the power density of the data center accordingly increases. Some data centers presently consume on the order of several megawatts of power.

While data centers conventionally have not been considered as controllable energy assets, the Inventors have recognized that one or more of the various elements constituting a data center (e.g., memory, computing, power, and cooling resources) may be operated in a price-responsive manner so as to facilitate revenue generation from wholesale energy markets. The Inventors have appreciated that one noteworthy aspect of data centers as a class of energy asset is the ability to shift some portion of the information and/or computing load (e.g., data stored and/or data processing functionality) handled by servers of a given data center to one or more other data centers in an appreciably short amount of time. As discussed in greater detail below, the information and/or computing load (hereafter, simply "computing load") in a data center is significantly related to the data center's electricity use. Accordingly, controlling (e.g., reducing or otherwise modifying) a data center's computing load as a function of time, based at least in part on applicable wholesale electricity prices, provides an opportunity for revenue generation from wholesale electricity markets.

Furthermore, given that respective data centers may be geographically located in different nodes of a grid operated by a given RTO/ISO (or on portions of the grid operated by different RTOs/ISOs entirely), and given the nodal nature of establishing wholesale electricity prices, the geographically dispersed data centers respectively may be subject to different LMPs as a function of time. According to the principles herein, modulating the computing load of a given data center as a function of time and/or space (i.e., geographic location) can provide an opportunity for revenue generation. For example, shifting computing load from one data center to one or more other data centers as a function of time and different wholesale electricity prices at different nodes in which respective data centers are located, provides an opportunity for revenue generation from wholesale electricity markets not only based on time-varying wholesale electricity prices in general, but more specifically on different time-varying wholesale electricity prices at different nodes (which may be under the jurisdiction of the same RTO/ISO, or different RTOs/ISOs). In another example, modulating the computing load of a given data center, such as but not limited to increasing or decreasing server computing load, can be used to modulate the electricity usage of the data canter, and that modulation of electricity usage can be exploited to provide a response in other types of markets, such as but not limited to a regulation market and/or a synchronized reserve market, thereby providing opportunities for revenue generation.

In view of the foregoing, yet other examples are directed to methods, apparatus and systems for price-responsive geographic shifting of electricity usage by data centers. Many of the concepts discussed above in connection with an optimization process for determining a suggested operating schedule for one or more energy assets apply similarly in examples that also consider geographic shifting of electricity usage by data centers. Similar principles apply in establishing an asset model for a data center, simulating a CBL energy profile for the data center based on the asset model (where applicable for revenue generation from "energy markets"), and specifying an object function that considers all energy-related costs and all energy-related revenues associated with candidate operating schedules for multiple data centers, wherein a given operating schedule relates at least in part to computing load as a function of time and space.

The speed with which computing load can be shifted amongst servers in a given data center and/or servers of multiple data centers renders data centers as a class of energy assets suitable for generating revenue from both the energy markets and ancillary services wholesale electricity markets (e.g., "day-ahead scheduling reserve," "synchronized reserve," and "regulation," in which a signal-responsive increase or decrease of electricity usage is a consideration). With respect to energy markets, if the owner/operator of multiple data centers adopts operating schedules for the data centers that are different than the "business-as-usual" (BAU) operating schedules for the data centers, such that the energy profile of the data centers over a given time period T is different from the customer baseline (CBL) energy profiles for the data centers, revenue generation from the wholesale energy markets may be possible.

Utilization levels of servers in most data centers hover around 15% on average, with inactive servers "idling." Accordingly, data centers are noteworthy candidate energy assets for shaping power load (modulating electricity use) on the grid by taking selected servers offline and/or bringing selected servers online when needed, without compromising reliability and operations (e.g., by shifting computing load to one or more other data centers).

Power consumption in a data center is driven primarily by servers and the supporting infrastructure, namely, the HVAC system and the power delivery system. With respect to HVAC, a data center cooling system generally includes a redundant chiller plant, pumps, vents and fans, all of which generally are fashioned with high powered electric motors consuming significant power. In some implementations, the cooling system of a data center may consume relatively more power than the data center servers themselves. The power consumption of the cooling system is driven primarily by heat emissions from the servers, and these emissions in turn depend on the computing load being handled by the servers. By controlling the activity of servers (e.g., by shedding, shifting and/or distributing the computing load), the ambient temperature in the data center may be modulated and the cooling system power consumption accordingly may be modulated (reduced or increased).

Additionally, emergency power systems, which may include uninterruptible power supplies (UPSs), generators and/or batteries, often are included in data centers to support business continuity processes. These emergency power systems typically are controlled with an automatic transfer switch that activates the system when no power is available at the utility feed (at the "meter"). According to some examples, these emergency power systems also may be employed as controllable elements of the data center energy asset overall to facilitate revenue generation from the wholesale electricity energy and/or ancillary services markets. For example, the data center can tap into the emergency power systems when electricity prices are high in order to first generate savings and secondly make capacity available for arbitrage opportunities.

In an example, an apparatus is provided for determining a suggested operating schedule over a time period T for at least one data center operated by an energy customer of an electricity supplier, so as to generate energy-related revenue, over a time period T, associated with operation of the at least one data center according to the operating schedule, where the energy-related revenue available to the energy customer over the time period T is based at least in part on a wholesale electricity market. The apparatus includes at least one communication interface, at least one memory and at least one processing unit. The at least one memory can be used to store processor-executable instructions and a mathematical model for the at least one data center comprising a plurality of energy assets, where the mathematical model specifies at least one function that calculates an energy profile for the at least one data center and the plurality of energy assets based at least in part on an operating schedule for the at least one data center applied to the mathematical model, where the operating schedule relates to a CPU utilization or a computing load of at least one energy asset of the plurality of energy assets of the at least one data center. The at least one processing unit is communicatively coupled to the at least one communication interface, and the at least one memory, where upon execution of the processor-executable instructions, the at least one processing unit: A) determines the suggested operating schedule, over the time period T, for the at least one data center based at least in part on the mathematical model and at least one forecast wholesale electricity price associated with the at least one wholesale electricity market; and B) controls the at least one communication interface to transmit to the energy customer the suggested operating schedule determined in A), and/or controls the at least one memory so as to store the suggested operating schedule.

In another example, an apparatus is provided for determining an operating schedule for at least one data center operated by an energy customer of an electricity supplier, so as to generate energy-related revenue, over a time period T, associated with operation of the at least one data center according to the operating schedule, wherein the energy-related revenue available to the energy customer over the time period T is based at least in part on a wholesale electricity market. The apparatus includes at least one communication interface, at least one memory and at least one processing unit. The at least one memory can be used to store processor-executable instructions and an objective function for the at least one data center comprising at least one energy consuming asset, where the at last one energy consuming asset comprises at least one server, where the objective function facilitates a determination of the operating schedule for the at least one data center based at least in part on an operation characteristic of the at least one data center and a forecast wholesale electricity price associated with the wholesale electricity market, and where the operating schedule relates to a CPU utilization or a computing load of the at least one data center. The at least one processing unit is communicatively coupled to the at least one communication interface and the at least one memory, where upon execution of the processor-executable instructions, the at least one processing unit: A) determines the operating schedule, over the time period T, for the at least one data center using the objective function and a customer baseline (CBL) energy profile for at least one energy consuming asset of the energy assets and at least one forecast wholesale electricity price associated with the at least one wholesale electricity market, over the time period T, and B) controls the at least one communication interface to transmit to the energy customer the operating schedule for at least one data center determined in A), and/or controls the at least one memory so as to store the determined operating schedule. The CBL energy profile is computed based on applying a business-as-usual (BAU) operating schedule for the at least one energy consuming asset to a mathematical model of the operation of the at least one energy consuming asset.

In another example, apparatus is provided for determining an operating schedule for at least one data center operated by an energy customer of an electricity supplier, so as to generate energy-related revenue, over a time period T, associated with operation of the at least one data center according to the operating schedule, where the energy-related revenue available to the energy customer over the time period T is based at least in part on a wholesale electricity market. The apparatus includes at least one communication interface, at least one memory and at least one processing unit. The at least one memory can be used to store processor-executable instructions and a mathematical model for the at least one data center, the at least one data center comprising at least one energy storage asset, where the mathematical model facilitates a determination of the operating schedule for the at least one data center based at least in part on a first operation characteristic of the at least one energy storage asset, a second operation characteristic of at least one energy consuming asset in communication with the at least one energy storage asset, and a forecast wholesale electricity price associated with the wholesale electricity market. The at least one processing unit is communicatively coupled to the at least one communication interface and the at least one memory, where upon execution of the processor-executable instructions, the at least one processing unit: A) determines the operating schedule for the at least one data center, over the time period T, using the mathematical model, where the operating schedule for the at least one data center comprises an operating schedule for a controller of the at least one energy storage asset, and where the operating schedule for the at least one data center relates to a CPU utilization or a computing load of at least one server of the at least one data center; and B) controls the at least one communication interface to transmit to the energy customer the operating schedule for the at least one data center determined in A), and/or controls the at least one memory so as to store the determined operating schedule for the at least one data center.

In an example, a method or computer readable medium is provided for determining a suggested operating schedule over a time period T for at least one data center operated by an energy customer of an electricity supplier, so as to generate energy-related revenue, over a time period T, associated with operation of the at least one data center according to the operating schedule, where the energy-related revenue available to the energy customer over the time period T is based at least in part on a wholesale electricity market. The method include processor-executable instructions for performs the processes in connection with any of the apparatus herein. The method or computer readable medium includes processor-executable instructions embodied thereon which, when executed by a processor, causes the performance of the processes described in connection with the apparatus.

The following patent applications are hereby incorporated herein by reference in their entirety:

Ser. No. 61/554,390, filed Nov. 1, 2011, entitled "Methods, Apparatus and Systems for Facilitating Revenue Generation from Wholesale Electricity Markets;"

Ser. No. 61/553,843, filed Oct. 31, 2011, entitled "Customer Interface of an Energy Management System for Monitoring and/or Processing Information Relating to Energy Assets and/or Wholesale Electricity Markets;"

Ser. No. 61/552,982, filed Oct. 28, 2011, entitled "Methods, Apparatus and Systems for Determining Charge/Discharge Schedules for Energy Storage Assets Associated with Transportation Operations to Facilitate Revenue Generation from Wholesale Electricity Markets;"

Ser. No. 61/477,967, filed Apr. 19, 2011, entitled "Methods, Apparatus and System for Managing Energy Assets;"

Ser. No. 12/850,918, filed Aug. 5, 2010, entitled "System and Method for Energy Management;" and Ser. No. 61/279,589, filed Oct. 23, 2009, entitled "VPower™ System."

The entire disclosure of these applications is incorporated herein by reference in its entirety, including drawings, It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 6 illustrates an example block diagram representing an asset model according to a principle described herein;

FIG. 7 illustrates an example block diagram representing another asset model according to a principle described herein;

FIG. 8 illustrates an example block diagram representing another asset model according to a principle described herein;

FIG. 9 illustrates an example block diagram representing another asset model according to a principle described herein;

FIG. 10 illustrates an example block diagram representing another asset model according to a principle described herein;

DETAILED DESCRIPTION

Figure 1:
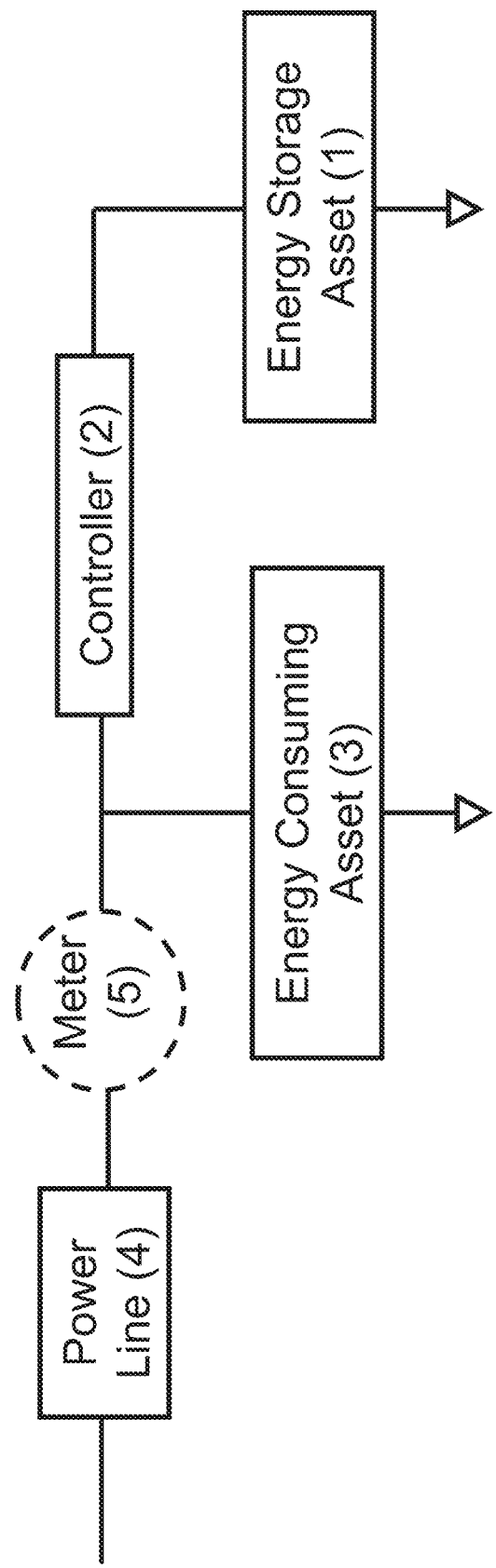
FIG. 1 shows an example system that includes an energy storage asset, a controller, and an energy consuming asset, according to a principle described herein.

Following below are more detailed descriptions of various concepts related to, and embodiments of, inventive methods, apparatus, and systems for modulating electricity usage by data centers to facilitate revenue generation from markets, including wholesale electricity markets, regulation markets, and/or synchronized reserve markets. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

As used herein, the term "in communication with" includes direct communication between elements as well as indirect communication between the elements, such as by means of at least one intermediate component. As used herein, the term "in electrical communication with" includes direct electrical communication between elements as well as indirect electrical communication between the elements, such as by means of at least one intermediate component.

The methods, apparatus, and systems disclosed herein provide resources by which a certain environment that includes one or more energy assets, including data centers according to the principles herein, is modeled, energy use and/or generation profiles of the assets may be simulated based on the model(s), and operating schedules for the energy asset(s) may be suggested, based on such simulations, to facilitate revenue generation from one or more wholesale electricity markets for energy customers overseeing the environment (e.g., operating the energy asset(s) within the environment). Data center site environments including one or more of a wide variety of energy assets are contemplated, examples of which include, but are not limited to, a building or group of buildings that include one or more energy-consuming and/or energy-generating assets (e.g., servers, heaters, HVAC systems, chillers/ice makers, fossil-fuel-based and/or renewable electricity generators, energy storage devices), as well as other environments in which one or more building may not be involved (but which may nonetheless include one or more energy assets). The CPU utilization (or computing load) at a data center site correlates with energy usage of the data center site. According to the principles described herein, the CPU utilization (or computing load) of one or more of the servers of a data center site can be modeled as a controllable energy-consuming asset in any of the models and/or equations described herein.

In some examples, optimization software constituting an "optimizer" module (also referred to as a "solver" or simply "optimizer") is used to perform an optimization process to determine suggested operating schedules for one or more energy assets that minimize net energy-related costs for the energy customer (the data center site). In one aspect, the optimization process is based at least in part on balancing respective energy-related costs and energy-related revenues in connection with the data center site's operating environment and assets therein, in consideration of wholesale electricity prices as a function of time. In other aspects, an "objective cost function" that represents the net energy-related cost as a function of an operating schedule for the energy asset(s) and a mathematical model for the energy asset(s) may include multiple constituent components, examples of which include, but are not limited to:

1. a convenience or comfort cost associated with deviation from the business-as-usual (BAU) operating schedule,
2. a cost associated with deviation from an emissions target,
3. a cost associated with electric power production by the data center site's energy generating assets (if any),
4. a cost associated with electric power supply from a retail electricity supplier, and
5. a cost associated with economic demand response (DR) revenue from one or more wholesale electricity markets.

Accordingly, salient aspects of example methods, apparatus and systems according the principles described herein are to provide energy asset management capabilities for reducing retail electricity costs by optimizing electricity usage, generation, and storage, while at the same time providing significant revenue opportunities in markets, including wholesale electricity markets, in regulation markets, in synchronized reserve markets and/or in emissions markets.

In an example, an optimization module of the energy management system can be used to perform an optimization process. In a non-limiting example, the optimization process can be performed as a staged process. In a stage of the optimization process, a computation can be performed to calculate how a data center environment responds on a normal day using the default settings of energy assets and with no outside intervention by the energy management system. The result can be used to determine a customer baseline (CBL) schedule or a business-as-usual (BAU) schedule. Alternatively, a predetermined CBL or BAU schedule may be introduced into the optimization process rather than calculated. Additionally, the optimization may be used to determine the financial cost with respect to the CBL schedule or the BAU schedule. In another stage of the optimization process, an optimization can be run with certain operating changes that may be entered by a system operator of the energy management system. This stage may also factor in energy prices and/or emissions trading prices. Again, the optimization module may be used to determine the financial cost of the optimized operating schedule, preferably showing the financial benefit thereof as compared with BAU.

An example aspect of the energy management system and methods described herein is that it can be implemented to provide data center optimization, over a specified period of time T, with respect to (1) minimizing cost of deviation from BAU comfort levels, (2) minimizing cost of deviation from an emissions target, (3) minimizing cost of electric power production by the data center energy generating assets, (4) minimizing cost of electric power supply from the load serving entity or the electric distribution company, and (5) maximizing demand response (DR) revenue, with all of (1) to (5) being evaluated in a computation over a specified period of time T.

In another stage of the optimization process, it may be determined whether there is financial benefit to maintaining CPU utilization at the data center site of interest, which is in a certain energy market price region, or whether there is financial benefit to shifting the CPU utilization to a different data center site that is in a different energy market price region. The CPU utilization at a data center site correlates with energy usage of the data center site. For example, it can be determined whether there may be a financial benefit (including revenue generation from an energy market) to shift an amount of CPU utilization from a first data center site in a first geographic location to a second data center site in a second geographic location.

In another stage of the optimization process, it may be determined whether there is financial benefit to modulating CPU utilization at a data center site of interest to respond to the signals from, e.g., market operator (such as but not limited to a regulation market operator or a synchronized reserve market operator). Since the CPU utilization at a data center site correlates with energy usage of the data center cite, increasing the CPU utilization during a time period can be used to increase electricity usage in response to a signal from a market operator for increased energy usage. Decreasing the CPU utilization during a time period can be used to decrease electricity usage in response to a signal from a market operator for decreased energy usage.

Another example aspect of the energy management system and methods described herein is that, based on the energy assets optimization, data center load shifting may occur within a single data center and/or across at least two geographically disparate data centers.

Yet another example aspect of the energy management system and methods described herein is that it provides energy assets optimization and load balancing in both time (including, an optimized schedule for a 24-hour period) and space (including, across at least two geographically disparate data centers).

Yet another example aspect of the energy management system and methods described herein is the capability of the data center to respond to the regulation market by load shifting in response to a fast regulation signal.

Still another example aspect is a method of providing improved AC power quality in a data center.

The apparatuses and methods described herein are applicable to a system that includes an energy storage asset 1, a controller 2 in communication with the energy storage asset 1, and an energy consuming asset 3 in communication with a power line 4 (as depicted in the example of FIG. 1). The controller 2 facilitates charging of the energy storage asset 31 using the electricity supplied by power line 4 or feeding power generated by a discharge of the energy storage asset 31 to the power line 4. As depicted in the non-limiting example of FIG. 1, the controller 2, the energy storage asset 1 and the energy consuming asset 3 may be located behind a power meter 5. For example, all of the controller 2, the energy storage asset 1 and the energy consuming asset 3 may be located at one or more facilities of the energy consumer.

Non-limiting examples of energy storage assets include batteries, ice units, and compressed air. Non-limiting examples of batteries include lithium ion batteries, lead-acid batteries, flow batteries, or dry cell technology batteries.

In the non-limiting example of FIG. 1, the controller 2 facilitates the communication between the energy consuming asset and the energy storage asset. In another example, the energy consuming asset may communicate with the energy storage asset via one or more other components including the controller 2.

The apparatuses and methods herein facilitate generation of energy-related revenue for an energy customer of an electricity supplier, where the data center site commits an amount of energy from the at least one energy storage asset to an energy market. In an example, the electricity supplier may be a retail electricity supplier that supplies the electricity to the data center site at a retail price. In another example, the electricity supplier may supply the electricity to the data center site at a contracted for or negotiated price. In various examples herein, the energy customer may allow an amount of capacity of the energy storage asset to be committed to the energy market. When implemented, the apparatuses and methods described herein may allow the data center site to generate an amount of energy-related revenue over a time period that an amount of capacity of the energy storage asset is committed to the energy market.

In a non-limiting example, an apparatus or a method described herein can be used to generate an operating schedule for a controller that communicates with the energy storage asset. The controller is capable of exercising an amount of control over the rate of charging or energy generation of the energy storage asset. As a result, the controller can be used to maintain the state of charge of the energy storage asset, or change its state of charge controllably. Operation of the controller, and hence the energy storage asset, according to the operating schedule generated by an apparatus or a method herein over the time period may make available to the data center site an amount of energy-related revenue based at least in part on a wholesale electricity market.

Figure 2:
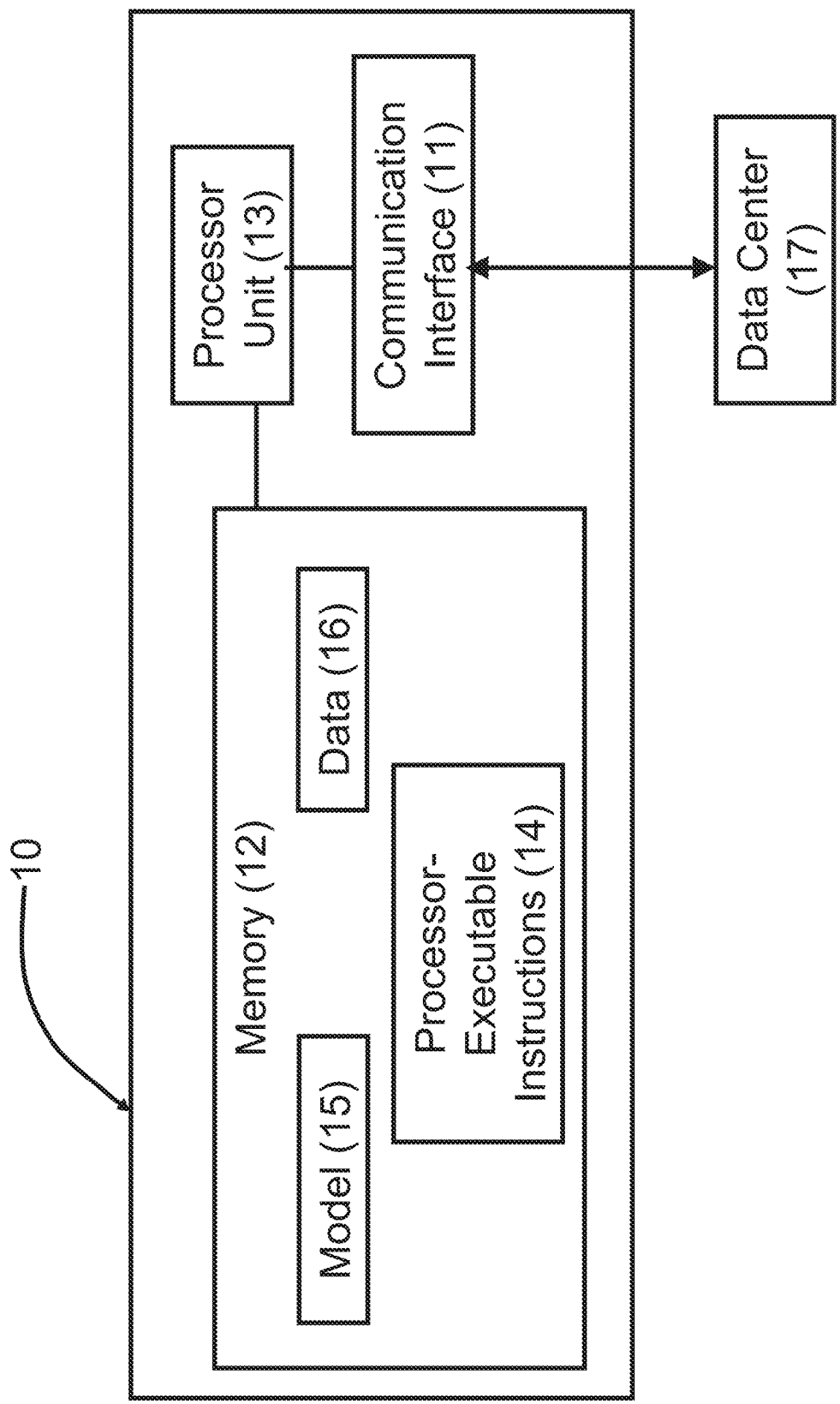
FIG. 2 shows an example apparatus according to a principle described herein.

A non-limiting example of the apparatus 10 according to the principles described herein is illustrated in FIG. 2. The apparatus 10 includes at least one communication interface 11, at least one memory 12, and at least one processing unit 13. The at least one processing unit 13 is communicatively coupled to the at least one communication interface 11 and the at least one memory 12.

The at least one memory 12 is configured to store processor-executable instructions 14 and a mathematical model 15 for the at least one energy storage asset. As described in greater detail below, the mathematical model determines the operating schedule for the controller based on data 16 associated with parameters, including but not limited to, an operation characteristic of the energy storage asset, an operation characteristic of an energy consuming asset in communication with the energy storage asset and a forecast wholesale electricity price associated with the wholesale electricity market.

In a non-limiting example, the at least one processing unit 13 executes the processor-executable instructions 14 stored in the memory 12 at least to determine the operating schedule for the controller of the energy storage asset using the mathematical model 15. The at least one processing unit 13 also executes processor-executable instructions 14 to control the communication interface 11 to transmit to the data center site 17 the operating schedule that has been determined for the controller and/or controls the memory 12 to store the determined operating schedule for the controller. In a non-limiting example, the processing unit 13 may execute processor-executable instructions 14 to control the communication interface 11 to transmit to the operating schedule directly to the controller.

The operation characteristic of the energy storage asset may be its state of charge, charge rate, the degree of non-linearity of the charge rate, discharge rate, degree of non-linearity of the discharge rate, round trip efficiency, and degree of life reduction. In an example where the operation characteristic of the energy storage asset is its charge rate and/or discharge rate, the operating schedule for the controller may include suggested different time intervals for charging the energy storage asset or discharging the energy storage asset during the time period T that the system is in operation. As a non-limiting example, the operating schedule for the controller may indicate a time interval for charging the energy storage asset that coincides with a corresponding time interval during which the forecast wholesale electricity price falls below a predetermined threshold value. As another non-limiting example, the operating schedule for the controller may indicate a time interval of discharging the energy storage asset that coincides with a corresponding time interval during which the forecast wholesale electricity price exceeds a predetermined threshold value.

The operation characteristic of the energy consuming asset may be its load use schedule. For example, the operation characteristic of the energy consuming asset can be its energy consumption profile as a function of time. The energy consuming asset may be a controllable asset or a fixed-load asset. A fixed-load asset is an energy consuming asset whose energy consumption characteristics may not be readily modified, even if it varies over time. The energy consumption characteristics of a controllable energy consuming asset may be modified by changing parameters of operation of the system. A non-limiting example of an operation characteristic for a controllable energy consuming asset is its set point. The set point may be a controllable set point, e.g., it may be controllable as a function of time or temperature. For example, where the controllable energy consuming asset is a building with a variable internal temperature controlled by a heating, ventilation and air conditioning (HVAC) system, the operation characteristic may be a temperature set point for the HVAC system.

As described herein, in an example, an amount of energy of the energy storage asset may be generated and supplied to the power line at a discharge rate to generate energy-related revenue for the data center site in an energy market. The energy-related revenue can depend on a forecast wholesale electricity price associated with the wholesale electricity market, and may be determined based on computation of a net-energy related cost. The net energy related cost may be computed based on the supply costs for supplying electricity to the data center site and a demand response revenue. An apparatus and method herein can be implemented to generate an operating schedule for the controller of the energy storage asset that provides recommendations for the timing of charging and discharging of the energy storage asset.

In an example, the processing unit can be configured to determine the operating schedule for the controller of the at least one energy storage asset using the mathematical model by minimizing a net energy-related cost over the relevant time period (T). The net energy-related cost can be associated with electricity generation by the energy storage asset, electricity consumption by the energy storage asset, and electricity consumption by the energy consuming asset. Here, the energy-related revenue available to the data center site may be computed based at least in part on the minimized net energy-related cost.

The net energy-related cost may be specified as a difference between the electricity supply cost and the economic demand response revenue over the pertinent time period.

In an example, the processing unit can be configured to determine the operating schedule for the controller using the mathematical model and a representative customer baseline (CBL) energy profile for the energy consuming asset over the time period (T). As used herein, the term "representative customer baseline energy profile" or "representative CBL energy profile" encompasses representations of the data center site's energy usage in the absence of change of behavior according to the principles described herein. As non-limiting examples, the "representative customer baseline energy profile" or "representative CBL energy profile" includes an estimation based on the data center site's business-as-usual (BAU) operations, including any form of averaged or weighted measure based on measures of historical BAU operations. Herein, the representative CBL energy profile represents a typical operation of the at least one energy consuming asset of the data center site by the energy customer. For example, where the energy consuming asset is a fixed-load asset, the representative CBL may be determined as the energy consumption profile for the energy consuming asset.

Where the operating schedule for the controller is generated based on using the mathematical model and a representative customer baseline (CBL) energy profile, the economic demand response revenue may be computed based on the forecast wholesale electricity price, the electricity generation by the energy storage asset, the electricity consumption by the energy storage asset, and the representative CBL energy profile for the energy consuming asset.

In an example herein, a portion of the energy of the energy storage asset may be committed to the regulation market. That is, the wholesale electricity market for the data center site would include an energy market and a regulation market. In an example where the forecast wholesale electricity price is for the energy market, the operating schedule for the controller may specify optimal time intervals for use of the energy storage asset in the regulation market. For example, if the forecast wholesale electricity price for the energy market is projected to fall below a predetermined threshold value during a time interval, the operating schedule for the controller may recommend of the energy storage asset in the regulation market during that time interval. Where the forecast wholesale electricity price for the energy market is projected to fall below a predetermined threshold value during a time interval, the operating schedule for the controller may recommend use of the energy storage asset in the regulation market during that time interval.

According to an example of the principles herein, the wholesale electricity market may include both the energy market and the regulation market, and the operating schedule generated may facilitate implementation of the energy storage asset in both the energy market and the regulation market. According to a principle of virtual partitioning described herein, the operating schedule for the controller may be configured so that the data center site may participate in both the energy market and the regulation market concurrently the energy storage asset. In a non-limiting example, the operating schedule for the controller of the energy storage asset may specify that, during a given time interval, a first portion of an available state of charge (SOC) of the energy storage asset may be used in the energy market and a second portion of the available SOC of the energy storage asset may be committed to the regulation market. The operating schedule generate for the controller may be used to energy-related revenue for the energy consumer based on both the energy market and the regulation market. The principles and implementations described above in connection to FIG. 1 are also applicable to a system operating according to the principles of virtual partitioning.

The apparatus 10 illustrated in FIG. 2 may be used to implement the virtual partitioning described herein. In this non-limiting example, the at least one memory 12 is configured to store processor-executable instructions 14 and a mathematical model 15 for the at least one energy storage asset, where the mathematical model determines the operating schedule for the controller based on data 16 associated with parameters, including but not limited to, an operation characteristic of the energy storage asset, an operation characteristic of the energy consuming asset in communication with the at least one energy storage asset, and a forecast wholesale electricity price associated with the wholesale electricity market.

In this non-limiting example of virtual partitioning, the at least one processing unit 13 executes the processor-executable instructions 14 stored in the memory 12 at least to determine the operating schedule for the controller of the energy storage asset using the mathematical model 15, where the operating schedule specifies, during a time interval less than time period T, a proportion of an available state of charge (SOC) of the energy storage asset for use in the energy market and a remaining proportion of the available SOC of the energy storage asset for use in the regulation market. The at least one processing unit 13 also executes processor-executable instructions 14 to control the communication interface 11 to transmit to the data center site 17 the operating schedule that has been determined for the controller and/or controls the memory 12 to store the determined operating schedule for the controller. In a non-limiting example, the processing unit 13 may execute processor-executable instructions 14 to control the communication interface 11 to transmit to the operating schedule directly to the controller.

In a non-limiting example, the operation characteristic of the at least one energy storage asset can be at least one of a state of charge, a charge rate, a degree of non-linearity of charge rate a discharge rate, a degree of non-linearity of discharge rate, a round trip efficiency, and a degree of life reduction. The proportion of the available SOC of the energy storage asset for use in the energy market may be supplied as a direct-current (DC) signal, while the remaining proportion of the available SOC of the energy storage asset for use in the regulation market may be delivered at a variable charge rate or variable discharge rate.

In an example where the energy storage asset is used in both the energy market and the regulation market, constraints may be placed on the total amount of energy used. For example, the total SOC of the energy storage asset over the time that it is used in both markets can be constrained to be depleted to no less than a minimum allowed SOC value or charged to no more than a maximal allowed SOC value. In an example, the sum of the proportion of the available SOC of the at least one energy storage asset for use in the energy market and the remaining proportion of the available SOC of the at least one energy storage asset for use in the regulation market can be constrained to be no less than a minimal allowed SOC and no more than a maximal allowed SOC. As a non-limiting example, the maximal allowed SOC of the energy storage asset may be set at 80%, and the minimal allowed SOC may be set at 20%.

Figure 3:
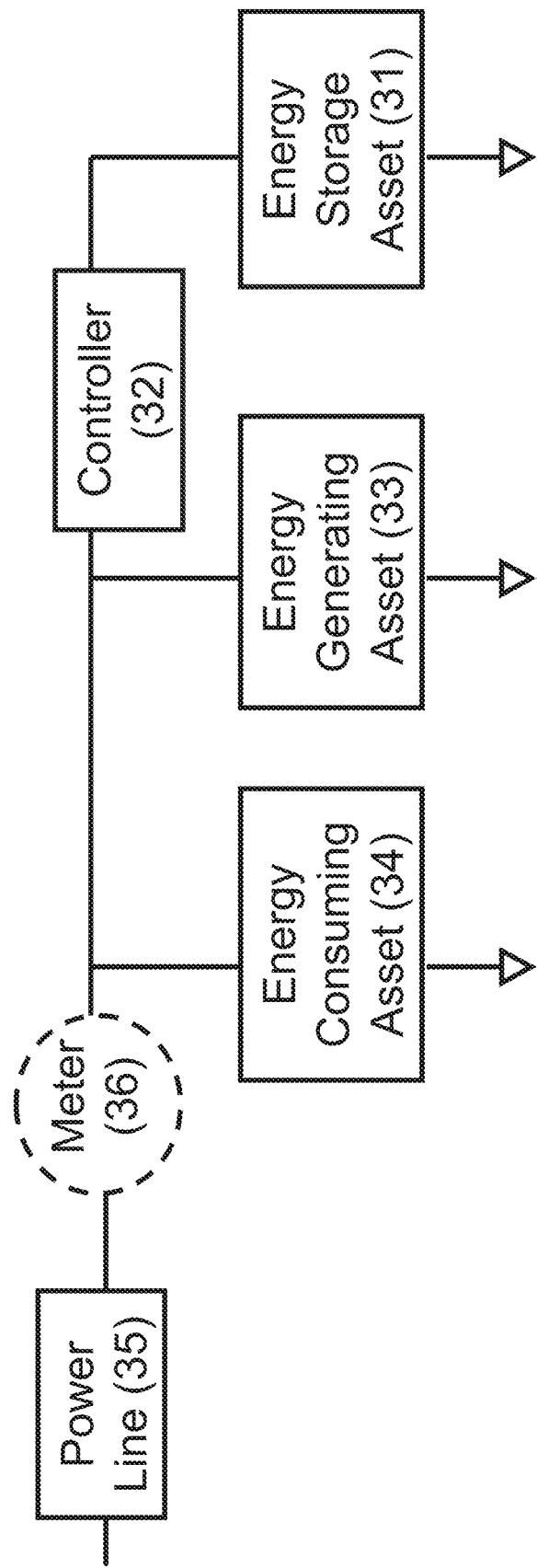
FIG. 3 shows an example system that includes an energy storage asset, a controller, an energy generating asset, and an energy consuming asset, according to a principle described herein.

The apparatuses and methods described herein are also applicable to a system as depicted in the example of FIG. 3. In this example, the apparatus includes an energy storage asset 31, a controller 32 in communication with the energy storage asset 31, an energy generating asset 33 and an energy consuming asset 34 in communication with a power line 35. The controller 32 in communication with the energy storage asset 31 facilitates charging of the energy storage asset 31 using the electricity supplied by power line 35. The controller 32 also facilitates feeding power generated by a discharge of the energy storage asset 31 to the power line 35. Non-limiting examples of energy generating assets include photovoltaic cells, fuel cells, gas turbines, diesel generators, flywheels, electric vehicles, and wind turbines. As depicted in the non-limiting example of FIG. 1, the controller 32, the energy storage asset 31, the energy generating asset 33, and the energy consuming asset 34 may be located behind a power meter 35. For example, all of the controller 32, the energy storage asset 31, the energy generating asset 33, and the energy consuming asset 34 may be located at one or more facilities of the energy consumer.

In the non-limiting example of FIG. 3, the controller 32 facilitates the communication between the energy consuming asset, the energy storage asset, and the energy generating asset. In other examples, the energy consuming asset may communicate with the energy storage asset via one or more other components including the controller 32.

An apparatus according to the principles of FIG. 2 may be implemented relative to the system of FIG. 3 to generate an operating schedule for the controller 32. In this example, the mathematical model facilitates determination of the operating schedule for the controller of the at least one energy storage asset further based at least in part on an expected energy-generating schedule of the energy generating asset in communication with the energy storage asset and the energy consuming asset. Any principles and/or implementations described herein, including above, in connection with FIG. 1 are also applicable to the system of FIG. 3.

Figure 4:
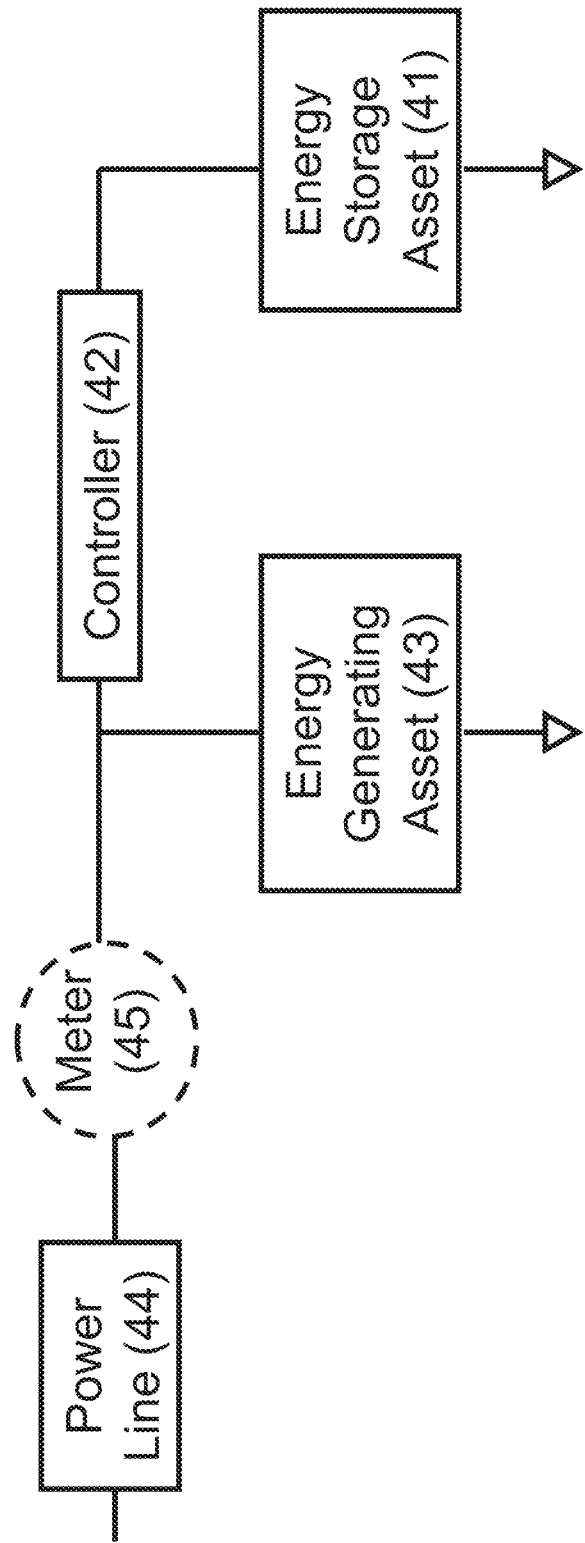
FIG. 4 shows an example system that includes an energy storage asset, a controller, and an energy generating asset, according to a principle described herein.

The apparatuses and methods described herein are also applicable to a system as depicted in the example of FIG. 4. In this example, the apparatus includes an energy storage asset 41, a controller 42 in communication with the energy storage asset 41, and an energy generating asset 43 in communication with a power line 44. The controller 42 facilitates charging of the energy storage asset 31 using the electricity supplied by power line 44. The controller 42 also facilitates feeding power generated by a discharge of the energy storage asset 41 to the power line 44. Non-limiting examples of energy generating assets include photovoltaic cells, fuel cells, gas turbines, diesel generators, flywheels, electric vehicles, and wind turbines. As depicted in the non-limiting example of FIG. 4, the controller 42, the energy storage asset 41, and the energy generating asset 43 may be located behind a power meter 45. For example, all of the controller 42, the energy storage asset 41, and the energy generating asset 33 may be located at one or more facilities of the energy consumer.

In the non-limiting example of FIG. 4, the controller 42 facilitates the communication between the energy storage asset and the energy generating asset. In other examples, the energy consuming asset may communicate with the energy storage asset via one or more other components including the controller 42.

An apparatus according to the principles of FIG. 2 may be implemented relative to the system of FIG. 4 to generate an operating schedule for the controller 42. In this example, the mathematical model facilitates determination of the operating schedule for the controller of the at least one energy storage asset further based at least in part on an expected energy-generating schedule of the energy generating asset in communication with the energy storage asset. Any principles and/or implementations described herein, including above, in connection with FIG. 1 are also applicable to the system of FIG. 4.

In a non-limiting example, the apparatus of FIG. 2 can be used for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the data center site over the time period T is based at least in part on a wholesale electricity market. In this example, the apparatus includes at least one communication interface, at least one memory to store processor-executable instructions and a mathematical model for the at least one energy storage asset, and at least one processing unit. The mathematical model facilitates determination of the operating schedule for the controller based at least in part on an operation characteristic of the at least one energy storage asset, an expected energy-generating schedule of the energy generating asset in communication with the energy storage asset, and a forecast wholesale electricity price associated with the wholesale electricity market. The at least one processing unit can be configured to determine the operating schedule for the controller of the at least one energy storage asset using the mathematical model, and control the at least one communication interface to transmit to the data center site the operating schedule for the controller of the at least one energy storage asset and/or controls the at least one memory so as to store the determined operating schedule for the controller.

In this example, the at least one processing unit can be configured to determine the operating schedule for the controller of the at least one energy storage asset using the mathematical model by minimizing a net energy-related cost over the time period T. The net-energy related cost is based at least in part on the amount of energy generation by the at least one energy generating asset, electricity generation by the at least one energy storage asset; and electricity consumption by the at least one energy storage asset. The energy-related revenue available to the data center site is based at least in part on the minimized net energy-related cost. The net energy-related cost may be specified as a difference between an electricity supply cost and an economic demand response revenue over the time period T. The energy generating asset may be a photovoltaic cell, a fuel cell, a gas turbine, a diesel generator, a flywheel, an electric vehicle, or a wind turbine. The operation characteristic of the at least one energy storage asset may be a state of charge, a charge rate, a degree of non-linearity of charge rate a discharge rate, a degree of non-linearity of discharge rate, a round trip efficiency, or a degree of life reduction.

In another non-limiting example, the apparatus of FIG. 2 can be used for determining an operating schedule of a controller of at least one energy storage asset operated by an energy customer of an electricity supplier, so as to generate energy-related revenue, over a time period T, associated with operation of the at least one energy storage asset according to the operating schedule. The energy-related revenue available to the data center site over the time period T is based at least in part on a wholesale electricity market, and the wholesale electricity market includes an energy market and a regulation market. In this example, the apparatus includes at least one communication interface, at least one memory to store processor-executable instructions and a mathematical model for the at least one energy storage asset, and at least one processing unit. The mathematical model facilitates a determination of the operating schedule for the controller based at least in part on an operation characteristic of the at least one energy storage asset, an expected energy-generating schedule of an energy generating asset in communication with the energy storage asset, a forecast wholesale electricity price associated with the energy market, and a regulation price associated with the regulation market. The at least one processing unit is configured to determine the operating schedule for the controller of the at least one energy storage asset using the mathematical model by minimizing a net energy-related cost over the time period T. The net-energy related cost is based at least in part on the amount of energy generation by the at least one energy generating asset, duration of energy storage asset participation in the regulation market, electricity generation by the at least one energy storage asset and electricity consumption by the at least one energy storage asset. The energy-related revenue available to the data center site is based at least in part on the minimized net energy-related cost. The operating schedule specifies, during a time interval within the time period T, a first portion of an available output of the controller for use in the energy market and a second portion of the available output of the controller for use for use in the regulation market. The at least one processing unit is also configured to control the at least one communication interface to transmit to the data center site the operating schedule for the controller of the at least one energy storage asset and/or controls the at least one memory so as to store the determined operating schedule for the controller.

In this example, the available output of the controller may be a charge rate of the at least one energy storage asset or a discharge rate of the at least one energy storage asset. The net energy-related cost is specified as a difference between an electricity supply cost and an economic demand response revenue over the time period T. The operation characteristic of the at least one energy storage asset may be a state of charge, a charge rate, a degree of non-linearity of charge rate a discharge rate, a degree of non-linearity of discharge rate, a round trip efficiency, and a degree of life reduction.

Figure 5:
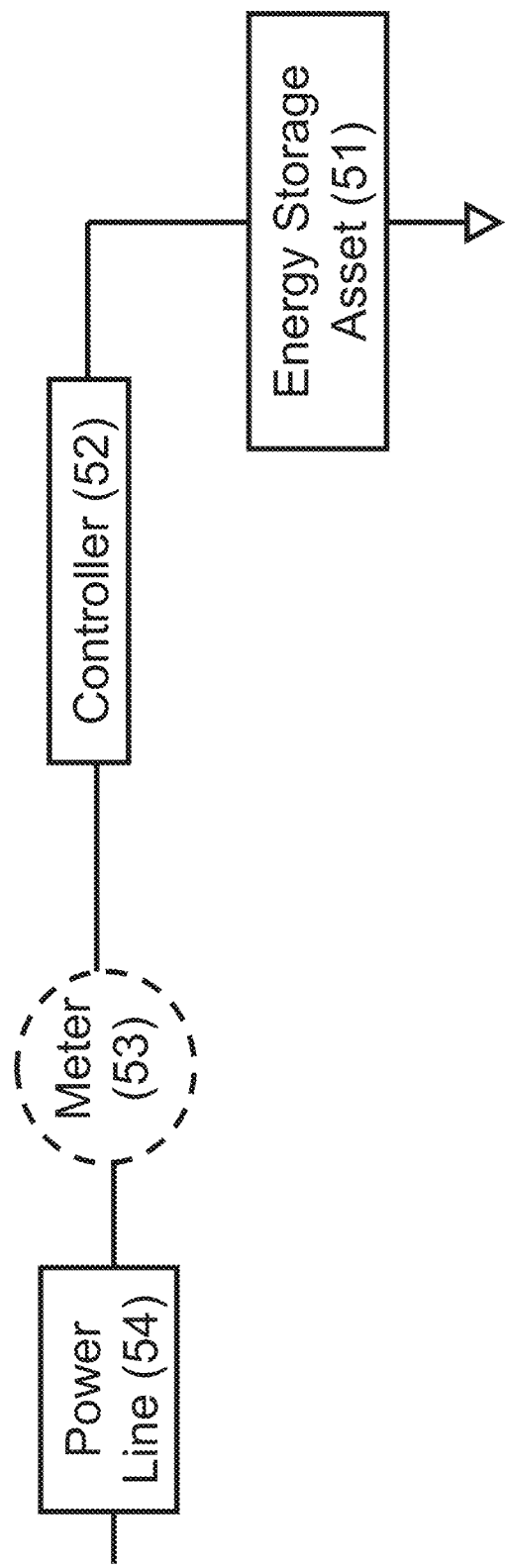
FIG. 5 shows an example system that includes an energy storage asset and a controller, according to a principle described herein.

The apparatuses and methods described herein are also applicable to a system as depicted in the example of FIG. 5. In this example, the apparatus includes an energy storage asset 51, and a controller 52 in communication with the energy storage asset 51 and in communication with a power line 54. The controller 52 facilitates charging of the energy storage asset 31 using the electricity supplied by power line 54. The controller 52 also facilitates feeding power generated by a discharge of the energy storage asset 51 to the power line 54. Non-limiting examples of energy generating assets include photovoltaic cells, fuel cells, gas turbines, diesel generators, flywheels, electric vehicles, and wind turbines. As depicted in the non-limiting example of FIG. 5, the controller 52, and the energy storage asset 51 may be located behind a power meter 53. For example, the controller 52 and the energy storage asset 51 may be located at one or more facilities of the energy consumer.

In the non-limiting example of FIG. 5, the controller 52 facilitates the communication between the energy storage asset and the energy generating asset. In other examples, the energy consuming asset may communicate with the energy storage asset via one or more other components including the controller 52.

An apparatus according to the principles of FIG. 2 may be implemented relative to the system of FIG. 5 to generate an operating schedule for the controller 52. In this example, the mathematical model facilitates determination of the operating schedule for the controller of the at least one energy storage asset further based at least in part on an expected energy-generating schedule of the energy generating asset in communication with the energy storage asset. Any principles and/or implementations described herein, including above, in connection with FIG. 1 are also applicable to the system of FIG. 5.

In another non-limiting example, the apparatus of FIG. 2 can be used for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the data center site over the time period T is based at least in part on a wholesale electricity market, and wherein the wholesale electricity market includes an energy market and a regulation market. The apparatus includes at least one communication interface, at least one memory to store processor-executable instructions and a mathematical model for the at least one energy storage asset, and at least one processing unit. The mathematical model facilitates a determination of the operating schedule for the controller of the at least one energy storage asset based at least in part on an operation characteristic of the at least one energy storage asset, a forecast wholesale electricity price associated with the energy market, and a regulation price associated with the regulation market. The at least one processing unit is configured to determine the operating schedule for the controller of the at least one energy storage asset using the mathematical model by minimizing a net energy-related cost over the time period T. The net-energy related cost is based at least in part on the duration of energy storage asset participation in the regulation market, electricity generation by the at least one energy storage asset, and electricity consumption by the at least one energy storage asset. The energy-related revenue available to the data center site is based at least in part on the minimized net energy-related cost. The operating schedule specifies, during a time interval within the time period T, a first portion of an available output of the controller for use in the energy market and a second portion of the available output of the controller for use for use in the regulation market. The at least one processing unit is also configured to control the at least one communication interface to transmit to the data center site the operating schedule for the controller of the at least one energy storage asset and/or controls the at least one memory so as to store the determined operating schedule for the controller.

In this example, the available output of the controller is a charge rate of the at least one energy storage asset or a discharge rate of the at least one energy storage asset. The net energy-related cost may be specified as a difference between an electricity supply cost and an economic demand response revenue over the time period T. The operation characteristic of the at least one energy storage asset is a state of charge, a charge rate, a degree of non-linearity of charge rate a discharge rate, a degree of non-linearity of discharge rate, a round trip efficiency, or a degree of life reduction.

Energy Asset Modeling

To facilitate the mathematical optimization process for generating a suggested operating schedule for one or more energy assets according to various examples of the principles herein, a mathematical model representing a data center site's energy asset(s) is formulated and employed to simulate an "energy profile" for the asset(s). In one aspect, the model is essentially specified by one or more mathematical functions that at least in part represent physical attributes of the energy asset(s) themselves as they relate to electricity use and/or electricity generation. Depending on the energy asset(s) operated by the data center, the mathematical function(s) defining an asset model may represent a single energy asset or an aggregation of multiple energy assets operated by the data center site. For purposes of the discussion herein, the term "asset model," unless otherwise qualified, is used generally to denote a model representing either a single energy asset or an aggregation of multiple energy assets.

To illustrate the general concept of an asset model, a model is first considered for one or more energy assets that not only may be turned "on" or "off," but that may be controlled at various "operating set points." For example, consider the case of a "building asset," e.g., one or more buildings including a heating, ventilation and air conditioning (HVAC) system for temperature control, for which the data center site may choose different temperature set points at different times (e.g., thermostat settings); accordingly, in this example, the temperature set points constitute "operating set points" of the building asset. In this example, the magnitude of the operating set point may vary as a function of time t, in a continuous or step-wise manner (e.g., Temp(t)=72 degrees F. for 9 PM<t<9 AM; Temp(t)=68 degrees F. for 9 AM<t<9 PM). In other examples of energy assets that merely may be turned "on" or "off," the magnitude of the operating set point may be binary (i.e., on or off), but the respective on and off states may vary as a function of time t (e.g., over a given time period T).

Based on the notion of time-varying operating set points for energy assets, the term "operating schedule" as used herein refers to an operating set point of one or more energy assets as a function of time, and is denoted by the notation SP(t):

$SP(t)$=operating schedule for one or more energy assets.

The amount of energy used (and/or generated) by a particular asset or group of assets in a given time period T is referred to herein as an "energy profile." In various implementations discussed herein, the energy profile of one or more assets often depends at least in part on a given operating schedule SP(t) for the asset(s) during the time period T. For a fixed-load asset, the energy profile may not depend on a given operating schedule SP(t). Accordingly, an energy asset model specifies one or more mathematical functions for calculating an energy profile (i.e., electricity use and/or electricity generation as a function of time) for the asset(s), based on a proposed operating schedule for the asset(s) applied as an input to the model. The one or more functions constituting the asset model are denoted herein generally as F (and for simplicity the term "function" when referring to F may be used in the singular), and the model may be conceptually represented using mathematical notation as:

$$F(SP(t))=EP(t),\qquad\text{Eq. 1}$$

where the operating schedule SP(t) is an argument of the function F, and the energy profile of the modeled asset(s) as a function of time is denoted as EP(t). In a non-limiting example, EP(t) has units of MWh. FIG. 6 illustrates a simple block diagram representing the asset model given by Eq. 1.

In various examples, the function(s) F defining a particular asset model may be relatively simple or arbitrarily complex functions of the argument SP(t) (e.g., the function(s) may involve one or more constants, have multiple terms with respective coefficients, include terms of different orders, include differential equations, etc.) to reflect how the asset(s) consume or generate energy in response to the operating schedule SP(t). In general, the particular form of a given function F, and/or the coefficients for different terms, may be based at least in part on one or more physical attributes of the asset(s), and/or the environment in which the asset(s) is/are operated, which may impact the energy profile of the asset(s) pursuant to the operating schedule. More specifically, depending on the type of energy asset(s) being modeled, the mathematical model may be formulated to accept other inputs (in addition to the operating schedule SP(t)), and/or to accommodate variable parameters of a given function F (e.g., via time-dependent coefficients of different terms of the function), to facilitate calculation of the energy profile EP(t) based on a proposed operating schedule SP(t).

For example, in the case of the building asset discussed above, and/or other assets for which thermodynamic considerations are pertinent, various internal factors that may impact the asset's energy profile in general (e.g., building occupancy; a presence of equipment such as computers and other instrumentation that may affect heating or cooling in an environment; thermal inertia due to insulation, building materials, windows; etc.) may be considered in the formulation of the form of the function F itself, and/or coefficients for different terms of the function F. In some examples discussed in further detail below, the function F may be dynamically adjusted based on observing actual energy usage over time by the asset(s) pursuant to control via a particular operating schedule (i.e., coefficients of function terms initially may be estimated, and subsequently adjusted over time based on real-time feedback from controlled assets).

Similarly, the mathematical model for the asset(s) may be configured to consider as an input to the model actual or forecast ambient environmental conditions (e.g., temperature, humidity, ambient light/cloud cover, etc.) as a function of time, collectively denoted as "weather information" W(t), which may impact the energy profile of one or more assets. In this case, the model may be conceptually represented as:

$$F(SP(t),W(t))=EP(t),\qquad\text{Eq. 2}$$

where both the operating schedule SP(t) and the weather information W(t) are arguments of the function F. FIG. 7 illustrates a simple block diagram representing the asset model given by Eq. 2. It should be appreciated that, while weather information W(t) is noted above as providing another possible input to the model in addition to the operating schedule SP(t), in other examples one or more other inputs to the model may be provided and considered as arguments to the function F (and accordingly taken into consideration in the function) for purposes of calculating an energy profile EP(t) for the asset(s).

In another example herein, the mathematical model for a system that includes a controllable asset, such as an energy storage asset and an associated controller, may be configured to consider as an input to the model the control vector for the controller as a function of time, denoted as u(t), which may impact the energy profile. In this case, the model may be conceptually represented as:

$$F(u(t))=EP(t),\qquad \text{Eq. 3}$$

where both the control vector of the controller is an argument of the function F. FIG. 8 illustrates a simple block diagram representing the asset model given by Eq. 3. It should be appreciated that, while the control vector u(t) is noted above as providing input to the model, in other examples, one or more other inputs to the model may be provided and considered as arguments to the function F (and accordingly taken into consideration in the function) for purposes of calculating an energy profile EP(t) for the asset(s). An energy storage asset herein generally refers to an asset that can store a form of energy and release it as usable energy (or power) over time. Non-limiting examples of energy storage assets include batteries, ice units, compressed air, flywheel, heated liquids, and heated solids. Non-limiting examples of batteries include lithium ion batteries, lead-acid batteries, flow batteries, or dry cell technology batteries.

In yet another example herein, the mathematical model for a system that includes an energy consuming asset, such as but not limited to a building asset, and a controllable asset, such as but not limited to an energy storage asset and an associated controller, may be configured to consider as an input to the model the control vector for the controller as a function of time, denoted as u(t), and temperature dependent operating set points for the energy consuming asset (its operating schedule). In this case, the model may be conceptually represented as:

$$F(u(t),SP(t))=EP(t),\qquad \text{Eq. 4}$$

where both the control vector of the controller is an argument of the function F. FIG. 9 illustrates a simple block diagram representing the asset model given by Eq. 4. The control vector for a controller, $\underline{u}(t)=C_t+D_t$, may be expressed as:

$$C_t=u_{1,t}*C/D_{max}$$

$$D_t=u_{2,t}*C/D_{max}\qquad \text{Eq. 5}$$

with the constraints that $u_{1,t}*u_{2,t}=0$ and $0 \le u_{1,t}, u_{2,t} \le 1$, where represents $C/D_{max}$ the maximum charge rate or discharge rate capacity of the controller in communication with the energy storage asset.

In yet another example herein, the mathematical model for a system that includes an energy consuming asset, such as but not limited to a building asset, and a controllable asset, such as but not limited to an energy storage asset and an associated controller, may be configured to consider as an input to the model the control vector for the controller as a function of time, denoted as u(t), and temperature dependent operating set points for the energy consuming asset (its operating schedule). FIG. 10 illustrates a simple block diagram representing the asset model for such as system according to the principles herein. In this case, the model may have outputs of the state of charge ($SOC_t$) of the energy storage asset as a function of time t, the return-a-temperature ($RAT_t$) as a function of time t (for, e.g., a HVAC or other similar equipment), and the energy profile of the energy consuming asset (e.g., the building asset). Other inputs to the system can be weather information (W(t)) and/or feedback from other energy assets in the system (V). This model can be used, e.g., for co-optimization of an energy storage asset and an energy consuming asset for the energy market.

In an example according to a principle herein, once an appropriate asset model is established for a given energy asset or group of energy assets, different candidate operating schedules may be applied to the model to simulate how the energy profile EP(t) of the asset(s) is affected as a function of time, over a given time period T, by the different operating schedules.

An example technique for facilitating determination of optimal operating schedule for energy cost reduction and/or revenue generation from wholesale electricity markets according to various examples disclosed herein is as follows. In this example, the system includes an energy consuming asset, a controller of the energy storage asset, and a controllable energy consuming asset. A plurality of first candidate operating schedules is selected for the controller, and a plurality of second candidate operating schedules is selected for the energy consuming asset. Each second candidate operating schedule for the energy consuming asset is different from the BAU operating schedule for the energy consuming asset. The plurality of first and second candidate operating schedules are successively applied to the mathematical model to generate corresponding plurality of simulated energy profiles for the energy storage asset and the energy consuming asset. A plurality of projected net energy-related costs to the data center site are computed, where each projected net energy-related cost is computed based at least in part on the representative CBL energy profile and the simulated energy profiles corresponding to the respective first and second candidate operating schedules and the forecast wholesale electricity price. Respective ones of the first and second candidate operating schedules corresponding to one simulated energy profile of the plurality of simulated energy profiles that results in a minimum net energy-related cost of the plurality of net energy-related costs calculated are selected as an optimal first operating schedule and an optimal second operating schedule. That is, namely, this technique can be implemented to simulate how energy assets consume/generate electricity based on different candidate operating schedules for the asset(s), and to select a particular operating schedule that facilitates a particular economic goal of the energy customer.

In another example, the operating schedules for the energy storage asset and energy consuming asset can be calculated in tandem based on minimizing the net energy-related costs (NEC), as discussed in greater detail below.

Operating Schedules and Constraints

In considering various operating schedules SP(t) that may be applied to the asset model so as to simulate a corresponding energy profile EP(t), in some instances SP(t) may not be varied freely. Such limitations on candidate operating schedules may be due at least in part to physical limitations of the asset(s) being modeled, and/or limitations on operation of the asset(s) of the data center site dictated by the energy customer itself. For example, in some instances the customer may want to constrain the range in which the magnitude of SP(t) may be varied at any given time, and/or the customer may wish to designate particular periods of time (e.g., within the given time period T of interest) during which particular values of SP(t) cannot be changed (or only changed in a limited manner).

For purposes of illustration, again consider a building asset with an HVAC system. The customer may specify that, in considering candidate operating schedules SP(t) for the building asset, temperature set points (i.e., the magnitude of SP(t) in this example) must remain in a range of from between 65 to 75 degrees F. in any proposed operating schedule; furthermore, the customer may dictate that during a certain time frame, the temperature set point may not exceed 70 degrees F. or 80 F. In general, magnitude and/or timing limitations placed on a candidate operating schedule SP(t) for one or more modeled assets are referred to herein as "constraints" on the operating schedule.

The concept of candidate operating schedules for one or more modeled energy assets subject to one or more "constraints" is denoted herein as:

$SP(t)|_{constraints}$=operating schedule for one or more energy assets subject to constraints In an example, the system includes an energy storage asset, and constraint may be placed on the allowed state of charge (SOC) of the energy storage asset. For example, the constraint may be placed that the SOC does should not be allowed to fall below a minimal SOC value (i.e., not too depleted) and/or that the SOC does should not be allowed to go above a maximal SOC (i.e., not overly-charged).

Business-as-Usual (BAU) Conditions and Customer Baseline (CBL) Energy Profiles

Once an appropriate asset model is established for a given energy asset or group of energy assets, a particular operating schedule of interest in some examples is referred to herein as a "typical" or "business-as-usual" (BAU) operating schedule (also referred to herein as "BAU conditions"), denoted as $SP(t)_{BAU}$. In particular, "BAU conditions" refer to an operating schedule that a data center site would typically adopt for its energy asset(s), absent the incentive to reduce energy costs and/or earn energy-related revenue from wholesale electricity markets. Again turning to the example of a building asset for purposes of illustration, absent any incentive to change its behavior, during a summer season in which cooling is desired a data center site may typically set the thermostat (i.e., temperature set points) for the building asset at 72 degrees F. from 9 PM to 9 AM, and at 68 degrees F. from 9 AM to 9 PM; this can be represented conceptually using the notation adopted herein as:

$$SP(t)_{BAU} = \begin{cases} 72, & 9PM < t < 9AM \\ 68, & 9AM < t < 9PM \end{cases}.$$

When a typical operating schedule $SP(t)_{BAU}$ is applied to the asset model, the particular energy profile generated by the model is a special case referred to herein as a simulated "customer baseline" (CBL) energy profile, denoted as CBL (t). Using the example relationship given in Eq. 2 above (which includes consideration of weather information), the special case of a CBL energy profile may be conceptually represented mathematically as:

$F(SP(t)_{BAU}, W(t))=CBL(t)$, Eq. 6 where the typical operating schedule $SP(t)_{BAU}$ is an argument of the function F (in this example together with the weather information W(t)), and the CBL energy profile of the modeled asset(s) as a function of time is denoted as CBL(t).

Although consideration of weather information W(t) is included in the example above, it should be appreciated that the simulation of a customer baseline (CBL) energy profile in other examples may not consider weather information (as such information may not be relevant to the energy profile of the asset(s) in question). It should also be appreciated that while the simulation of a CBL energy profile may be useful for mathematical optimization techniques employed in some examples to facilitate energy cost reduction and/or revenue generation from particular wholesale electricity markets (e.g., economic demand response "energy markets"), simulation of a CBL energy profile may not be applicable or necessary in other examples to facilitate energy cost reduction and/or revenue generation from wholesale electricity markets.

Objective Cost Functions and Optimal Control

For purposes of the present disclosure, an "objective cost function" specifies all energy-related costs and energy-related revenues associated with operating one or more modeled energy assets of a data center site so as to achieve a particular economic goal (an economic "objective"). In one aspect, an objective cost function incorporates the function(s) F representing the mathematical model for one or more energy assets, and specifies a data center site's "net energy-related cost" (e.g., in dollars) associated with operating the modeled asset(s) over a given time period T. The data center site's net energy-related cost as given by the objective cost function is denoted herein as NEC$:

NEC$=net energy-related cost to operate one or more energy assets.

As discussed in greater detail below, objective cost functions providing a net energy-related cost NEC$ according to different examples may have a variety of respective cost and revenue terms, based at least in part on the types of asset(s) being operated and the particular revenue-generation objective(s) (e.g., the particular wholesale electricity market(s) from which revenue is being sought).

For example, in some examples, the energy-related costs included in the objective cost function may include "actual" energy-related costs (e.g., retail electricity costs, wholesale electricity costs representing revenue earned by the data center site, etc.). In some examples, the energy-related costs included in the objective cost function additionally or alternatively may include "indirect" energy-related costs, such as convenience/comfort costs associated with the data center site's adoption of a suggested operating schedule different than the BAU operating schedule (the convenience/comfort cost represents an "indirect" cost associated with a change in the customer's behavior with respect to operating its asset(s), based on the incentive of possible energy-related revenue from the wholesale electricity markets). In an example, energy-related costs included in the objective cost function may include reliability costs associated with voltage/VAR control in a microgrid application. Similarly, an objective cost function may include one or more terms specifying energy-related revenues corresponding to one or more wholesale electricity markets (e.g., "energy markets," "synchronized reserve," "regulation").

To provide a preliminary illustration of concepts germane to an objective cost function specifying a net energy-related cost NEC$, an example relating to economic demand response revenue from the wholesale electricity "energy markets" is first considered. To this end, retail electricity prices (i.e., what the data center site pays a "utility" for electricity usage) and wholesale electricity-related product prices available to the data center site respectively are denoted as:

Retail$(t)=price of electricity from a retail electricity provider ("utility"); and Wholesale$(t)=price of electricity-related product on applicable wholesale electricity market, where the retail electricity price Retail$(t) and the wholesale electricity-related product price Wholesale$(t) may vary independently of each other as a function of time. In an example, the units of the retail electricity price Retail$(t) and the wholesale electricity-related product price Wholesale$(t) are $/MWh.

The wholesale price Wholesale$(t) can be dictated by (e.g., based at least in part on) the "locational marginal price" (LMP) as a function of time, as noted above (see Background section). However, depending on a given wholesale electricity market and/or a particular electricity-related product in question, it should be appreciated that the wholesale price Wholesale$(t) may be based on other and/or additional factors. Also, practically speaking, wholesale prices are not continuous functions of time; rather, as discussed above, wholesale prices based on the LMP may be calculated periodically at specified nodes of the grid (e.g., every 5 minutes, every half-hour, every hour) depending on the particular market in which the data center site is participating. Accordingly, it should be appreciated that Wholesale$(t) typically is a discrete function of time, with t having some periodicity (e.g., 5 minutes, 30 minutes, 60 minutes).

Given the notation above for retail and wholesale prices, the data center site's modeled retail electricity costs (or "supply costs"), for operating one or more modeled electricity-consuming assets pursuant to a particular operating schedule SP(t) applied to an asset model, is denoted herein as Supply$(t), given by:

$$\text{Supply\$}(t) = EP(t) * \text{Retail\$}(t), \qquad \text{Eq. 7}$$

wherein EP(t) is the energy profile of the modeled asset(s) (e.g., given by any of Eqs. 1-4 above).

For the energy storage asset, the data center site's "supply costs" for charging the asset can be denoted herein as Supply$(t)$_{ES}$, given by:

$$\text{Supply\$}(t)_{ES} = EP(t) * \text{Retail\$}(t), \qquad \text{Eq. 8}$$

wherein EP(t) is the energy profile of the modeled energy storage asset(s). Since the energy profile for an energy storage asset can be represented based on a charge rate ($C_t$) for a time step (t<T) over the amount of time of charging ($\Delta t$), the supply costs can be expressed as:

$$\text{Supply\$}(t)_{ES} = C_t * \Delta t * \text{Retail\$}(t). \qquad \text{Eq. 9}$$

The charge rate ($C_t$) may be the maximum charge rate of the energy storage asset, or a charge rate less than the maximum charge rate. For example, in different examples herein, the output of the controller may modify the charge rate of the energy storage asset to values that are less than the maximum charge rate.

If the system includes an energy storage asset and an energy generating asset, the total supply costs can be expressed, in a non-limiting example, as the energy storage asset (Supply$(t)$_{ES}$) reduced by a cost amount based on the amount of energy provided by the energy generating asset ($EG_k$). In an example, the total supply costs can be expressed as:

$$\text{Supply\$}(t)_{total} = (C_k - EG_k) * \Delta t * \text{Retail\$}(t). \qquad \text{Eq. 10}$$

Supply costs may also apply to the system by virtue of an emissions cost associated with the operation of at least one of the energy assets. That is, the net-energy related cost can include a term based on the emissions costs (Emissions$) associated with, as non-limiting examples, the electricity consumption by an energy consuming asset or an emissions cost based on operation of an energy generating asset. The emissions costs can be associated with greenhouse gas emissions during operation of the system. Non-limiting examples of such emissions are $CO_x$ emissions (e.g., carbon monoxide and carbon dioxide emissions), $NO_x$ emissions (e.g., nitrogen dioxide and related pollutant emissions), $SO_x$ emissions (e.g., sulfur dioxide and related pollutant emissions), particulates, and methane ($CH_4$) and related pollutant emissions. In an example, the contribution to the supply costs (Supply$(t)) based on the emissions costs (Emissions$) may be computed based on an economic benefit, such as but not limited to a prorated amount of a penalty cost leveled due to an amount of emissions, over a time period T, associated with the operation of the at least one energy asset. The penalty cost may be in staged amounts. For example, a first penalty may be imposed for an amount of emissions above a first threshold value but below a second threshold emissions value, and a second (higher) penalty may be imposed for an amount of emissions above the second threshold emissions value. Such penalties may be leveled by a government agency (in a command-and-control program, a regulation program, or a voluntary program) or may be determined based on participation in a non-governmental voluntary emissions reduction program. In another example, the contribution to the supply costs based on the emissions costs may be computed based on a trading price of an emissions credit based on an amount of emissions, such as but not limited to a trading price of a carbon credit based on $CO_x$ emission (also an economic benefit). For example, trading on financial markets may be performed under the Kyoto Protocol. As another example, trading may occur under a U.S. regional emissions reduction program, such as but not limited to the Regional Greenhouse Gas Initiative (RGGI).

The contribution to the (Supply$(t)) based on the emissions costs (Emissions$) may be computed based on base emissions cost for a minimal level of operation of the energy asset(s), over time period T, and a marginal emissions cost per megawatt with each increase or decrease in megawatt of operation. In an example, the marginal emissions cost can be computed based on a change in the amount of emissions generated by an energy generating asset that is in communication with the at least one energy asset, associated with the increase or decrease in megawatt of operation. As a non-limiting example, where the energy generating asset is a diesel generator, the emissions costs can include a term representing the amount of emissions by virtue of use of diesel fuel. In an example, the marginal emissions cost can be computed based on a marginal supplier emissions cost associated with a change in electricity usage by the data center site associated with the increase or decrease in megawatt of operation. The marginal supplier emissions cost can be quantified based on an amount of emissions from an electricity generating facility of the electricity supplier per megawatt-hour of electricity supplied. The marginal supplier emissions cost can very based on the type of electricity generation facility. As an example, the emissions from a coal-based electricity generation facility can be higher than the emissions from a hydro-power electricity generation facility or a gas-powered electricity generation facility. In this example, the marginal supplier emissions cost for a coal-based electricity generation facility for each incremental increase or decrease in megawatt-hour of electricity supplied can be higher than the marginal supplier emissions cost for a hydro-power electricity generation facility or the marginal supplier emissions cost for a gas-powered electricity generation facility.

The emissions costs (Emissions$) can be computed based on a change in the data center site's behavior in reducing its electricity usage based on an operation of the at least one energy asset. For example, the emissions cost can be specified as a cost function based at least in part on at least one difference between the data center site's behavior in reducing its usage of the energy asset(s) and their BAU operating schedule. In an example, the energy asset(s) can include at least one building having a variable internal temperature controlled by a HVAC system, and the emissions cost is based on a difference between a candidate temperature set point for the HVAC system as a function of time and the BAU temperature set point. The emissions cost can be computed as proportional to the magnitude of deviation of the temperature of the building from a BAU temperature set point.

Supply costs may also apply to the system by virtue of the reduction in life of the energy storage asset. An energy storage asset may have a limited life depending on its rating of expected charge/discharge cycles. A portion of the costs associated with ultimately replacing an energy storage asset at the end of its lifetime may be included in the supply costs based on the number of charge/discharge cycles it is expected to undergo when implemented in an energy market and/or a regulation market as described herein. The lifetime reduction supply costs may also depend on the number of kWh is used in each charge or discharge cycle, and/or for what length of time the energy storage asset is used in a market (energy, regulation, etc.). For example, the contribution to the supply costs based on the replacement cost (Replacement$) may be computed according to the expression:

$$\text{Supply\$}(t)_{LIFE} = \text{Replacement\$}/n \qquad \text{Eq. 11}$$

where n represents an effective number of charge/discharge cycles. The effective number of charge/discharge cycles can depend on the number of cycles the asset is expected to undergo when implemented in an energy market and/or a regulation market, the number of kWh is used in each charge or discharge cycle, and/or for what length of time the energy storage asset is used in a given market. This lifetime supply cost would be additive to any of the expressions for supply costs described herein for a system that includes an energy storage asset.

With respect to economic demand response revenue from the wholesale electricity energy markets, in the present example it is presumed that the data center site is amenable to operating its energy asset(s) pursuant to a candidate operating schedule that is different than its "typical operating schedule" or BAU conditions (i.e., $SP(t)_{BAU}$), such that the energy profile $EP(t)$ of the asset(s) will be on average lower than the customer baseline $CBL(t)$ (see Eq. 6 and related description above). Altering the energy profile of the asset(s) with respect to the customer baseline, pursuant to a change in behavior represented by a candidate operating schedule different than BAU conditions, provides the source of opportunity for generating economic demand response revenue from the wholesale electricity energy markets. Accordingly, a wholesale electricity energy market "demand response revenue," denoted herein as $DR\$(t)_{EM}$, is given generally by:

$$DR\$(t)_{EM} = \max\{0, [(CBL(t) - EP(t)) * \text{Wholesale\$}(t)]\}. \qquad \text{Eq. 12}$$

In an example, the DR$(t) represents the net difference between actual net metered load and the BAU load. The participation of any component of the energy asset in the energy market, regulation market or spinning reserve market is included in the computation of DR$(t) to the extent they affect the value of the metered load. In addition, the energy generated by any energy generating asset that is part of the energy asset may also be included in the computation of DR$(t) to the extent this behind-the-meter generated energy affects the value of the metered load.

For an energy storage asset in an energy market, a demand response revenue may be denoted herein as $DR\$(t)_{ES}$, is given generally by:

$$DR\$(t)_{ES} = (0 - (-(D_t)) * \Delta t * \text{Wholesale\$}(t). \qquad \text{Eq. 13}$$

As described herein, a system that includes an energy storage asset can participate in both an energy market (at a price of Wholesale$(t)) and in a regulation market (at a price of regulation$(t)). In this example, the demand response revenue may be computed herein as $DR\$(t)_{ES}$, denoted by:

$$DR\$(t)_{ES} = (\epsilon D_t) * \Delta t * \text{Wholesale\$}(t) + (\gamma D_t)$$
$$* \Delta t * \text{regulation\$}(t) \qquad \text{Eq. 14}$$

where $D_t$ denotes the discharge rate of the energy storage asset at a time step. Where the system participates in the energy market and the regulation market at different points in time during overall time period T, both multipliers of the discharge rate, $\epsilon$ and $\gamma$, may be equal to 1. In different examples herein, the output of the controller may modify the discharge rate of the energy storage asset to values that are less than the maximum discharge rate. Using the principles of virtual partitioning described herein, by apportioning an output of the controller in communication with the energy storage asset, a portion of the discharge rate may be directed to the regulation market and another portion directed to the energy market during a given time step. As a non-limiting example, the operating schedule determined as described herein may cause the controller to discharge the energy storage asset at a discharge rate of $\epsilon D_t$ to the energy market, while concurrently respond to the regulation market at a discharge rate of $\gamma D_t$ along shorter timescales (such as but not limited to at 2-second intervals or minute-by-minute time intervals). Here, the constraint on the values may be $\epsilon + \gamma \leq 1$ if $D_t$ represents the maximum discharge rate of the energy storage asset.

In a non-limiting example, where the regulation price is not based on the discharge rate, but rather depends only on the time period of commitment of the energy storage asset to the regulation market, the demand response revenue may be computed as:

$$DR\$(t)_{ES} = (\epsilon D_t) * \Delta t * \text{Wholesale\$}(t) + \text{regulation\$}(t) * \Delta t \qquad \text{Eq. 15}$$

In another example, the demand response revenue for a system that includes an energy storage asset and an energy generating asset participating in an energy market may be computed as:

$$DR\$(t)_{ES+EG} = (D_t)) * \Delta t * \text{Wholesale\$}(t) + (E_{EG}) * \text{Wholesale\$}(t) \qquad \text{Eq. 16}$$

where $D_t$ denotes the discharge rate of the energy storage asset at a time step and $E_{EG}$ denotes the energy provided by the energy generating asset.

According to the principles described herein, a demand response may also be generated for a system that includes an energy storage asset and an energy generating asset participating in both an energy market and a regulation market.

Based on the equations for supply costs and demand response above, an example of an objective cost function to provide a net energy-related cost NEC$ over a given time period T for operating the modeled asset(s), considering both retail electricity supply costs and demand response revenue can be computed based on the expression:

$$NEC\$ = \sum_{t}^{T} (\text{Supply\$}(t) - DR\$(t)). \qquad \text{Eq. 17}$$

In one example, an objective cost function as exemplified by Eq. 17 may be provided to an optimizer (a particularly-programmed processor, also referred to as a "solver"; such as processor unit 13 of FIG. 2) that implements a mathematical optimization process to determine a suggested operating schedule for the energy asset(s) over the time period T that minimizes the net energy-related cost NEC$. Accordingly, the optimizer solves for:

$$\text{Min}\left[\sum_{t}^{T}(\text{Supply\$}(t) - DR\$(t))\right] \quad \text{Eq. 18}$$

By substituting the pertinent equations for supply costs and demand response (which depends on the energy assets in a given system) back into Eq. 18, the various informational inputs provided to the optimizer may be readily ascertained.

As a non-limiting example, for a system that is participating in the energy market, the various informational inputs provided to the optimizer may be readily ascertained as follows:

$$\text{Min}\left[\sum_{t}^{T}\{(EP(t)*\text{Retail\$}(t)) - (\max\{0, [(CBL(t) - EP(t))*\text{Wholesale\$}(t)]\})\}\right], \quad \text{Eq. 19}$$

where from Eq. 2

$$EP(t) = F(SP(t)|_{constraints}, W(t)),$$

and from Eq. 6

$$CBL(t) = F(SP(t)_{BAU}, W(t)),$$

where again it is presumed for purposes of illustration that weather information W(t) is relevant in the present example. From the foregoing, it may be seen that one or more of the following inputs may be provided to the optimizer in various examples:

- F—one or more functions defining the mathematical model for the energy asset(s);
- $SP(t)_{BAU}$—BAU or "typical" operating schedule for the energy asset(s);
- Constraints—any timing and/or magnitude constraints placed on candidate operating schedules for the energy asset(s);
- W(t)—weather information as a function of time (if appropriate given the type of energy asset(s) being operated);
- u(t)—control vector for the controller in communication with the energy storage asset;
- Retail\$(t)—retail price of electricity as a function of time;
- Wholesale\$(t)—wholesale price of electricity-related product as a function of time;
- Regulation\$(t)—regulation price in regulation market as a function of time; and
- NEC\$—the objective cost function describing the data center site's net energy-related cost associated with operating the modeled energy asset(s).

Based on the foregoing inputs, the optimizer solves Eq. 19 by finding an "optimal" operating schedule for the energy asset(s), denoted herein as $SP(t)_{opt}$, that minimizes the net energy-related cost NEC\$ to the data center site:

$SP(t)_{opt}$="optimal" or suggested operating schedule for one or more energy assets In various implementations described herein, the optimizer may receive one or more inputs, including but not limited to, the weather information W(t), the retail electricity price Retail\$(t), and the wholesale price of the electricity-related product Wholesale\$(t) (and the regulation price (regulation\$(t))) as forecasted values provided from a third-party source, for the time period T over which the optimization is being performed.

While a given optimizer in a particular implementation may employ various proprietary techniques to solve for the minimization of an objective cost function according to various examples of the principles herein, conceptually the optimization process may be generally understood as follows. In various implementations discussed herein, the optimizer generates the operating schedule using the model of the system through an optimal control procedure. In the various example implementations, the optimizer determines an optimal operating schedule over the defined time period (T) by optimizing an objective cost function. For example, the optimizer can be implemented to determine the operating schedule that generates the energy-related revenue by minimizing a function representing the net energy-related costs of the system over the time period (T). The net energy-related costs can be computed based on the supply costs and the demand response revenue as described herein, including in Eqts. 1-19 above. The optimizer optimizes the objective cost function over the entire defined time period (T) to generate the operating schedule. The generated operating schedule can include suggestions, for different specific time intervals within the overall time period T, for when the controller can be used to implement the energy storage asset in the energy market, in the regulation market, or in both the energy market and regulation market (through dynamic partitioning).

In a non-limiting example of an implementation of the optimizer, some number N of candidate operating schedules $SP(t)|_{constraints}$ for the modeled asset(s) (together with weather information W(t), if appropriate based on a given objective function) can be successively applied to the asset model given by the function(s) F to generate simulated energy profiles EP(t) corresponding to the candidate operating schedules (see Eqs. 1-4). A net energy-related cost NEC\$ given by the objective cost function is calculated for each such simulated energy profile EP(t) (see Eq. 17), and the candidate operating schedule that minimizes the objective cost function (i.e., the "optimal" operating schedule $SP(t)_{opt}$ that minimizes the net energy-related cost NEC\$) is selected as the suggested operating schedule to be provided to the data center site.

As noted earlier, the example above in connection with the objective cost function of Eq. 17 is based on actual energy-related costs (e.g., retail electricity cost) Supply\$(t). In other examples, the energy-related costs included in a given objective cost function additionally or alternatively may include "indirect" energy-related costs, such as "convenience/comfort" costs associated with the data center site's adoption of a suggested operating schedule $SP(t)_{opt}$ different than its typical operating schedule $SP(t)_{BAU}$. In one aspect of such examples, a convenience/comfort cost represents an "indirect" cost in that it does not necessarily relate to actual energy-related expenditures, but rather attributes some cost (e.g., in dollars) relating to a change in the customer's behavior with respect to operating its asset(s), based on the incentive of possible energy-related revenue from the wholesale electricity markets.

Accordingly, in some examples, an alternative objective cost function similar to that shown in Eq. 17 may be given as:

$$NEC\$ = \sum_{t}^{T}(\text{Comfort\$}(t) + \text{Supply\$}(t) - DR\$(t)), \quad \text{Eq. 20}$$

where Comfort\$(t) represents a convenience/comfort cost associated with a change in the data center site's behavior with respect to operating its asset(s). In an example where the energy-related costs included in the objective cost function include reliability costs, they would be included in the computation (such as in Eq. 12) similarly to the Comfort$(t).

A convenience/comfort cost Comfort$(t) may be defined in any of a variety of manners according to different examples. For example, in one implementation, a convenience/comfort cost may be based at least in part on a difference (e.g., a "mathematical distance") between a given candidate operating schedule and the typical operating schedule (BAU conditions) for the modeled asset(s)—e.g., the greater the difference between the candidate operating schedule and the typical operating schedule, the higher the convenience/comfort cost (there may be more inconvenience/discomfort attributed to adopting a "larger" change in behavior). This may be conceptually represented by:

$$\text{Comfort\$}(t) = G[|SP(t)_{Constraints} - SP(t)_{BAU}|], \qquad \text{Eq. 21}$$

where G specifies some function of the absolute value of the "difference" between a candidate operating schedule (e.g., in a given iteration of the optimization implemented by the optimizer) and the typical operating schedule.

To provide an example of how Eqs. 20 and 21 may be employed in an optimization process to determine a suggested operating schedule $SP(t)_{opt}$ for a data center site according to one example, again consider a building asset operated by the data center site, for which a given operating schedule SP(t) is constituted by a temperature set point as a function of time. If $T(t)_{BAU}$ represents the temperature set points constituting a typical operating schedule, and $T(t)|_{constraints}$ represents different temperature set points constituting a candidate operating schedule that may be adopted to facilitate energy-cost reduction and/or revenue generation, the convenience/comfort cost Comfort$(t) in this example may be defined as a "temperature set point deviation" $T_{dev}(t)$, according to:

$$\text{Comfort\$}(t)|T_{dev}(t) = A(|T(t)|_{Constraints} - T(t)_{BAU}|), \qquad \text{Eq. 22}$$

where A is a constant that converts temperature units to cost units (e.g., degrees F. to dollars). In an example, A may be adjustable for each individual time step, so A may be represented as a vector. Eq. 22 specifies that there is a greater "indirect" cost associated with candidate operating schedules having temperature set points that deviate more significantly from the typical temperature set points (albeit within the constraints provided by the data center site). In this manner, as part of the optimization process, potential revenue from the wholesale electricity markets may be "tempered" to some extent by a perceived cost, included in the objective cost function (see Eq. 20), that is associated with the inconvenience/discomfort of deviating significantly from the typical operating schedule.

In the example above, although the multiplier A in Eq. 22 is discussed as a conversion constant, it should be appreciated that in other examples A may be an arbitrary function having as an argument the absolute value of the difference between a candidate operating schedule and the typical operating schedule as a function of time. More generally, it should be appreciated that a convenience/comfort cost Comfort$(t) is not limited to the "temperature-related" example provided above in connection with a building asset, and that other formulations of a convenience/comfort cost as part of an objective function are possible according to various examples of the principles herein.

In yet other examples of objective cost functions, different cost and revenue terms of a given objective cost function may include corresponding "weighting factors" (e.g., specified by the data center site), so as to ascribe a relative importance to the data center site of the respective terms of the objective cost function in arriving at a suggested operating schedule $SP(t)_{opt}$. For example, in some instances, a data center site may want to emphasize the importance of increasing prospective demand response revenue DR$(t) vis a vis decreasing supply costs Supply$(t) in solving the optimization problem to arrive at a suggested operating schedule; similarly, in other instances, a data center site may want to emphasize convenience/comfort costs Comfort$(t) vis a vis increasing prospective demand response revenue DR$(t) in solving the optimization problem to arrive at a suggested operating schedule. The ability of a data center site to tailor a given objective cost function according to weighting factors for respective terms of the objective cost function provides an "elasticity" to the optimization process. Using the objective cost function given in Eq. 20 above as an example, in one example such weighting factors may be included in the specification of an objective cost function as respective term multipliers:

$$NEC\$ = \sum_t^T [(\alpha * \text{Comfort\$}(t)) + (\beta * \text{Supply\$}(t)) - (\gamma * DR\$(t))], \qquad \text{Eq. 23}$$

where $\alpha, \beta$, and $\gamma$ constitute the weighting factors. In an example, $\alpha+\beta+\gamma=1$. In another example, $\alpha+\beta+\gamma\neq1$.

In another example, the value of a weighting factor may differ at various points during the day. For example, if it is preferred that the Comfort$(t) takes a bigger part in the objective cost function computation at certain points during the day, the factor $\alpha$ may be increased relative to the other weighting factors.

In an example, the comfort cost is attributed to a change in the energy customer's behavior in adopting the operating schedule, over the time period T, for the at least one energy asset in lieu of the BAU operating schedule. The comfort cost can be specified as a cost function based at least in part on at least one difference between the operating schedule and the BAU operating schedule. For example, the comfort cost can be based at least in part on a difference between the candidate temperature set point and the BAU temperature set point. In an example where the energy asset is a building, the change in the energy customer's behavior can be monitored based on a difference in a return-air-temperature of a section of the building as compared to a return-air-temperature with the BAU operating schedule. In an example, the comfort cost can be computed as proportional to a magnitude of deviation a temperature of the building from a BAU temperature set point. In another example, the comfort cost can be computed as proportional to a magnitude of deviation a humidity of the building from a BAU humidity set point.

In an example implementation, the operating schedule can be generated through applying an optimization using a net-energy related cost function based only on the energy market. The result of the optimization can be used to provide recommendation for time intervals for the data center site to participate in the energy market, regulation market, or both the energy market and the regulation market. For example, based on the results of the optimization, the operating schedule may determine that any excess charge/discharge capacity of the controller of the energy storage system may be committed to the regulation market on an hour-by-hour basis. For example, it can be determined that the any excess charge/discharge capacity of the controller may be committed to the regulation market during the first 15 time intervals. The optimization may make such a determination depending on whether the forecast regulation price in the regulation market in this time interval offers opportunity for energy-related revenue during this time interval or if considered in the context of the global optimization over time period T. In an example, such a determination may be made depending on whether the SOC of the energy storage asset is feasible for its use in the regulation market. For example, it may be preferable for the energy storage asset to be near around a 50% SOC for it to be applicable to the regulation market. In addition, if it is decided to commit the energy storage asset to the regulation market for a time interval, e.g., for one or more 1-hour time intervals, the optimization described herein may be re-performed based on the new input state of the system. Such new inputs can include the state of charge of the energy storage asset after its commitment to the regulation market ends. In another non-limiting example, the optimization may evaluate different SOC initial inputs to assess whether "recovery" from the regulation market is feasible for later participation in the energy market.

In an example, a predetermined threshold value of wholesale electricity price can be set at which it is decided that the excess charge/discharge capacity of the controller will be committed to the regulation market. Based on the results of the optimization, a predetermined threshold value of the LMP price, indicated by the dashed horizontal line, may be set. In addition, it may be determined that the first time interval of charging the energy storage asset occurs during the time period that T coincides with the time interval during which the forecast wholesale electricity price falls below the predetermined threshold value. It may also be determined in the operating schedule that a second time interval of discharging the energy storage asset occurs coincides with a time interval during which the forecast wholesale electricity price exceed the predetermined threshold value.

While the discussion above of example objective cost functions and optimization of same to generate suggested operating schedules for energy assets has been based at least in part on economic demand response revenue from wholesale electricity energy markets (and in some particular examples involving building assets), it should be appreciated that the disclosure is not limited in this respect; namely, according to other examples, objective cost functions may be formulated and optimized to achieve a wide variety of energy-related objectives associated with different types of energy assets and revenue generation opportunities from wholesale electricity markets. For example, computation based on revenue from the regulation market has also been described herein above, and optimization based on the wholesale price and the regulation price are described herein below. In other examples, the principles herein can be applied to other markets, such as the spinning reserve market.

Generating an Operating Schedule for Deriving Energy-Related Revenue

As discussed above, the output of an optimization process to minimize a data center site's net energy-related cost NEC$ (e.g., as specified by an objective cost function) is typically provided as a suggested operating schedule $SP(t)_{opt}$ for one or more energy assets. Generally speaking, the suggested operating schedule $SP(t)_{opt}$ may comprise one or more set point values as a function of time that take into consideration all of the data center site's modeled and controllable energy assets.

For example, in some instances involving multiple individually modeled and controllable energy assets, the suggested operating schedule $SP(t)_{opt}$ may comprise multiple time-varying control signals respectively provided to corresponding controllers for the different energy assets. In other cases, the data center site may have an energy management system (EMS) that oversees control of multiple energy assets, and the suggested operating schedule $SP(t)_{opt}$ may comprise a single control signal provided to the data center site's EMS, which EMS in turn processes/interprets the single control signal representing the suggested operating schedule $SP(t)_{opt}$ to control respective energy assets.

In examples in which the data center site normally operates its energy asset(s) according to a typical operating schedule $SP(t)_{BAU}$ (absent any economic incentive to change its energy-related behavior), the suggested operating schedule $SP(t)_{opt}$ may be conveyed to the data center site in the form of one or more "bias signals," denoted herein by Bias(t). In particular, one or more bias signals Bias(t) may represent a difference between the suggested operating schedule and the typical operating schedule as a function of time, according to:

$$\text{Bias}(t) = SP(t)_{opt} - SP(t)_{BAU}. \qquad \text{Eq. 24}$$

Eq. 24 applies in certain cases. In a more general case, the Bias offsets the "demand level" over components of the energy asset. The bias signal (sent to a EMS) may cause controllers to take actions such as but not limited to load sheddings (including shutting off non-essential loads) and modifying the amount of energy used to push a train (e.g., out of a station) or to start a car of a carriage system.

In an example, in response to the bias signal is sent to the EMS, the EMS may make changes to operation settings of components of the energy asset.

Figure 11:
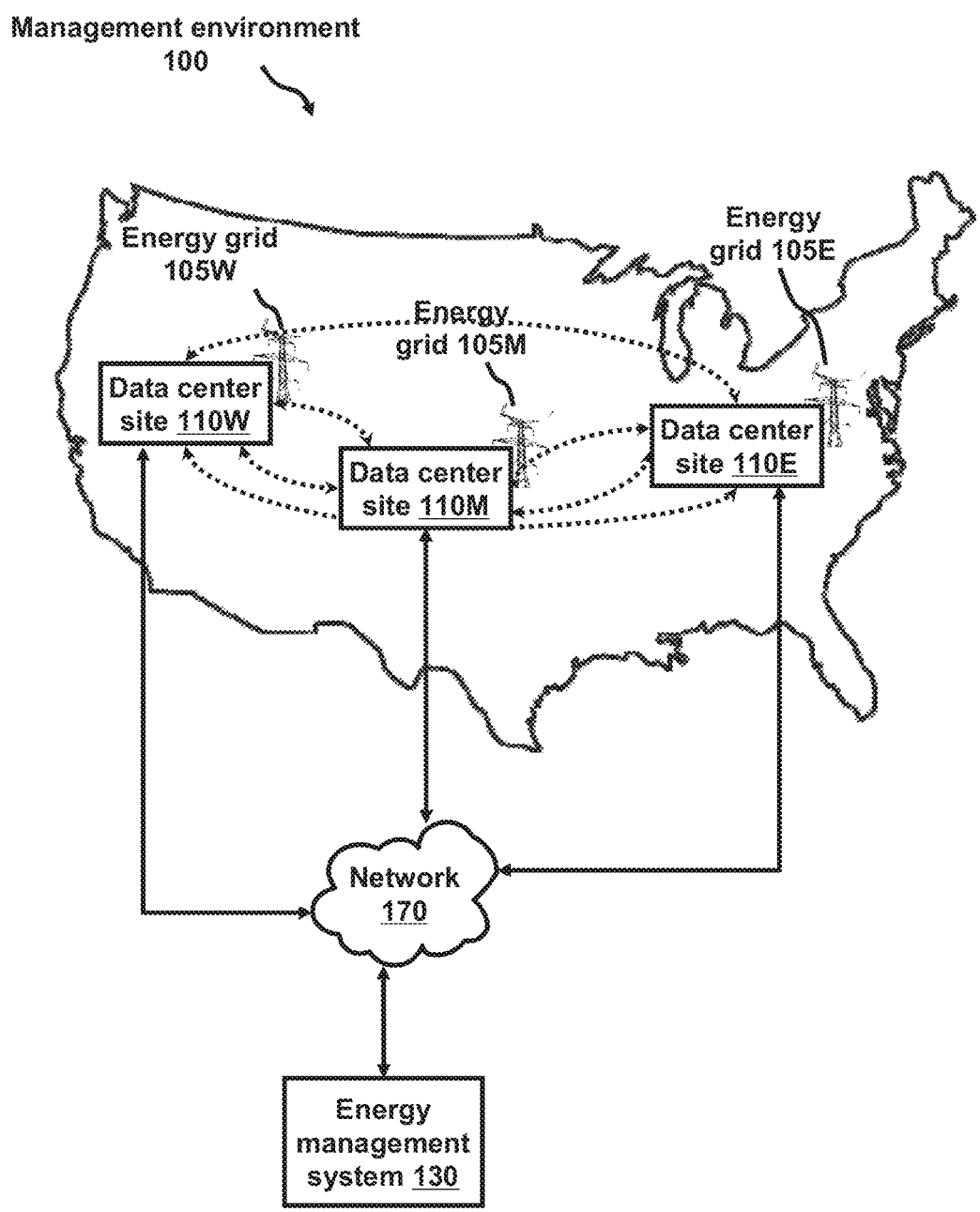
FIG. 11 illustrates a block diagram of an example energy management environment that includes an energy management system and one or more data center sites to facilitate generation of energy-related revenue, according to a principle herein.

FIG. 11 illustrates an example block diagram of a management environment 100 that includes one or more data center sites 110 and an energy management system 130. Management environment 100 may be any environment that includes energy producers and energy consumers. Data center sites 110 are example of energy consumers. For example, data center sites 110 are the customers of energy that is supplied by respective energy grids 105. Accordingly, FIG. 11 shows regionally located data center sites 110 and their associated regionally located energy grids 105.

By way of a non-limiting example, management environment 100 is shown in FIG. 11 to include a data center site 110 and energy grid 105 that is located in the eastern portion of the USA, hereafter referred to as data center site 110E and energy grid 105E. Management environment 100 is also shown to include a data center site 110 and energy grid 105 that is located in the middle portion of the USA, hereafter referred to as data center site 110M and energy grid 105M. Management environment 100 is also shown to include a data center site 110 and energy grid 105 that is located in the western portion of the USA, hereafter referred to as data center site 110W and energy grid 105W. Management environment 100 is not limited to these data center sites 110 and energy grids 105 only. Management environment 100 may include any number of data center sites 110 and energy grids 105. Indeed, the systems, methods and apparatus described herein can be applicable to a single data center site or to any number of data center sites, located in any spatial relationship geographically.

Each data center site 110 (e.g., data center site 110E, 110M, and 110W) is the site of a data center installation. An example data center according to the principles herein can be a facility used to house computer systems and associated components, such as telecommunications and storage systems. A data center can include redundant or backup power supplies, redundant data communications connections, environmental controls (such as but not limited to air conditioning controls or fire suppression controls), and security devices. Each data center site 110 (e.g., data center site 110E, 110M, and 110W) may be operating in a different energy market price region. For example, data center site 110E that is associated with energy grid 105E may be one energy market price region. Data center site 110M that is associated with energy grid 105M may be another energy market price region. Data center site 110W that is associated with energy grid 105W may be yet another energy market price region.

For the purpose of illustration for the methods, applications and a system disclosed herein, data center sites 110 can be configured as underground facilities. Therefore, certain environmental factors that effect energy consumption may be reduced and/or eliminated as compared with aboveground facilities (e.g., a university, a business, a retailer, a hospital, a factory). That is, the model of the environment inside data center sites 110 may be simplified as compared with aboveground facilities. In an example where data center sites 110 are located underground, the outside temperature can be maintained as substantially constant, which means the temperature delta from outside to inside is substantially constant. Further, in the example where the data center sites 110 are located underground, there are no windows and, therefore, solar gain is not a factor. Yet further, an underground facility can require less HVAC capability (e.g., less heaters, less ventilators, and less chillers). Yet further, data centers generally operate with very few people and little lighting. Still further, a wide air temperature range may be allowed in a data center (e.g., about 72° F. to about 88° F.), which can simplify the cost of comfort. As a result, a significant portion of the energy load of underground data centers may be due to energy usage of the servers.

With respect to data center sites 110, energy management system 130 can be configured as a system that is used to facilitate suitable environmental conditions (e.g., temperature and humidity), energy cost reduction, generation of revenue from energy markets, emissions reduction, and/or generation of revenue from emissions trading. In one example, energy management system 130 may be based on the system described in one or more of the following U.S. applications, which are incorporated herein in their entirety: Ser. No. 61/554,390, filed Nov. 1, 2011, entitled "Methods, Apparatus and Systems for Facilitating Revenue Generation from Wholesale Electricity Markets;" Ser. No. 61/477,967, filed Apr. 19, 2011, entitled "Methods, Apparatus and System for Managing Energy Assets;" Ser. No. 12/850,918, filed Aug. 5, 2010, entitled "System and Method for Energy Management;" and Ser. No. 61/279,589, filed Oct. 23, 2009, entitled "VPower System."

In an example implementation, CPU utilization (or computing load) may be shifted from one server to another server at a certain data center site 110 or from one data center site 110 entirely to another data center site 110. Load shifting in data centers may be based substantially on usage demand at any given time. Energy management system 130 of management environment 100 may be used in combination with data center sites 110 to perform load shifting of CPU utilization based on usage demand in combination with different energy market price regions. As described herein, CPU utilization correlates with energy consumption. In an example where energy prices are different from region to region, a system, method or apparatus herein can be implemented to facilitate revenue generation based on load shifting from region to region.

In an example implementation, the energy management system 130 facilitates an objective of minimizing cost with respect to the overall energy costs of each data center site 110. That is, energy management system 130 may be used in combination with data center sites 110 to shift CPU utilization (or computing load) from one data center site 110 to another based on regional energy prices. The amount of CPU utilization (or computing load) at a data center can be correlated with the amount of energy consumed by servers at the data center. In an example, the amount of CPU utilization (or computing load) at a data center can be approximated as being proportional to the amount of energy consumed by servers at the data center. That is, the more CPU utilization (or computing load), the greater the energy consumption. Therefore, for a certain period of time, if energy management system 130 determines that the financial benefit of operating from energy grid 105W is greater than the financial benefit of operating from energy grid 105M, CPU utilization (or computing load) may be shifted from data center site 110M to data center site 110W for that period of time, assuming any and all data center policies are adhered to. In a non-limiting example, the financial benefit can be an amount of energy-related revenue generation.

In an example, based on the policies of the data center (applied as constraints on the system), load shifting may be performed in time and/or space. As used herein, "space" can refer to load shifting between servers at a single data center site 110 (i.e., intra-data center load shifting) or to load shifting between servers of geographically disparate data centers (i.e., inter-data center load shifting). Intra-data center load shifting refers to load shifting within the same energy market price region and/or load shifting or load modulation within a single data center, while inter-data center load shifting is load shifting to different energy market price regions. Load shifting between different energy market price regions can be directed during operation based on a suggested operating schedule generated by a system, method or apparatus described herein can take advantage of different energy market prices in different geographic locations. In an example implementation, the forecast energy market prices in at least two different geographic regions can be included as parameters in an example optimization, over a specified time period T, that maximizes the difference between revenue and costs, in order to generate an operating schedule over the time period T that has the potential maximize an economic benefit for the operators of the data center(s). As used herein, "time" can refer to increasing or decreasing load at a given data center site. Such load shifting can be performed as part of the suggested operating schedule to take advantage of, e.g., a regulation market or a synchronized reserve market, in addition to an energy market in the overall optimization over the time period T.

The Systems, Methods and Apparatus Described Herein

In an example implementation, the energy usage of the data center site may be modulated by increasing or decreasing CPU utilization (or computing load), or by increasing or decreasing the settings of environmental control systems. To increase CPU utilization (or computing load) in response to a signal from a market operator, one or more computations and/or algorithms may be run using at least one additional server of the data center site. Such computations and/or algorithms may be additional computing load for a customer of the data center site, or they may be "dummy" programs, i.e., programs whose sole purpose is to increase CPU utilization (or computing load). Such increased CPU utilization (or computing load) can be discontinued to decrease energy usage in response to a signal to such an effect from the market operator. In an example where the market is a regulation market, the signals may request response of increased or decreased energy usage at time intervals as short as 2-second time intervals. Given that the energy response of server energy usage can be substantially instantaneous, the modulation of CPU utilization (or computing load) enables participation in markets that require quick response times.

An example network 170 can be used to provide a communication link between any and/or all entities of management environment 100, such as between data center sites 110 and energy management system 130. In one example, energy management system 130 can be operating on an application server (not shown). Network 170 may be, for example, any local area network (LAN) and/or wide area network (WAN).

Figure 12:
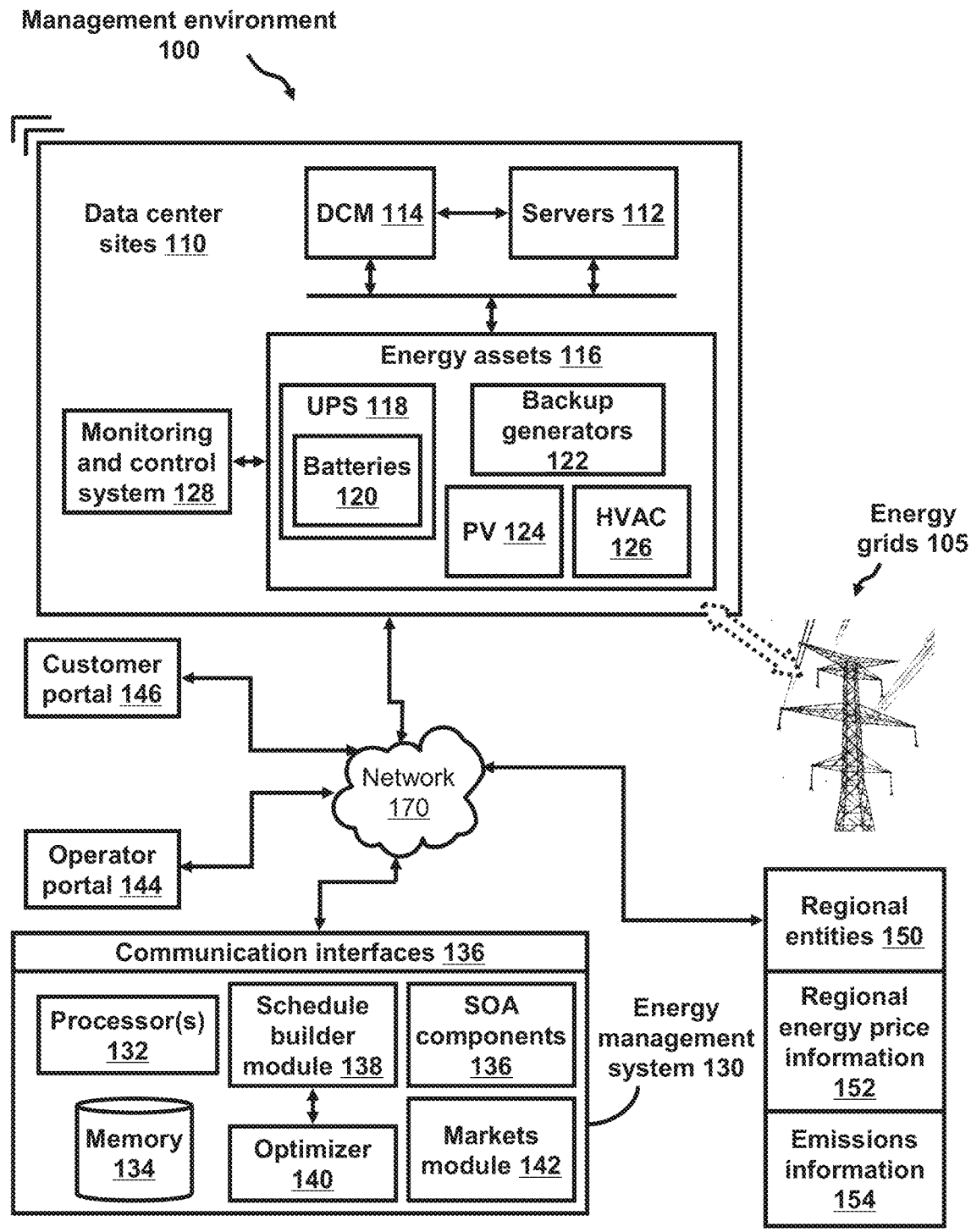
FIG. 12 illustrates another block diagram that shows more details of the example energy management environment of FIG. 11, according to a principle herein.

FIG. 12 illustrates a block diagram that shows example aspects of management environment 100 of FIG. 11. For example, as shown in FIG. 12, each data center site 110 may include, for example, one or more servers 112 that are controlled by a data center manager (DCM) 114, as well as one or more energy assets 116 that are controlled by a monitoring and control system 128.

Servers 112 may be any computer systems and associated components that are found in a data center. DCM 114 may be any processor-executable instructions (including hardware and/or software) for managing the operation of servers 112. In one example, DCM 114 may be the Intel® DCM SDK (available from Intel Corporation of Santa Clara, Calif.), which is a power management solution stack for a data center. In this example, the Intel® DCM SDK can be used to provide real-time power and thermal monitoring and management for individual servers, group of servers, racks and IT equipment in data centers.

Energy assets 116 may be any configuration of one or more energy usage assets, one or more energy storage assets, one or more energy generation assets, one or more renewable energy assets, and any combinations thereof. Groups of energy assets 116 and/or buildings associated with a certain data center site 110 may be in close physical proximity to each other or may be physically distant and even separated by time zones.

Non-limiting examples of energy usage assets include heating, ventilation, and air conditioning (HVAC) systems; chillers; ventilators; heaters; lighting; any electric powered equipment, and the like. Non-limiting examples of energy storage assets include electric storage mechanisms (e.g., batteries), thermal storage mechanisms (e.g., ice, hot water), compressed air storage mechanisms, and water pumped to storage containers for later generation. Non-limiting examples of energy generation assets include gas turbines, industrial diesel generators, and the like. Non-limiting examples of renewable energy assets include wind power generation, solar thermal generation, photovoltaic (PV) power generation, geothermal power generation, and the like. According to the principles described herein, certain energy assets 116 may consume energy from energy grid 105, while other energy assets 116 may supply energy back to energy grid 105 and/or supply energy to the data center site 110's own energy assets 116.

In one example, the energy assets 116 of each data center site 110 may include an uninterruptable power supply (UPS) 126 that may further include a bank of batteries 120, one or more backup generators 122, a certain amount of PV 124, and HVAC 126. The one or more servers 112 are energy usage assets and, thus, are also examples of energy assets 116.

An example UPS according to the principles described herein (e.g., UPS 118) is an electrical apparatus that provides emergency power to a load when the input power source, typically the utility mains, fails. A UPS differs from an auxiliary or emergency power system or standby generator in that it can be used to provide instantaneous or near-instantaneous protection from input power interruptions by means of one or more attached batteries (e.g., batteries 120) and/or by means of diesel generators and flywheels. The on-battery runtime of a UPS can be relatively short (e.g., 5-15 minutes), which is sufficient time to bring an auxiliary power source (e.g., backup generators 122) on line, or to properly shut down the protected equipment.

In management environment 100, a UPS 118 can be used to protect the data center site 110, where an unexpected power disruption could cause serious business disruption or data loss. For example, when a power failure occurs, UPS 118 may provide a few minutes of power (by converting the DC battery output from batteries 120 to AC output) to servers 112, allowing time for backup generators 122 to start up.

An example monitoring and control system 128 may be installed at each data center site 110. One example of monitoring and control system 128 is a building management system (BMS). Another example of monitoring and control system 128 is a building automation system (BAS). A BMS and BAS can be used to manage the environment within a building or group of buildings. For example, the BMS or BAS may control temperature, carbon dioxide levels, and humidity within a building via certain energy assets 116. In one example, a supervisor at a certain data center site 110 can use monitoring and control system 128 to monitor and/or manage the energy assets 116 thereof. Monitoring and control system 128 may be any commercially available BMS or BAS, such as but not limited to those supplied by Johnson Controls, Inc (Milwaukee, Wis.), Automated Logic Corporation (Kennesaw, Ga.), and Honeywell International, Inc (Morristown, N.J.).

Energy management system 130 may include one or more processors 132, a certain quantity of memory 134, and certain communication interfaces 136. Processors 132 may be any processor-executable instructions (including software applications and/or hardware mechanisms) for managing the overall operations of energy management system 130. In a service-oriented architecture (SOA), processors 132 may be any functionality for supporting the SOA. Memory 134 may be any means for storing any electronic information that can be useful to energy management system 130. In one example, memory 134 may be one or more standard databases. Communication interfaces 136 may be any mechanisms by which energy management system 130 may communicate with other entities within management environment 100. In one example, communication interfaces 136 may include a web interface and an enterprise service bus.

In one example, energy management system 130 may include certain functional components and/or modules that are installed and executing in memory 134 and managed by the one or more processors 132. Examples of functional components and/or modules of energy management system 130 may include, but are not limited to, certain core SOA components 136, a schedule builder module 138 that feeds an optimizer 140 (e.g., optimization software), and a markets module 142.

Non-limiting examples of shared software functionality of core SOA components 136 may include, but are not limited to, authorization and authentication functions, publish/subscribe functions, data management functions, eventing and alerting functions, session manager functions, administration functions, identity functions, and the like. Core SOA components 136 is not limited to the aforementioned software functionality only. Any other software functionality may be included in core SOA components 136.

Schedule builder module 138 may be a software component of energy management system 130 for collecting any information that may be useful for optimizing the operation schedule of any energy assets 116 of any data center site 110 for a chosen period of time. Useful information may include, but is not limited to, any information about the data center site 110 itself (e.g., building information and/or building zone information) and/or the location of the data center site 110, weather information, energy price information 156, solar gain information, and any information about the energy assets 116 of the data center site 110. Using the information that is collected, schedule builder module 138 creates a model of the environment at data center site 110 and then simulates the environment at data center site 110. Schedule builder module 138 can introduce a snapshot of the simulation results and any related information into optimizer 140. Optimizer 140 can be used to generate an optimized energy assets operating schedule for a chosen period of time. Additional details of an example of a schedule builder module 138 are described with reference to FIG. 13.

Optimizer 140 is an example of the optimization function of management system 110. Optimizer 140 may be an optimization implementation (including as processor-executable instructions) for processing the simulation results and any related information from schedule builder module 138 and then generating an energy assets operating schedule that is optimized for reducing energy costs, reducing emissions costs, and/or generating revenue from energy markets. In various example implementations, the optimization process performed by optimizer 140 can include (1) a calculation of BAU and/or (2) an optimization for minimizing overall energy costs with respect to BAU. The optimization process may be an iterative process. That is, optimizer 140 is used to create a schedule for the energy assets 116 that optimizes the energy usage, generation (if any), and storage (if any) of a data center site 110 for the purpose of reducing energy costs, reducing emissions costs, and/or generating revenue from energy markets. The optimized schedule can be configured to cover a specified period of time. In one example, optimizer 140 may be implemented using optimization software, such as the AIMMS optimization software from Paragon Decision Technology Inc. (Bellevue, Wash.).

In one example, optimizer 140 may be based on the optimization process described in one or more of the following U.S. applications, which are incorporated herein in their entirety: Ser. No. 61/554,390, filed Nov. 1, 2011, entitled "Methods, Apparatus and Systems for Facilitating Revenue Generation from Wholesale Electricity Markets;" Ser. No. 61/477,967, filed Apr. 19, 2011, entitled "Methods, Apparatus and System for Managing Energy Assets;" Ser. No. 12/850,918, filed Aug. 5, 2010, entitled "System and Method for Energy Management;" and Ser. No. 61/279,589, filed Oct. 23, 2009, entitled "VPower System."

In an example implementation, optimizer 140 can be configured to execute processor-executable instructions to achieve the financial objective of minimizing cost with respect to the overall energy costs of a data center site 110 over a specified period of time T. For example, optimizer 140 can be programmed to provide solution sets with respect to (1) minimizing cost of deviation from BAU comfort levels, (2) minimizing cost of deviation from the emissions target, (3) minimizing cost of electric power production by the data center site's energy generating assets, (4) minimizing cost of electric power supply from the load serving entity or the electric distribution company, and (5) maximizing demand response (DR) revenue, with all of (1) to (5) being evaluated in a computation over a specified period of time T.

In an example, optimizer 140 can be implemented to provide at least one solution set with respect to minimizing energy costs of a data center site. In a non-limiting example, optimizer 140 can be implemented to perform a method according to the following equations.

$$\text{Minimize}|_T [T\$_{dev}(t) + \text{Emission}\$(t) + \text{Gen}\$(t) + \text{Supply}\$(t) - DR\$(t)] \quad \text{Eq. 25}$$

where
- $T\$_{dev}(t)$=Cost of deviations from the business-as-usual comfort (i.e. temperature) level
- Emission$(t)=Cost/value of deviations from the emission target
- Gen$(t)=Cost of electric power production by the data center energy generating assets
- Supply$(t)=Cost of electric power supply from the Load Serving Entity or the Electric Distribution Company $$DR\$(t) = \max(0, (CBL(t) - \text{Load}(t))) * (LMP(t) - G\&T\ \text{Rate}(t)) \quad \text{Eq. 26}$$

where
- CBL(t)=Customer baseline
- Load(t)=Actual data center usage
- LMP(t)=Locational Marginal Prices over time
- G&T Rate(t)=Generation & Transmission Rate of the data center site's retail rate In an example implementation, the minimization (Minimize$|_T$) can be computed, for a specified time period T, based on the equation in Eq. 25 for the time varying parameters. As a non-limiting example, time period T can be a period of 24 hours, 48 hours, or any other specified time period. In this example, optimizer 140 can be implemented to perform a method according to minimization (Minimize$|_T$), for the specified time period T. In an example implementation, the minimization can be computed as a continuous function over the entire time period T. In another example implementation, the minimization can be computed over discrete portions of the function for several time intervals ($\Delta t$) that sum to time period T. As a non-limiting example, the minimization can be computed over 48 different half-hour time intervals, for a total time period of T=24 hours.

In addition to the example solution sets that can be generated using optimizer 140 for providing financial benefits at a particular data center site 110, optimizer 140 may include a component that can be used for indicating when and/or how to load shift CPU utilization across Servers 112 of a particular data center site 110 and/or across geographically disparate data center sites 110, which is across energy market price regions. Again, the load shifting of CPU utilization across energy market price regions is to achieve financial benefits at data center sites 110.

An aspect of optimizer 140 is that the optimization determines a suggested operating schedule that can facilitate an overall economic benefit (including deriving energy-related revenue) over the entire time period T, even if the operating schedule may call for a mode of operation during a given time interval ($t_1$ to $t_2$) during time period T that may not take advantage of the lowest energy market price or lowest cost of energy production during time interval ($t_1$ to $t_2$) or in that geographic location. For example, the suggested operating schedule may determine an operating schedule that calls for load shifting to a data center site in a geographic region A that has a somewhat higher energy market price than other data center sites (e.g., geographic region B, C, or D) considered in the optimization if, for example, a regulation market price available in geographic region A is of a value that facilitates a higher overall economic benefit, for the entire time period T, when the suggested operating schedule is performed over the entire time period T. As another example, the suggested operating schedule may determine an operating schedule for time period T that calls for increased CPU utilization (or computing load) to a given data center site during a time period ($t_1$ to $t_2$) of somewhat higher energy market pricing if, for example, responding to a signal from a regulation market operator generates a benefit of a regulation market price during time period $t_1$ to $t_2$ that facilitates a higher overall economic benefit when the suggested operating schedule is performed over the entire time period T.

In an example, markets module 142 may include processor-executable instructions (such as but not limited to a software component) of energy management system 130 for interacting with any entities in the energy markets, such as ISOs/RTOs, and/or with any entities in the emissions trading markets. For example, markets module 142 may include one or more market interfaces. An example market interface may be any mechanisms for interfacing with the information feeds from any market. Markets module 142 may include a registration component that is used for registering energy assets in a particular market for committing assets. In an example, markets module 142 may include a markets bidding component that is used to submit bids into certain energy markets. In an example, markets module 142 may include an energy markets settlements component that is used to process settlements in any energy markets between, for example, ISOs/RTOs and data center sites 110. In another example, markets module 142 may include an emissions market settlements component that is used to process settlements with respect to emissions trading.

One or more system operators (not shown) may be associated with energy management system 130. System operators may access energy management system 130 using an operator portal 144. In an example, operator portal 144 may be a web-based portal. Operator portal 144 is the user interface that a system operator can use to manage the process of creating an energy assets operating schedule that may be optimized for reducing energy costs, reducing emissions costs, and/or generating revenue from energy markets. The optimized operating schedule covers a chosen period of time. Once an optimized operating schedule is transmitted to and accepted by the customer, operator portal 144 may be used by a system operator for monitoring and/or controlling a data center site's energy assets in real time. Likewise, personnel of data center sites 110 may use a customer portal 146 to monitor and/or process information about the operation of the energy assets 116 of data center sites 110. Customer portal 146 may be a web-based portal.

In an example implementation, management environment 100 may include any other entities that may be useful to energy management system 130 for operating, using, and/or controlling energy assets 116 of data center sites 110. For example, management environment 100 may include regional entities 150 that are associated with regional energy grids 105, such as energy grids 105E, 105M, and 105W that are shown in FIG. 11.

In the United States, regulatory responsibility for the energy grid has primarily been held by the Federal Energy Regulatory Commission (FERC). Operational responsibility for developing and operating a balanced electric grid has been held by individual utilities or independent regional grid operators known in the industry as Independent System Operators (ISOs) or Regional Transmission Organizations (RTOs). The FERC, regional ISOs, regional RTOs, and regional utility companies are examples of regional entities 150.

Regional entities 150 may be a source of any information that is useful to energy management system 130 for operating, using, and/or controlling energy assets 116 of data center sites 110. In one example, ISOs/RTOs, which are regional entities 150, may provide regional energy price information 152.

Other countries or regional jurisdictions, including Europe, different types of organizations and/or market operators may hold responsibility for the energy grid and/or energy markets for that other country or regional jurisdiction (referred to herein as "foreign market operator").

In energy markets, mechanisms exist to facilitate energy trading. Certain energy trading may involve ISOs, RTOs or a foreign market operator. For example, ISOs/RTOs or foreign market operators may manage the price of energy that is generated and energy that is consumed on the grid using pricing principles that value the price of energy based on supply and demand. In this example, regional energy price information 152 may be any wholesale and/or retail price information that is supplied by ISOs/RTOs or foreign market operators. Such wholesale and/or retail price information may be established on a regional basis. In another example, the regional energy price information 152 may be supplied by a third party service and/or calculated by energy management system 130. Further, certain regional energy price information 152 may be related to the day-ahead energy market, while different regional energy price information 152 may be related to the real-time energy market.

Regional energy price information 152 may be useful to an optimization function (not shown) of energy management system 130 with respect to reducing energy costs. For example, for a hot summer day scenario, if the optimization function determines from regional energy price information 152 that energy prices are lowest in the morning and highest in the afternoon for a certain day, the output of the optimization function may be an operating schedule that instructs to cool a certain environment below its business as usual (or default) temperature in the morning and then allow the environment to rise above its business as usual (or default) temperature in the afternoon. This is an example of the optimization function of energy management system 130 facilitating opportunities for reducing energy costs of a data center site 110.

In an example involving batteries 120 of UPS 118, if the optimization function determines from regional energy price information 152 that energy prices are lowest in the morning and highest in the afternoon for a certain day, the output of the optimization function may indicate to charge batteries 120 in the morning and to utilize (discharge) the energy from batteries 120 in the afternoon. This is another example of the optimization function of energy management system 130 facilitating opportunities for reducing energy costs of a data center site 110.

Additionally, regional energy price information 152 may be useful to the optimization function of energy management system 130 with respect to generating revenue from energy markets. For example, if the optimization function determines from regional energy price information 152 that energy prices are lowest in the morning and highest in the afternoon for a certain day, the output of the optimization function may indicate to make the energy generation assets of a data center site 110 available to the grid in the afternoon. In this way, if the data center site 110 is able to supply energy back to the grid in the afternoon, the data center site 110 may receive revenue in the real-time energy market at a time of day when energy prices are highest. This is an example of the optimization function of energy management system 130 facilitating opportunities for a data center site 110 to increase revenue from energy markets.

Additionally, regional entities 150 may include certain emissions regulatory agencies that may be the source of certain emissions information 154. These emissions regulatory agencies may be any federal (e.g., Environmental Protection Agency (EPA)), regional, state, and/or municipal regulatory bodies that facilitate emissions trading programs. Emissions information 154 may include emissions cap information, cost information for buying emissions credits, and/or price information for selling emissions credits. Additionally, emissions information 154 may include any published information about the local energy grid (e.g., energy grid 105) with respect to the emission of pollutants and/or greenhouse gases (GHG).

Emissions information 154 may be useful to the optimization function of energy management system 130 with respect to calculating the amount of emissions produced at any data center site 110 and/or by consuming energy from the local energy grid, determining opportunities for data center sites 110 to buy emissions credits, and/or determining opportunities for data center sites 110 to sell emissions credits.

Network 170 provides the communication link between any and/or all entities of management environment 100. For example, data center sites 110, energy management system 130, and regional entities 150 may be connected via network 170. Entities may connect to network 170 using any wired and/or wireless networking protocols. Additionally, regional energy price information 152 and emissions information 154 may be accessed via network 170.

An aspect of optimizer 140 is that in addition to using information (e.g., attributes and technical specifications) of energy assets 116 and of buildings (or any physical environment), optimizer 140 also uses regional energy price information 152 and emissions information 154 when generating an optimized operating schedule for data center sites 110, which includes optimized operating schedule for both energy assets 116 and CPU utilization. Additionally, optimizer 140 may, for example, factor in the amount of cloudiness with respect to solar gain calculations.

For example, optimizer 140 may factor in hourly energy prices (e.g., day-ahead or real-time energy prices) for optimizing data center sites 110 with respect to generating revenue from energy markets. For example, optimizer 140 may use regional energy price information 152 to allow the operation of certain energy assets 116 at times of day when energy prices are lowest and/or to curtail (or reduce) the operation of certain energy assets 116 at times of day when energy prices are highest, thereby reducing energy costs of a data center site 110. Additionally, because CPU utilization correlates to energy consumption, optimizer 140 may use regional energy price information 152 to indicate load shifting of CPU utilization from a data center site 110 in a certain energy market price region to another data center site 110 (within the constraints of the data center policies) in a different energy market price region.

In another example, optimizer 140 may use regional energy price information 152 to indicate to data center sites 110 to charge batteries at times of day when energy prices are lowest and to utilize (discharge) the batteries at times of day when energy prices are highest; again, reducing energy costs of a data center site 110. Again, load shifting of CPU utilization across geographically disparate data center sites 110 (within the constraints of the data center policies) may be used to take advantage of different energy market price regions.

In yet another example, optimizer 140 may use regional energy price information 152 to generate optimized operating schedules for energy assets 116 that may be used to indicate to data center sites 110 when to bid into any of the various wholesale electricity markets, such as (1) the energy market, (2) the day-ahead scheduling reserve market, (3) the capacity market, (4) the synchronized reserve market, and (5) the regulation market. Again, load shifting of CPU utilization across geographically disparate data center sites 110 (within the constraints of the data center policies) may be used to take advantage of different energy market price regions.

With respect to emissions information, optimizer 140 may use emissions information 154 to generate optimized operating schedules for energy assets 116 that may be used to indicate to data center sites 110 opportunities to buy and/or sell emissions credits. In this way, data center sites 110 may have opportunity to reduce emissions and/or receive revenue from emissions trading. Additionally, load shifting of CPU utilization across geographically disparate data center sites 110 (within the constraints of the data center policies) may be used to take advantage of different emissions market regions.

Referring again to FIG. 11, energy management system 130 provides mechanisms by which the environment at each data center site 110, which includes one or more energy assets 116, is modeled and simulated to determine an energy assets operating schedule that is optimized with respect to reducing energy costs, reducing emissions costs, and/or generating revenue from energy markets. The modeling and simulation function may use information (e.g., attributes, specifications, etc) about energy assets 116, which may be in a building or group of buildings. In addition to information about energy assets 116, the modeling and simulation function may use other information, such as, but not limited to, building information, regional energy price information 152, and/or emissions information 154.

Once a model is created, the environmental conditions within the certain data center site 110 may be simulated based on the input criteria of the model. The simulation results are then fed into an optimization function, which is a cost minimization function that includes a combination of multiple sub-functions, of energy management system 130 that processes the information and generates an optimized operating schedule, within a set of constraints. That is, the optimization function of energy management system 130 is used to create an operating schedule (for a chosen period of time) for energy assets 116 of a data center site 110, whereas the operating schedule for the energy assets 116 is optimized for reducing energy costs, reducing emissions costs, and/or generating revenue from energy markets.

Optimizer 140 can be used to facilitate a financial objective of minimizing cost with respect to the overall energy costs of a data center site 110 over a specified time period T. The financial objective may be achieved by the combination of (1) minimizing cost of deviation from BAU comfort levels, (2) minimizing cost of deviation from the emissions target, (3) minimizing cost of electric power production by the data center site's energy generating assets, (4) minimizing cost of electric power supply from the load serving entity or the electric distribution company, and (5) maximizing demand response (DR) revenue; all for a specified period of time T. Additionally, because CPU utilization correlates to energy consumption, CPU utilization at data center sites 110 may be optimized to take advantage of different energy market price regions. More details about the process of creating and optimizing a schedule for managing energy assets 116 and managing load shifting of CPU utilization are described with respect to FIGS. 13 and 14.

Figure 13:
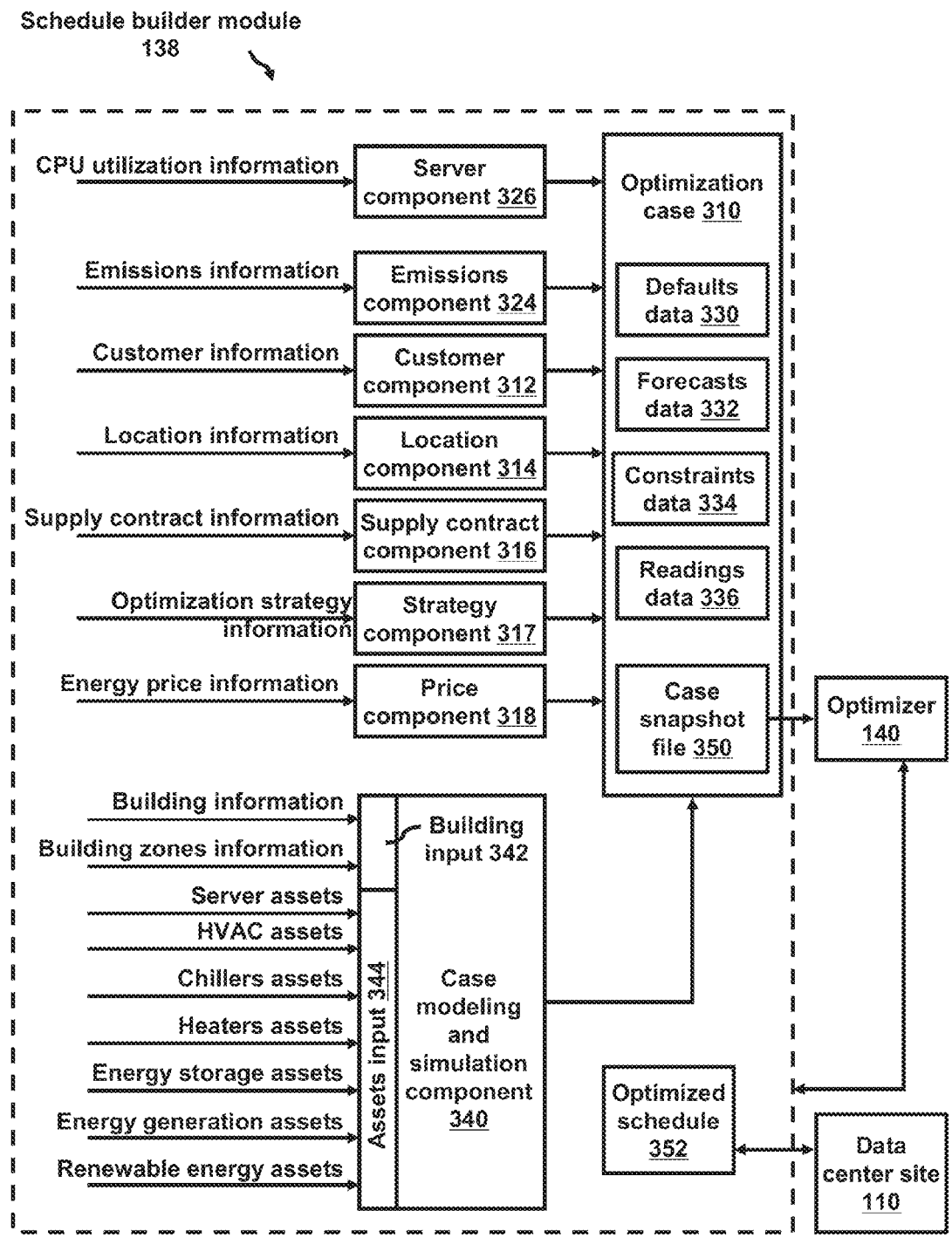
FIG. 13 illustrates a block diagram of an example schedule builder module of the example energy management system, according to a principle herein.

FIG. 13 illustrates a block diagram of schedule builder module 138 of energy management system 130 of FIG. 11. Schedule builder module 138 may include any components for processing any information that may be useful with respect to creating an optimization case 310 with respect to energy assets. For example, schedule builder module 138 may include a customer component 312 for processing customer information (e.g., data center site 110 information), a location component 314 for defining and/or configuring the data center site 100 location, a supply contract component 316 for processing supply contract information, a strategy component 317 for processing optimization strategy information, a price component 318 for processing regional energy price information 152, an emissions component 324 for processing emissions information 154, and/or a server component 326 for processing CPU utilization information of data center sites 110.

Customer component 312 may process customer information (e.g., data center site 110 information), such as, but not limited to, customer name and contact information, customer type information (e.g., a university, a business, a retailer, a hospital, a factory), building (s) occupancy information, miscellaneous load information (e.g., lighting, any electric powered equipment), and the like.

Location component 314 may be used for defining and/or configuring the data center site 110 location. The definition of a data center site 110 location is not limited to a geographic address. Rather, the data center site 110 location may be any configuration of energy assets, buildings, and/or geographic locations. For example, the data center site 110 location may be configured as one building; a groups of buildings; one energy asset; a group of energy assets; one energy asset for one building; one energy asset for multiple buildings; one monitoring and control system 128 per building; multiple monitoring and control systems 128 per building; one monitoring and control system 128 for multiple buildings; energy assets and/or buildings in one town, city, or state in combination with energy assets and/or buildings in another town, city, or state; and the like. Additionally, groups of energy assets or buildings may be in close physical proximity to each other or may be physically distant and even separated by time zones.

Supply contract component 316 may be used to process supply contract information, which is the service contract between the ISOs/RTOs and data center sites 110.

Strategy component 317 may be used to process optimization strategy information. For example, the optimization strategy may be determined by the definition of a data center site 110 location using location component 314. That is, the grouping of energy assets and/or buildings may determine the best optimization strategy for the case. Example strategies include, but are not limited to single optimization, iterative optimization, customer baseline (CBL) optimization, parametric estimation optimization, and so on.

Price component 318 may be used to process regional energy price information 152. For example, price component 318 may query ISOs/RTOs or the foreign market operator for regional energy price information 152 with respect to any energy market in a certain geographic region, such as the day-ahead energy market and the real-time energy market.

Server component 326 may be used to process CPU utilization information of one or more data center sites 110. The CPU utilization information may include, for example, the current actual CPU utilization of data center sites 110 and/or projected CPU utilization of data center sites 110 for a certain time period.

Solar gain (also known as solar heat gain or passive solar gain) refers to the increase in temperature in a space, object, or structure that results from solar radiation. The amount of solar gain increases with the strength of the sun, and with the ability of any intervening material to transmit or resist the radiation. With respect to schedule builder module 138, a solar gain component (not shown) may process solar gain information about one or more buildings of data center site 110 per location component 314. For example, building-specific solar gain information, which is based on an analysis of the data center site's building and/or buildings and weather information. That is, solar gain can be determined by the direction and orientation of windows, direction and orientation of the sun (by day of the year), and amount of cloud cover. For example, the solar gain may be lowest when cloudy and highest when not cloudy, and anything in between. Again, optimizer 140 may factor in the amount of cloudiness with respect to solar gain calculations. Other factors of solar gain include building information (e.g., size, mass, type and thickness of building materials, R-factor, etc) and window information (e.g., type, size, thickness, direction, R-factor, etc).

Emissions component 324 may be used to query emissions regulatory agencies 162 for emissions information 154 with respect to any emissions market in a certain geographic region. For example, emissions component 324 processes emissions cap information, cost information for buying emissions credits, and/or price information for selling emissions credits for the geographic region of a certain data center site 110.

Optimization case 310 also includes defaults data 330, forecasts data 332, constraints data 334, and readings data 336. For each individual energy asset 116 of each data center site 110 a set of default settings is established, which is defaults data 330. For example, there is a set default settings for a certain HVAC unit, another set default settings for a certain chiller, another set default settings for a certain heater, and so on; all included in defaults data 330. Defaults data 330 may be considered static data. This is because the default settings remain substantially the same from day to day for a given energy asset.

For each individual energy asset 116 of each data center site 110 there is also a set of forecast settings, which is forecasts data 332. That is, forecasts data 332 includes forecast operating values for each individual energy asset 116. The forecasts data 332 can be set up by an example system operator. The forecasts data 332 may initially include default data and/or historical data. An example system operator may be used to modify the initial contents of forecasts data 332 based on any current conditions. Forecasts data 332 may include a schedule, such as forecast data for every 15, 30, 45, or 60 minutes for a chosen period of time. Forecasts data 332 may be considered time series data. This is because the data may change over a time period.

In one example, the forecast values in forecasts data 332 are used to modify the default values in defaults data 330 and, thereby, achieve improved optimization with respect to reducing energy costs and/or generating revenue from the day-ahead and/or real-time energy markets. The forecast values in forecasts data 332 may cover the whole day or any portion of the day. For example, forecast values may be used between noon and 6 pm and the default values may be used for the rest of the day. In the optimization process performed by optimizer 140, a first pass of the process may be to optimize using the default settings in defaults data 330. Then a second pass of the process may be to optimize using the forecast settings in forecasts data 332.

Constraints data 334 may include any data center policies of data center sites 110. Constraints data 334 may also include any information for constraining the operation and/or use of energy assets 116 of a certain data center site 110. One example of constraints may be any constraints that are on a particular energy asset 116, such as minimum run time or startup time (e.g., ice making) Another example of constraints may be constraints about the availability of a certain energy asset 116, such as information from the customer that a chiller is going to be down between 2 pm and 4 pm or that the chiller is running at only 50% capacity. Yet another example of constraints may be the allowable minimum and maximum internal temperatures of buildings.

Readings data 336 are the actual readings from the customer's monitoring and control system 128. For example, readings data 336 may be meter readings, thermostat readings, and/or any energy assets readings. When creating a case, example system operator may receive any useful readings from readings data 336 and use these values as a baseline value into the optimizer. Further, example system operator may monitor actual real-time readings. Then based on actual readings from readings data 336, example system operator may make certain adjustments to any energy asset 116 and then rerun the optimization. Additionally, meter readings in readings data 336 may be used for parametric estimation.

Schedule builder module 138 may also include a case modeling and simulation component 340 for processing any information about buildings and/or energy assets of a data center site 110 and then models and simulates the environment. That is, case modeling and simulation component 340 is used to simulate a model of energy assets 116 and their operation in a given environment over a chosen period of time given certain input information and/or variables. For example, case modeling and simulation component 340 may include a building input 342 for receiving any type of building information (e.g., location, size, mass, # of floors, type and thickness of building materials, R-factor, etc) and/or building zones information (e.g., zone 1=floor 1, zone 2=floor 2, zone 3=floor 3, etc). Additionally, case modeling and simulation component 340 may include an energy assets input 344 for receiving any type of information about energy assets 116, such as, but not limited to, any operating specifications and/or attributes of, for example, HVAC assets, chillers assets, heaters assets, energy storage assets (i.e., thermal and electric storage), energy generation assets, and/or renewable energy assets.

The aforementioned information about energy assets 116 may originate from a customer (i.e., data center site 110). That is, the attributes and/or technical specifications of each energy asset 116 may be supplied by the data center site 110 and initially entered manually. However, in other examples, a simulation components library of predefined assets may exist that provides a simulation model of any types, brands, and/or models of energy assets.

Using the aforementioned information and/or variables, case modeling and simulation component 340 creates a model of the data center site 110 (e.g., a building or group of buildings per location component 314 and associated energy assets 116) and simulates the environment at the data center site 110 for a chosen period of time. It is noted that because data center sites 110 are underground facilities, the model of a data center site 110 that is created using case modeling and simulation component 340 may be simplified as compared with aboveground facilities. Location component 314 may include specific information about the data center site 110. Schedule builder module 138 generates a case snapshot file 350 that contains a snapshot of the simulation results from case modeling and simulation component 340 and all other information collected by and/or included in optimization case 310. Case snapshot file 350 is fed into optimizer 140. Optimizer 140 uses a two step process to process the information in case snapshot file 350 and generate a solution set in the form of an optimized schedule 352. The optimized schedule 352 is for a chosen period of time, such as one 24-hour period (i.e., one calendar day), and includes settings information and/or CPU utilization information on a predetermined interval, such as every 15, 30, 45, or 60 minutes or higher time intervals. The optimized schedule 352 from optimizer 140 is returned to schedule builder module 138. Schedule builder module 138 may then deploy the optimized schedule 352 to a data center site 110. Additional details of an example of a process of creating and optimizing a schedule for managing energy assets of any energy-consuming and/or energy-producing environment are described with respect to FIG. 14. Additional details of an example process of managing data center utilization with respect to reducing energy costs, reducing emissions costs, and/or generating revenue from energy markets also are described with respect to FIG. 14.

Emissions Considerations

In an example, energy management system 130 of FIG. 11 may include an emissions component (not shown). In one example, the emissions component is designed to optimize emissions production of data center sites 110 with respect to three types of emissions: (1) COx emissions (e.g., carbon monoxide and carbon dioxide emissions), (2) NOx emissions (e.g., nitrogen dioxide and related pollutant emissions), and (3) SOx emissions (e.g., sulfur dioxide and related pollutant emissions). The emissions component is not limited to processing COx, NOx, and SOx emissions only. The emissions component may be used for processing any types of emissions.

One example feature of an emissions component is to perform optimization to minimize emission costs and maximize emission related revenues. This optimization is based, for example, on (1) yearly target emissions per emission type per data center site 110, (2) a hard constraint or a weighted deviation, (3) price to buy each emissions credit in the market, (4) revenue gained from selling each emissions credit in the market, (5) emission rate for each emission type of supply electricity (e.g., the local energy grid's emission rates), and (6) emission rate for each emission type of each fuel-consuming energy asset 116 at the data center site 110 (e.g., a heater's emission rates, a diesel generator's emission rates, etc). Another feature of an example emissions component is to compare the data center site 110 emissions footprint of an optimized schedule vs. BAU (business as usual) schedule to show how much less emissions are produced using the optimized schedule.

Figure 15:
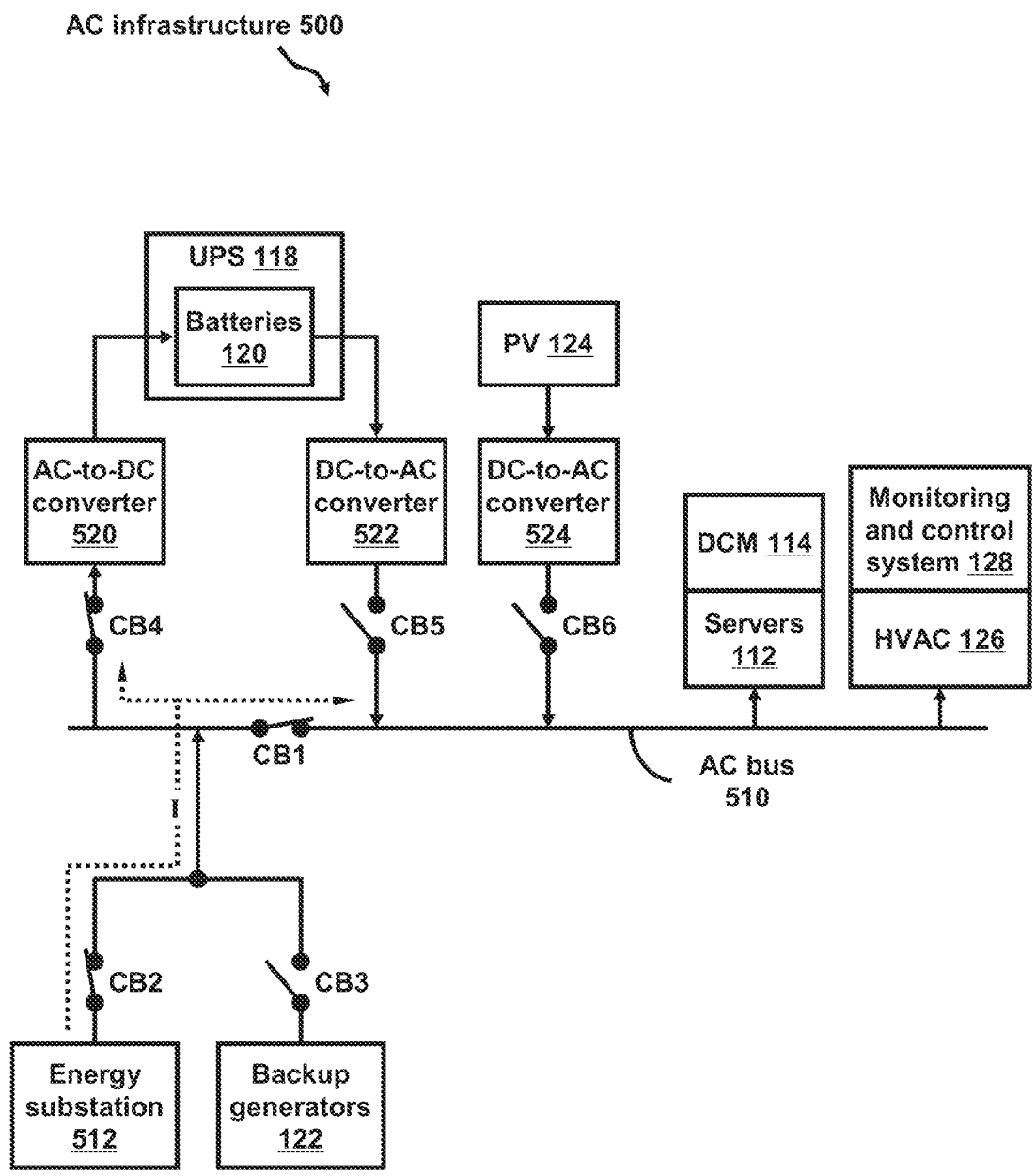
FIG. 15 illustrates an example of a schematic diagram of an alternating current (AC) infrastructure of data center sites, according to principles herein.

Accordingly, FIG. 15 shows that the input data of an emissions component may include, but is not limited to, the annual emissions limit per year (i.e., the cap), a weighted constraint setting, the daily emissions credit buying price, the daily emissions credit selling price, the supply contract emissions rates, and the individual emissions rates for all fuel-consuming energy assets 116 at the data center site 110. For example, FIG. 15 shows energy asset 116-1 emissions rates through energy asset 116-$n$ emissions rates.

The annual emissions limit per year (i.e., the cap) is the maximum emissions allowed (e.g., annually) for a given data center site 110. The cap is set by a regulatory body. Each data center site 110 must ensure that it does not exceed its individual cap. An emissions programs may be mandatory or voluntary. Therefore, an emissions component may have a weighted constraint setting. For example, the weighted constraint may be set to 0, which means do not enforce the emission target (i.e., ignore compliance); set to 1, which means enforce emission target as a soft constraint (i.e., voluntary compliance); or set to 2, which means enforce emission target as a hard constraint (i.e., mandatory compliance). The daily emissions credit buying price is the price to buy an emissions credit at a given data center site 110. The daily emissions credit selling price is the price to sell an emissions credit at a given data center site 110. Accordingly, Table 1 shows an example of the type of emission constraint data that may be input to emissions component.

TABLE 1

Emission constraint data

| Data Item | Description |
| --- | --- |
| CustomerName | Customer name or ID |
| DayID | Day ID string |
| Cox_Target | Daily COx emission target in lbs (tons, etc) |
| Cox_Cost | Daily emission cost in $/lbs (ton, etc) for COx emission production |
| Cox_CreditPrice | Daily COx emission credit price in $/lbs (ton, etc). |
| Cox_AllowancePrice | Daily COx emission allowance price in $/lbs (ton, etc). |
| Cox_TargetType | 0 - Do not enforce COx emission target<br>1 - Enforce COx emission target as soft constraint<br>2 - Enforce COx emission target as hard constraint |
| Repeat for NOx | 0 - Do not enforce COx emission target<br>1 - Enforce COx emission target as soft constraint<br>2 - Enforce COx emission target as hard constraint |
| Repeat for SOx | 0 - Do not enforce COx emission target<br>1 - Enforce COx emission target as soft constraint<br>2 - Enforce COx emission target as hard constraint |

Emissions may be produced by two categories of energy sources (1) local utilities (e.g., energy grid 140) and (2) any fuel-consuming energy assets 116 of data center sites 110, which are the end users.

With respect to local utilities, the energy supply originates from a mix of generation portfolios. Accordingly, there is industry-published data of the emissions contents of the energy supplied by the local utility for a given data center site 110, which is the supply contract emissions rates. For example, for each MWh generated at a certain utility, the amount/MWh of COx, NOx, and SOx emissions produced is known and published. Accordingly, Table 2 shows an example of the type of supply contract emissions data that may be input to an emissions component.

TABLE 2

Supply contract emissions data

| Data Item | Description |
| --- | --- |
| COx Rate | Rate Decimal in lbs (tons, etc)/MWh.<br>The carbon emission rate of the supply contract |
| NOx Rate | Rate Decimal in lbs (tons, etc)/MWh.<br>The nitrogen emission rate of the supply contract |
| SOx Rate | Rate Decimal in lbs (tons, etc)/MWh.<br>The sulfur emission rate of the supply contract |

With respect to fuel-consuming energy assets 116, for each type of fuel (e.g., heating fuel oil, diesel fuel, propane gas, and natural gas) there is an emissions value for a unit of fuel consumed. Examples of energy assets 116 that consume fuel may include, but are not limited to, oil fired heaters, gas fired heaters, gas turbines, and industrial diesel generators. For any individual energy asset 116, the total number of units of fuel consumed for a chosen period of time is used to calculate the amount of emissions produced by that asset. For any individual data center site 110, the emissions for a chosen period of time of all fuel-consuming energy assets 116 is totaled to calculate the total amount of emissions produced at the data center site 110.

An example of a fuel-consuming energy asset 116 is a heater. Therefore, the emissions rate for each unit of fuel consumed by the heater is an input to an emissions component. For example, the COx, NOx, and SOx emissions rates for each MBtu of natural gas consumed by the heater are input to emissions component. Another example of a fuel-consuming energy asset 116 is a diesel generator. Therefore, the COx, NOx, and SOx emissions rates for a gallon of diesel fuel consumed by the generator are input to an emissions component. This emissions rate information may be supplied by the manufacturer of the particular energy asset 116. The emissions rate for each type of fuel is a predetermined industry standard rate. Accordingly, Tables 3 and 4 show an example of the type of heater data and generator data, respectively, that may be input to an emissions component.

TABLE 3

Heater static data

| Data Item | Description |
| --- | --- |
| COx Rate | Decimal in lbs (tons, etc)/MBtu of fuel.<br>The carbon emission rate of the heater fuel |
| NOx Rate | Decimal in lbs (tons, etc)/MBtu of fuel.<br>The nitrogen emission rate of the heater fuel |
| SOx Rate | Decimal in lbs (tons, etc)/MBtu of fuel.<br>The sulfur emission rate of the heater fuel |

TABLE 4

Generator static data

| Data Item | Description |
| --- | --- |
| COx Rate | Rate Decimal in lbs (tons, etc)/Gal (cfm, ton, etc) of fuel.<br>The carbon emission rate of the generator fuel |
| NOx Rate | Decimal in lbs (tons, etc)/Gal (cfm, ton, etc) of fuel.<br>The nitrogen emission rate of the generator fuel |
| SOx Rate | Decimal in lbs (tons, etc)/Gal (cfm, ton, etc) of fuel.<br>The sulfur emission rate of the generator fuel |

Tables 5 through 11 show examples of the types of solution data that may be generated by the emissions component. That is, Tables 5 through 11 show an example of the output of emissions component.

TABLE 5

Case summary solution data

| Data Item | Description |
| --- | --- |
| COx_Production | COx production in lbs |
| COx_Cost | Daily cost for COx emissions |
| NOx_Production | NOx production in lbs |
| NOx_Cost | Daily cost for NOx emissions |
| Sox_Production | SOx production in lbs |
| Sox_Cost | Daily cost for SOx emissions |

TABLE 6

Market demand resource solution data

| Data Item | Description |
| --- | --- |
| Cox | Produced COx emission of the market demand resource |
| NOx | Produced NOx emission of the market demand resource |
| Sox | Produced SOx emission of the market demand resource |

TABLE 7

Customer solution data

| Data Item | Description |
|---|---|
| Cox | Produced COx emission by the customer |
| COx_Cost | Interval cost in $/lbs (ton, etc) for COx emission production |
| NOx | Produced NOx emission by the customer |
| NOx_Cost | Interval cost in $/lbs (ton, etc) for NOx emission production |
| Sox | Produced SOx emission by the customer |
| Sox_Cost | Interval cost in $/lbs (ton, etc) for SOx emission production |

TABLE 8

Supply contract solution data

| Data Item | Description |
|---|---|
| Cox | Produced COx emission by the supply contract |
| NOx | Produced NOx emission by the supply contract |
| Sox | Produced SOx emission by the supply contract |

TABLE 9

Heater time dependent data

| Data Item | Description |
|---|---|
| COx | COx emission in lbs (ton, etc) produced by a baseboard heater |
| NOx | NOx emission in lbs (ton, etc) produced by a baseboard heater |
| SOx | SOx emission in lbs (ton, etc) produced by a baseboard heater |

TABLE 10

Generator solution data

| Data Item | Description |
|---|---|
| COx | Produced COx emission by the generator |
| NOx | Produced NOx emission by the generator |
| SOx | Produced SOx emission by the generator |

TABLE 11

Emission constraints solution data

| Data Item | Description |
|---|---|
| CustomerName | Customer name or ID |
| DayID | Day ID string |
| Cox | Produced COx emission by the customer |
| Cox_Credit | COx credit in $/lbs (ton, etc)., the amount below the target |
| Cox_Allowance | COx emission allowance in $/lbs (ton, etc), the amount above the target |
| Cox_Cost | Daily emission cost in $/lbs (ton, etc) for Cox emission production |
| Cox_CreditValue | Daily credit value in $/lbs (ton, etc) for Cox emission production |
| COxAllowancecost | Daily allowance cost in $/lbs (ton, etc) for Cox emission production |
| Repeat for NOx | Daily allowance cost in $/lbs (ton, etc) for Cox emission production |
| Repeat for SOx | Daily allowance cost in $/lbs (ton, etc) for Cox emission production |

With respect to Tables 1 through 11, all information thereof exists for each time interval (e.g., every 30 minutes) of the operating schedule for the chosen period of time. An emissions component may be implemented to calculate the time intervals of the day that produce the most and least amount of emissions. Additionally, the emissions component may be used to calculate the deviation from the emissions cap.

Graphical user interface (GUI) screens (not shown) associated with an emissions component may be used to present customer-level information for a certain period of time. For example, for a certain data center site 110, GUIs may be provided for displaying the total COx, NOx, and SOx emissions (with the capability to drill down to hourly data), BAU emissions vs. optimized emissions, emissions credits bought, and emissions credits sold. Also, GUIs of Emissions component may be used to present energy asset-level information for a certain period of time. For example, for a certain energy asset 116, GUIs may be provided for displaying the total COx, NOx, and SOx emissions (with the capability to drill down to hourly data), and BAU emissions vs. optimized emissions.

In an example, an emissions component can be implemented to monitor the emissions cap and/or to determines the need to buy emissions credits and/or sell emissions credits. An emissions component can be implemented to optimize for minimizing emissions costs. In one example, a data center site 110 may increase energy consumption (therefore increasing emissions) and buy emissions credits. In another scenario, a data center site 110 may reduce energy consumption (therefore reducing emissions) and sell emissions credits. Therefore, an emissions component may output one of three solutions (1) use exactly the emissions cap amount (operate at the cap limit), (2) buy emissions credits, or (3) sell emissions credits all based on financial values in energy markets and emissions markets.

Operating Schedules and Optimization

Figure 14:
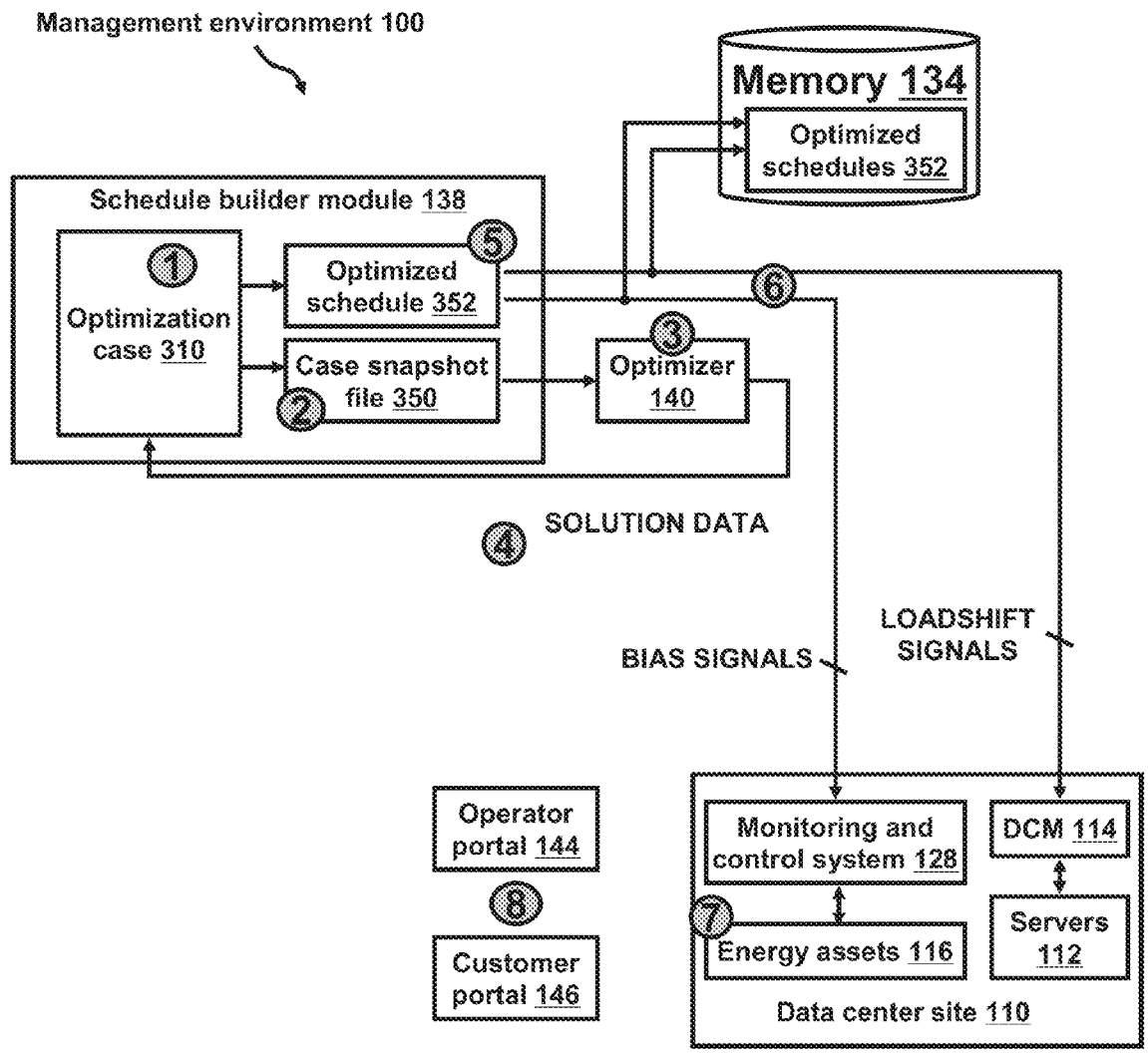
FIG. 14 illustrates a block diagram of a portion of the example management environment and the example energy management system of FIG. 11, according to a principle herein.

FIG. 14 illustrates a block diagram of a portion of management environment 100 and energy management system 130 of FIG. 11 and a process of managing data center utilization with respect to reducing energy costs, reducing emissions costs, and/or generating revenue from energy markets. In this example, the process of managing data center utilization with respect to reducing energy costs, reducing emissions costs, and/or generating revenue from energy markets for a chosen period of time may include, but is not limited to, the following.

At block 1, schedule builder module 138 is used to collect, compile, and/or process, for example, the information described in FIG. 13. That is, schedule builder module 138 pulls in all the information from customer component 312, location component 314, supply contract component 316, strategy component 317, price component 318, emissions component 324, server component 326, defaults data 330, forecasts data 332, constraints data 334, readings data 336, and/or the simulation results created via case modeling and simulation component 340 into a single object, which is optimization case 310, that may be published to optimizer 140. Again, because data center sites 110 are underground facilities, the model of a data center site 110 that is created using case modeling and simulation component 340 may be simplified as compared with aboveground facilities.

At block 3, the schedule builder module 138 generates a case snapshot file 350 that contains a snapshot of the simulation results from case modeling and simulation component 340 and all other information collected by and/or included in optimization case 310. For example, case snapshot file 350 includes attributes of all the energy assets 116 as well as other information, such as regional energy price information 152 and emissions information 154. Case snapshot file 350 also includes information about CPU utilization of servers 112 of the data center site 110. Case snapshot file 350 is fed into optimizer 140. Further, the information in case snapshot file 350 is based on the strategy determined by strategy component 317. In one example, case snapshot file 350 may be a comma-separated values (CSV) file. The CSV file is then transmitted to optimizer 140.

At block 4, optimizer 140 reads in the case snapshot file 350. In one example, the procedure of block 4 can be performed in a three-step process. The first step is to calculate how the environment responds on a normal day using the default settings of energy assets and with no outside intervention by energy management system 130. The result of the first pass may be the CBL or BAU schedule. Alternatively, a predetermined CBL or BAU schedule may be passed into optimizer 140 rather than calculated. Additionally, optimizer 140 may be used to indicate the financial cost with respect to the CBL or BAU schedule.

The second step is to run optimization with certain operating changes that may be entered by a system operator (not shown) of energy management system 130. The second step also considers energy prices and emissions credits prices. Again, optimizer 140 indicates the financial cost of the optimized operating schedule, preferably showing the financial benefit thereof as compared with the first optimization pass.

The third step is to determine whether there is financial benefit to maintaining CPU utilization (which corresponds to energy usage) at the data center site 110 of interest, which is in a certain energy market price region, or whether there is financial benefit to shifting CPU utilization to a different data center site 110 that is in a different energy market price region. This step may involve running optimization on multiple data center sites 110, then deciding which one has the most economic benefits and suitable capacity for a certain time period.

From the three-step process of block 4, optimizer 140 can generate a set of SOLUTION DATA for optimizing the operation and/or control of energy assets 116 for a chosen period of time (T) with respect to (1) maintaining suitable comfort levels, (2) significantly reducing energy costs (3) significantly increasing revenue from energy markets (4) significantly reducing emissions, and (5) significantly increasing revenue from emissions trading. That is, optimizer 140 generates a set of SOLUTION DATA for the energy assets 116 that optimizes the energy usage, generation (if any), and storage (if any) of a data center site 110 for the purpose of reducing energy costs, reducing emissions costs, and/or generating revenue from energy markets. Accordingly, a main function of optimizer 140 is to achieve the financial objective of minimizing cost with respect to the overall energy costs of a data center site. Therefore, SOLUTION DATA includes the results of the combination of multiple sub-functions, such as, but not limited to, the following:

(a) minimizing cost of deviation from business-as-usual (BAU) comfort levels,
(b) minimizing cost of deviation from the emissions target,
(c) minimizing cost of electric power production by the data center site's energy generating assets,
(d) minimizing cost of electric power supply from the load serving entity (e.g., energy grid) or the electric distribution company, and
(e) maximizing demand response (DR) revenue.

Additionally, the SOLUTION DATA of optimizer 140 includes information that may be used by the data center site 110 for optimizing CPU utilization with respect to energy usage, generation (if any), and storage (if any) of a data center site 110 for the purpose of reducing energy costs, reducing emissions costs, and/or generating revenue from energy markets. For example, for a certain period of time, if optimizer 140 of energy management system 130 determines that the financial benefit of operating from energy grid 105W is greater than the financial benefit of operating from energy grid 105M, CPU utilization (or computing load) may be shifted from data center site 110M to data center site 110W for that period of time; assuming any and all data center policies are adhered to.

At block 4, the SOLUTION DATA from optimizer 140 is transmitted back to schedule builder module 138.

At block 5, the SOLUTION DATA can be formatted as an optimized schedule 352. The optimized schedule 352 can be generated for a specified period of time, such as but not limited to a 24-hour period (i.e., one calendar day), and includes settings information for the energy assets 116 of a data center site 110 as well as CPU utilization information for the servers 112 of the data center site 110. The information may be provided for predetermined intervals of the 24-hour period, such as for every 15-, 30-, 45-, or 60-minute interval.

The SOLUTION DATA from optimizer 140 may be interpreted by schedule builder module 138 and the result may be one or more BIAS SIGNALS that are transmitted to the monitoring and control system 128 and one or more LOADSHIFT SIGNALS that are transmitted to the DCM 114.

With respect to the BIAS SIGNALS, because there may be an assumption that the energy assets 116 are operating at their individual default settings, energy management system 130 may be configured to transmit any changes with respect to the default values. For example, if the default thermostat setting in a certain building zone is 70° F. and optimizer 140 determines that the thermostat setting should be 72° F. from 9-11 am, then a BIAS SIGNAL of +2° F. for the time period of 9-11 am is transmitted from energy management system 130 to the monitoring and control system 128 of the data center site 110. Likewise, if the default thermostat setting is 70° F. and optimizer 140 determines that the thermostat setting should be 69° F. from 3-4 pm, then a BIAS SIGNAL of −1° F. for the time period of 3-4 pm is transmitted from energy management system 130 to the monitoring and control system 128. There may be, for example, one BIAS SIGNAL per building and/or per building zone. Any BIAS SIGNAL is an additional input to the monitoring and control system 128.

The information indicated in the LOADSHIFT SIGNALS may include, for example, a quantity component, a location component, and a time component. The quantity component may include, for example, a specific amount of power to be shifted, such as 1 megawatt, or a certain percent of CPU utilization to be shifted, such as 25%, from one data center site 110 to another. The location component may include, for example, the locations of two or more data center sites 110 that are involved in the load shifting operation. Additionally, the location component may include, for example, two or more servers 112 at the same data center site 110 that are involved in the load shifting operation. The time component includes the day and time period in which the load shifting operation takes applies. In one example, based on certain market conditions, the LOADSHIFT SIGNALS may indicate to shift 1 megawatt of power from data center site 110E to data center site 110W from 2 pm to 4 pm today.

In the scenario in which the optimization strategy is iterative, the process described in blocks 1 through 5 may be repeated until suitable case optimization is achieved. Further, optimized schedule 352, along with constraints, may be passed back and forth between energy management system 130 and a certain data center site 110 and optimized multiple times before the end-user accepts.

At block 6, once a suitable optimized schedule 352 is successfully achieved, the optimized schedule 352 is saved in memory 134 and also deployed to the monitoring and control system 128 and the DCM 114 of the data center site 110. That is, a BIAS SIGNAL for each building zone is transmitted to the monitoring and control system 128 and a LOADSHIFT SIGNAL is transmitted to the DCM 114.

At block 7, once deployed, the energy assets 116 of the data center site 110 are operated and/or controlled according to the information in optimized schedule 352 for the chosen period of time. Additionally, the servers 112 of the data center site 110 are operated and/or controlled according to the CPU utilization information in optimized schedule 352 for the chosen period of time.

At block 8, system operators may use operator portal 144 to monitor and/or control energy assets 116 and/or servers 112 according to optimized schedule 352. Additionally, end-users 128 may use customer portal 146 to monitor and/or process information about the energy assets 116 and/or servers 112.

In energy markets, ancillary services support the reliable operation of the transmission system as it moves electricity from generating sources to retail customers. Examples of ancillary services include "Synchronized Reserve" and "Regulation." Synchronized Reserve supplies electricity if the grid has an unexpected need for more power on short notice. Regulation is a service that corrects for short-term changes in electricity use that might affect the stability of the power system. An entity that is participating in the Regulation service must be able to respond rapidly (within a few seconds or minutes) to a "regulation" signal. CPU utilization (or computing load) in a data center may be adjusted very rapidly (in about a few milliseconds). Therefore, CPU utilization (or computing load), which corresponds directly to energy consumption, may be used to rapidly respond to a "regulation" signal. In an example of a "regulation" process with respect to data center sites 110, a certain ISO or RTO may transmit a "regulation" signal to energy management system 130 of a certain data center site 110. Energy management system 130 then passes the "regulation" signal to DCM 114 of the data center site 110. The DCM 114 then issues commands to adjust or otherwise modulate (including increase or decrease) the CPU utilization (or computing load) of servers 112 sufficiently to meet the energy demand that is require to meet the requirements of the "regulation" signal.

In certain examples, energy management system 130 of energy management environment 100 may be able to aggregate energy assets. For example, energy management system 130 has certain subscription of "regulation" data center sites 110 and of "synchronized reserve" data center sites 110. If an ISO/RTO 152 has a need for a certain amount of power and energy management system 130 has two data center sites 110 co-located within a geographical region services by an ISO/RTO, and each of which can supply an amount of power that sums to the amount requested by the ISO/TRO, then energy management system 130 may aggregate the two data center site sources into one energy asset. As a non-limiting example, if an ISO/RTO 152 has a need for 500 kW and energy management system 130 has two data center sites 110 each of which can supply 250 kW, energy management system 130 may aggregate the two sources into one 500 kW asset. In this way, the two data center sites 110 can participate in the market in a way that they otherwise could not. More particularly, energy management system 130 allows ISOs/RTOs 152 to be customer-agnostic and energy management system 130 can perform the aggregation to meet the demand. Currently, ISOs/RTOs 152 may require knowledge about every specific regulated asset. However, an aspect of energy management system 130 may be the capability to publish an amount of regulated assets to ISOs/RTOs 152 and then perform aggregation without ISOs/RTOs 152 having knowledge of specific assets.

In certain examples, energy management system 130 of energy management environment 100 may be able to aggregate emissions credits. For example, if a certain data center site 110 has need to buy 1 emissions credit and two other data center sites 110 each have 0.5 emissions credits to sell, energy management system 130 may aggregate the two selling data center sites 110 to meet the need of the buying data center site 110. In this way, energy management system 130 can perform the aggregation to meet the demand for emissions credits, which allows emissions regulatory agencies 162 to be customer-agnostic.

Figure 16:
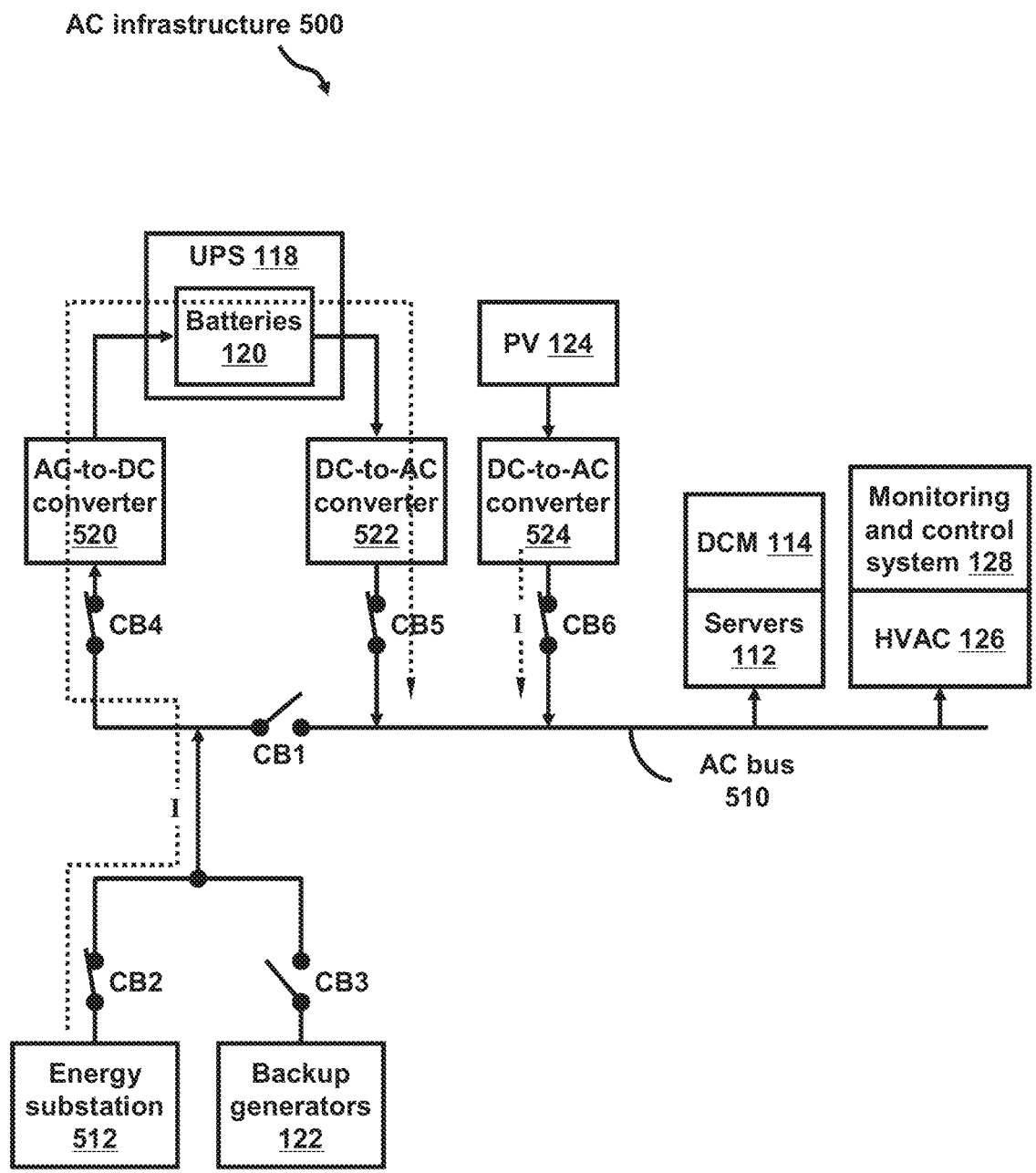
FIG. 16 illustrates another example of a schematic diagram of an alternating current (AC) infrastructure of data center sites, according to principles herein.

FIGS. 15 and 16 illustrate an example of a schematic diagram of AC infrastructure 500 of data center sites 110 and a method of providing improved power quality thereto. In this example, any electric powered equipment of a data center site 110 may be supplied by an alternating current (AC) bus 510. For example, servers 112, DCM 114, HVAC 126, and monitoring and control system 128 are electrically connected to AC bus 510. A main circuit breaker 1 (CB1) is arranged in along AC bus 510.

AC bus 510 is supplied by an energy substation 512, which is associated with a certain energy grid 105. Energy substation 512 may be connected to and disconnected from AC bus 510 by a CB2. Backup generators 122 may be electrically connected to AC bus 510 in parallel to energy substation 512. Backup generators 122 may be connected to AC bus 510 via a CB3.

An AC input of an AC-to-DC converter 520 may be connected to and disconnected from AC bus 510 by a CB4. The DC output of AC-to-DC converter 520 supplies the DC input of UPS 118, which includes batteries 120. The DC output of UPS 118 supplies a DC input of a DC-to-AC converter 522. An AC output of DC-to-AC converter 522 may be connected to and disconnected from AC bus 510 by a CB5. Additionally, the DC output of PV 124 supplies a DC input of a DC-to-AC converter 524. An AC output of DC-to-AC converter 524 may be connected to and disconnected from AC bus 510 by a CB6. The voltage outputs of AC-to-DC converter 520, DC-to-AC converter 522, and DC-to-AC converter 524 are accurately regulated and maintained. Additionally, the outputs of DC-to-AC converter 522 and DC-to-AC converter 524 are in-phase and synchronized before serving AC bus 510, and in particular before serving HVAC 126. Further, DC-to-AC converter 522 and DC-to-AC converter 524 provide a pure sign wave with no harmonics.

CB1 through CB6 may be any standard circuit breakers that are suitable for use in the AC infrastructure of a facility, such as a data center site 110. AC-to-DC converter 520 may be any standard converter device for converting AC energy to DC energy. DC-to-AC converters 522 and 524 may be any standard converter devices for converting DC energy to AC energy. The voltage and current ratings of CB1 through CB6, AC-to-DC converter 520, and DC-to-AC converters 522 and 524 are suitable for supporting AC infrastructure 500 of a data center site 110.

AC infrastructure 500 may operate in two modes of operation: (1) a "normal mode" of operation and (2) a "power quality mode" of operation. "Normal mode" means that AC bus 510 is supplied by energy substation 512 and is, therefore, subject to any voltage variations (e.g., dips and spikes) that may exist on the energy grid. "Power quality mode" means that AC bus 510 is supplied by mechanisms that ensure a desired voltage level with substantially no voltage variations.

FIG. 15 shows AC infrastructure 500 in "normal mode" as selected by a certain combination of CB1 through CB6. AC infrastructure 500 may operate in "Normal mode" using either energy substation 512 or backup generators 122. Additionally, in "Normal mode," batteries 120 of UPS 118 may be set to either charging or not charging. Tables 12 through 15 show examples these scenarios of AC infrastructure 500 operating in "Normal mode." By way of example, FIG. 15 shows CB1 through CB6 set according to Table 12.

TABLE 12

Mode = Normal, Source = Energy Substation, Battery Charging = YES

| CB1 | CB2 | CB3 | CB4 | CB5 | CB6 |
|---|---|---|---|---|---|
| closed | closed | open | closed | Open | open |

TABLE 13

Mode = Normal, Source = Energy Substation, Battery Charging = NO

| CB1 | CB2 | CB3 | CB4 | CB5 | CB6 |
|---|---|---|---|---|---|
| closed | closed | open | Open | Open | open |

TABLE 14

Mode = Normal, Source = Backup Generators, Battery Charging = YES

| CB1 | CB2 | CB3 | CB4 | CB5 | CB6 |
|---|---|---|---|---|---|
| closed | open | closed | closed | Open | open |

TABLE 15

Mode = Normal, Source = Backup Generators, Battery Charging = NO

| CB1 | CB2 | CB3 | CB4 | CB5 | CB6 |
|---|---|---|---|---|---|
| closed | open | closed | Open | Open | open |

Referring again to FIG. 15 and Table 12, CB1 and CB2 are closed and CB3 is open. Therefore, energy substation 512 is supplying AC bus 510 directly and backup generators 122 are connected. FIG. 15 also shows CB4 closed. Therefore, batteries 120 of UPS 118 are being charged by AC-to-DC converter 520. Additionally, CB5 and CB6 are open. Therefore, no energy from batteries 120 of UPS 118 (via DC-to-AC converter 522) or PV 124 (via DC-to-AC converter 524) are supplying AC bus 510. Because energy substation 512 is supplying AC bus 510 directly, AC bus 510 is subject to any voltage variations (e.g., dips and spikes) that may exist on the energy grid. Accordingly, servers 112, DCM 114, HVAC 126, and monitoring and control system 128 are subject to any voltage variations that may exist on the energy grid, which may be detrimental to the operation of the data center site 110.

FIG. 16 shows AC infrastructure 500 in "Power quality mode" as selected by a different combination of CB1 through CB6. AC infrastructure 500 may operate in "Power quality mode" using either energy substation 512 or backup generators 122. Additionally, in "Power quality mode," batteries 120 of UPS 118 are always set to charging. Tables 16 through 17 show examples these scenarios of AC infrastructure 500 operating in "Power quality mode." By way of example, FIG. 16 shows CB1 through CB6 set according to Table 16.

TABLE 16

Mode = Power Quality, Source = Backup Generators, Battery Charging = YES

| CB1 | CB2 | CB3 | CB4 | CB5 | CB6 |
|---|---|---|---|---|---|
| open | closed | open | closed | closed | optional |

TABLE 17

Mode = Power Quality, Source = Backup Generators, Battery Charging = YES

| CB1 | CB2 | CB3 | CB4 | CB5 | CB6 |
|---|---|---|---|---|---|
| open | open | closed | closed | closed | optional |

Referring again to FIG. 16 and Table 16, CB1 is open so that neither energy substation 512 nor backup generators 122 may supply AC bus 510 directly. CB3 is open, which disconnects backup generators 122. CB2 and CB4 are closed and, therefore, energy substation 512 is supplying AC-to-DC converter 520. AC-to-DC converter 520 converts the AC to DC and charges batteries 120 of UPS 118. The DC output of batteries 120 is then converted back to AC by DC-to-AC converter 522, which supplies AC bus 510 via CB5. The DC output of PV 124 is converted to AC by DC-to-AC converter 524 and, optionally, supplies AC bus 510 via CB6.

Because the voltage outputs of DC-to-AC converter 522 and DC-to-AC converter 524 are accurately regulated and maintained, the quality of the AC energy supplied to AC bus 510 is improved as compared with "Normal mode" of operation. Accordingly, the quality of the AC energy supplied to servers 112, DCM 114, HVAC 126, and monitoring and control system 128 is improved because AC bus 510 is not subject to voltage variations that may exist on the energy grid. Additionally, DC-to-AC converter 522 and DC-to-AC converter 524 provide a pure sign wave at AC bus 510 with no harmonics.

The capacity of batteries 120 of UPS 118 should be suitable to supply the energy assets of the data center site 110. AC infrastructure 500 may operate in "Power quality mode" in an ongoing fashion, thereby ensuring a desired voltage level that has substantially no voltage variations and no harmonics at, for example, servers 112. "Power quality mode" of AC infrastructure 500 of data center sites 110 is suited for what is known in the energy industry as voltage variability/reactive power (V/VAR) support.

In a non-limiting example, a given data center infrastructure (e.g., power systems, HVAC systems, server operation) may be governed by a data center manager implementing a special-purpose energy management system for the data center site. The example energy management system can be configured to provide data center infrastructure and energy management processor-executable instructions (including software) for, e.g., large enterprises, government agencies, and managed service providers. The example energy management system can be configured to address example data center elements, such as but not limited to: silos of data, constrained capacity, inadequate power/cooling/space, and/or data center inefficiencies. A non-limiting example energy management system can be configured to execute processor-executable instructions that provide solutions to allow data center managers to collect, synthesize and analyze the overwhelming amount of raw data available from facilities and IT equipment and turn it into useful business information for making decisions in real time. Such insight can allow data center managers to improve the efficiency, capacity and utilization of their data centers. The example energy management system can be implemented to provide solutions that take analytics to the next level by linking real-time information with automated processes. For example, using automation capabilities of an example energy management system according to the principles herein, data center managers can automate existing processes and take action based on environmental changes or other trigger events in order to optimize performance, reliability and service levels.

As non-limiting examples, the energy management system can be implemented to provide solutions that include:

Capacity Management—Using the PAR[4] energy efficiency methodology (a metric for IT energy efficiency that complies with Underwriters Laboratories standard UL2640) and a what-if analysis, an example energy management system can be configured to manage and prevent issues including running out of power or space in existing data centers, thereby prolonging the life of existing data centers.

Consolidation—Through server utilization efficiency analysis, an example energy management system can be used to identify the best opportunities for hardware consolidation and replacement combining power utilization and application quality of service requirements, addressing the need to reduce the amount of hardware resources for operational or capital costs perspective.

Business Continuity/Event Response—an example energy management system can be used to increase the reliability of fail-over processes and prolong operations during outages through automation and optimization.

Chargeback—an example energy management system can be used to provide visibility into real-time power utilization and environmental monitoring allowing for accurate tracking in single or multi-customer environments.

In a non-limiting example, the Power Assure® EM/4 software (Power Assure, Inc, Santa Clara, Calif.), can be used to provide monitoring, analysis, and automation of data center information and processes. In an example implementation, an energy management system can be configured to interface with the Power Assure® EM/4 software to provide a solution according to the principles described herein.

In an non-limiting example implementation, an example energy management system can be implemented to provide actionable, real-time and historical insight into power utilization and other key performance indicators (KPIs) for a data center, along with the means to analyze, optimize and automate energy efficiency while maintaining service levels. As non-limiting examples, the energy management system can be implemented to enables data center operators to:

Gain real-time insight and intelligence into data center power, capacity, and performance Quickly visualize and identify inefficiencies in a comprehensive way Maximize use of available space and power Uncover hidden capacity Identify stranded power Extend the useful life of the data centers Cut on-going power consumption by an average of about 50%

Improve data center efficiency and utilization

Automate responses to both expected and unexpected events

Shift loads within and across sites

In an example implementation, managing various energy assets of a data center may be implemented in a phased manner to facilitate revenue generation from wholesale electricity markets. Each phase may target a specific energy resource within the data center, and phases may be implemented sequentially over time for a given data center, or in any combination concurrently for a given data center. For example, a first phase may target the data center's HVAC system; a second phase may target backup generation, other distributed energy generation resources (e.g., renewables), and energy storage resources (e.g., batteries) (collectively "power resources"); and a third phase may target server computing load at the data center.

In the example below, a first energy management system can be configured to determine suggested operating schedules for the data center based on a net economic cost optimization process, and providing one or more control signals representing such operating schedules. A second data center energy management system can be configured for receiving control signals from the first energy management system representing suggested operating signals, and controlling data center energy assets (e.g., power resources, HVAC, server computing load, according to a suggested operating schedule.

An example first phase can involve implementation of a HVAC system optimization. A HVAC may represent a significant portion of a data center's energy use profile. For example, 50% of a data center's electrical demand may come from the HVAC system. In some examples, approximately 65% of the HVAC electricity usage load may be controllable and the data center may sustain temperature variations between 60° F. and 80° F. In an example, the controllable HVAC load may be made available to wholesale electricity energy and/or the synchronized reserve markets. An example HVAC management strategy, described below, can result in a smooth temperature profile modulation, taking into account market economics and the elasticity between electricity prices and server reliability.

Figure 17:
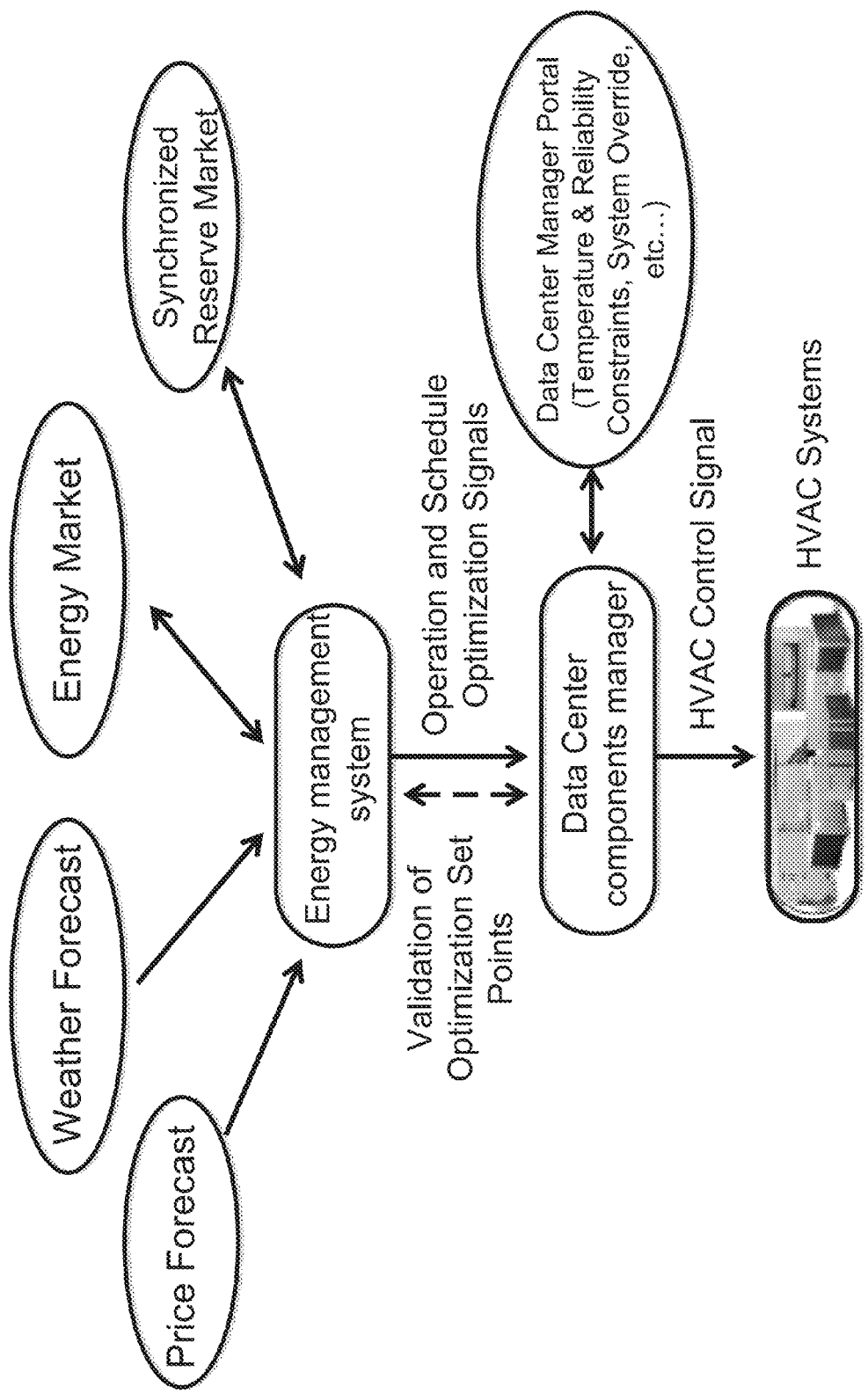
FIG. 17 illustrates an example HVAC management strategy, according to the principles herein.

FIG. 17 shows an example HVAC management strategy. The example HVAC management strategy can be described as follows.

In a first step, the example energy management system receives at least one of the following inputs:

Energy Price and Weather for the geographical location of each data center

Data center operation and reliability constraints, including, but not limited to:

recommended operating temperature range of the data center;

in case of temperature variation, maximum response time needed for bringing a given data center's temperature within recommended temperature range;

forecasted data center load; and/or any applicable data center manager override schedule In a second step, based on these inputs, the example energy management system generates a series of data center operation scenarios to determine the optimal operation case that can yield the desired financial and operational benefits to the data center operator.

In a third step, on a real time basis, the example energy management system monitors energy pricing and grid conditions signals from the RTO/ISO or foreign market operator. Once real time conditions match one of the most favorable simulation cases developed in Step 2, the example energy management system inquires a data center components management system what resources are available under these conditions, and the data center components management system commits the appropriate case by sending an OK signal to the example energy management system monitors energy pricing and grid conditions signals from the RTO/ISO or foreign market operator.

In a fourth step, once a signal from the example energy management system monitors energy pricing and grid conditions signals from the RTO/ISO or foreign market operator indicates to initiate, the data center components management system in turn translates the control signal from the example energy management system into an actionable signal, which sets the appropriate temperature point for the HVAC system. In one example aspect, the data center manager can override the HVAC system energy management strategy and action plan. This can cause a return to a business as usual situation in case unforeseen reliability or safety conditions arise.

An example second phase can involve implementation of management of backup generators and energy storage. Backup generators, renewable resources, and energy storage resources (e.g., batteries) (collectively "power resources") can hold the potential for significant savings and revenue for data center owners.

Backup generators and/or energy storage resources can be used for ensuring continuous reliable power supply and keeping data centers running during outages. According to the principles described herein, backup generators and/or energy storage resources may also be configured to generate revenues from energy markets while maintaining their ability to respond to data center power emergencies in a timely and reliable fashion. This dual, yet reliable backup generator operation mode is made possible by the predictive and adaptive energy management algorithms embedded in the energy management systems described herein. Accordingly, these systems of the data center may be configured to participate in emergency demand response programs (e.g., the "capacity" market) as well as wholesale electricity energy markets and ancillary markets, such as the regulation market or the synchronized reserve market.

Figure 18:
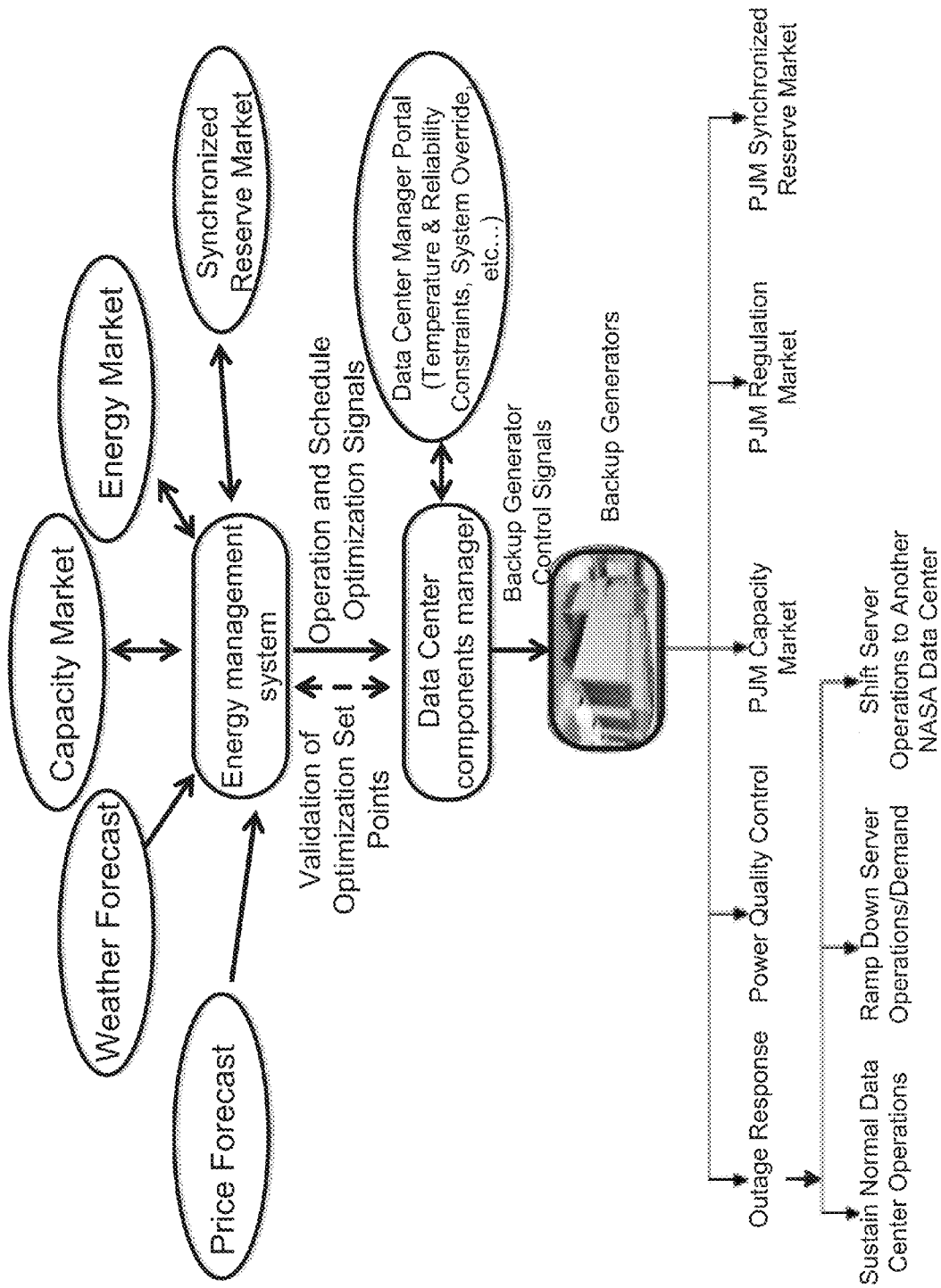
FIG. 18 illustrates an example backup generator management strategy, according to the principles herein.

FIG. 18 shows an example backup generator management strategy. Similar to the HVAC management strategies described herein, an aspect of the backup generator management strategy is the ability of the data center manager to override the participation or commitment of backup generators to the RTO/ISO or foreign market operator (e.g., PJM) should unforeseen reliability and safety conditions arise. Non-limiting example steps in the backup generator strategy are as follows:

In a first step, the energy management system can receive at least one of the following inputs:
  energy price, weather, and outage forecasts for the geographical location of each of the data centers.
  data center operation and reliability constraints, including, but not limited to:
    outage contingency plans;
    forecasted data center load; and/or
    any applicable data center manager override schedule In a second step, based on these inputs, the energy management system can generate a series of operation scenario suggestions for the backup generators that can yield the desired financial and operational benefits to the data center owner/operator.

In a third step, a data center manager can be used to verify availability and initiate control and dispatch of generators.

In a fourth step, on a real time basis, an energy management system can be used to monitor energy pricing and grid conditions signals from the RTO/ISO or foreign market operator. Once real time conditions match one of the more desirable simulation cases developed in the second step, the energy management system commits the appropriate backup generator operation case by sending a control signal to data center manager to dispatch and control the generators.

In a fifth step, in case of a power outage, any ongoing market participation can be automatically halted and the an energy management system can be configured to broadcast an optimal control signal to the data center manager system. This optimal control signal reflects the outage contingency plan provided by the data center manager in the first step. The data center manager system can be configured to use the energy management system signal to determine the appropriate course of action such as maintaining normal server operation, ramp down server operations, or shift the operation of the entire server load to another data center.

Additional energy storage capacity and/or renewable resources also may be added to the data center backup generation portfolio. Such addition can extend the outage support capability for the data center and the additional market revenues from this expansion could pay for this investment.

Figure 19:
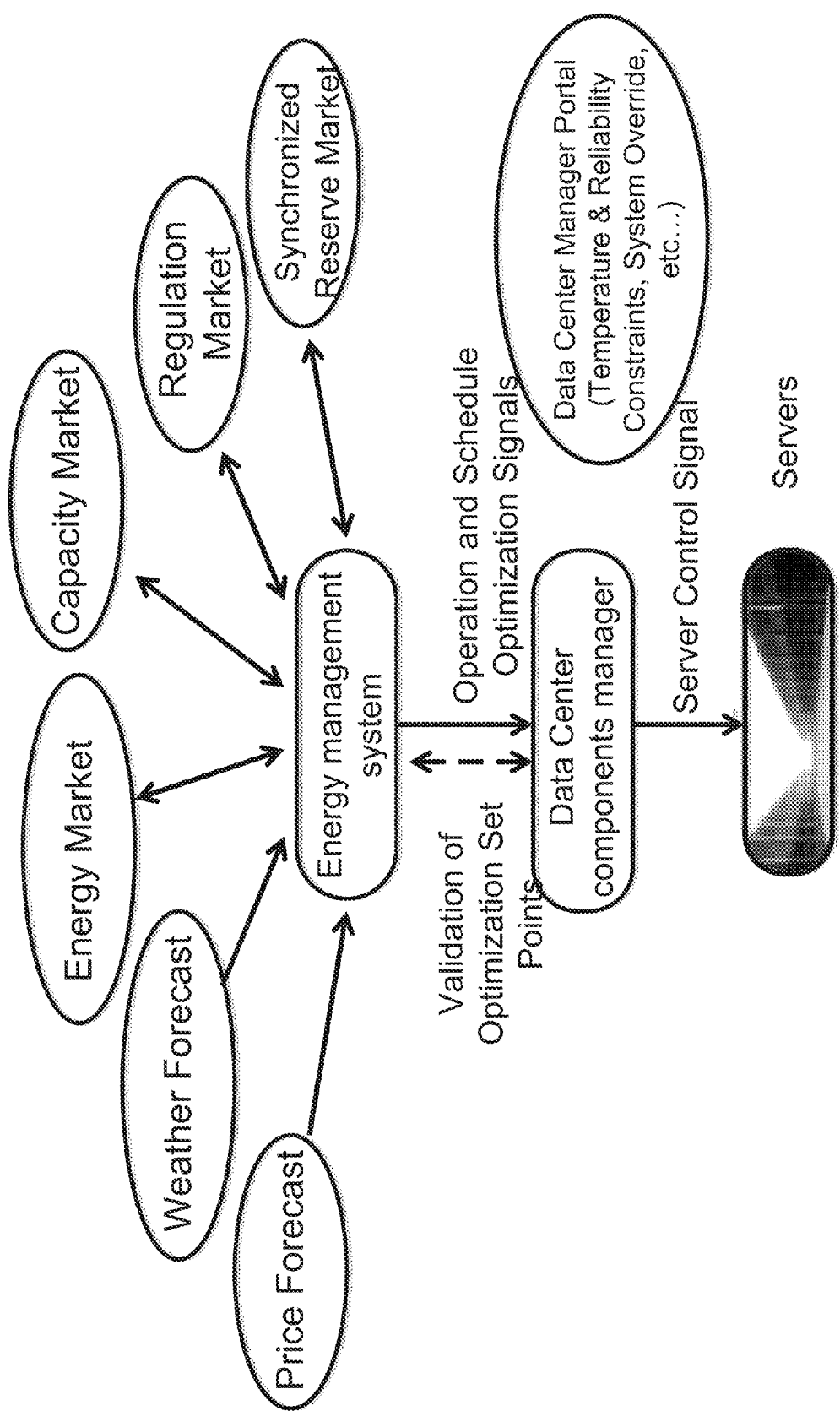
FIG. 19 illustrates an example server load management strategy, according to the principles herein.

FIG. 19 shows an example strategy for server load management. In some data centers, servers account for approximately 50% of the total electricity usage. Also, up to approximately 50% of the server computing load may be controllable, and therefore may be leveraged to achieve energy savings and revenue potentials, according to the principles described herein. One example of a revenue generation strategy involves monetization of this controllable server computing load in one or more of the capacity, energy, and ancillary services (regulation, synchronized reserve) markets of the RTO/ISO. The server load management strategy shown in FIG. 19 includes processes that are similar to those of the HVAC system, except in this phase, the optimal control signal is configured for modulating the workload of the servers.

Figure 20:
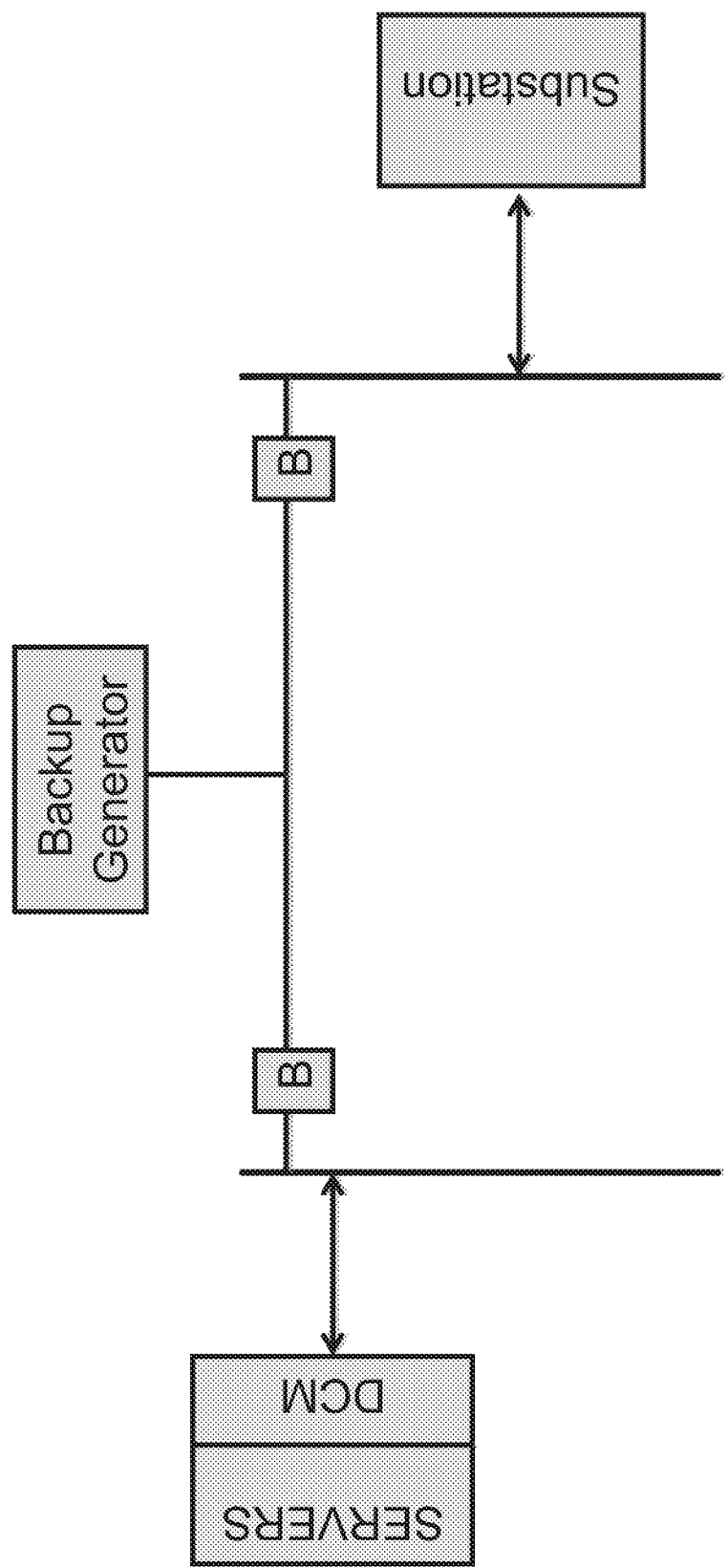
FIGS. 20-23 show non-limiting examples of energy assets at a data center site to which the optimization can be applied, according to the principles herein.
Figure 21:
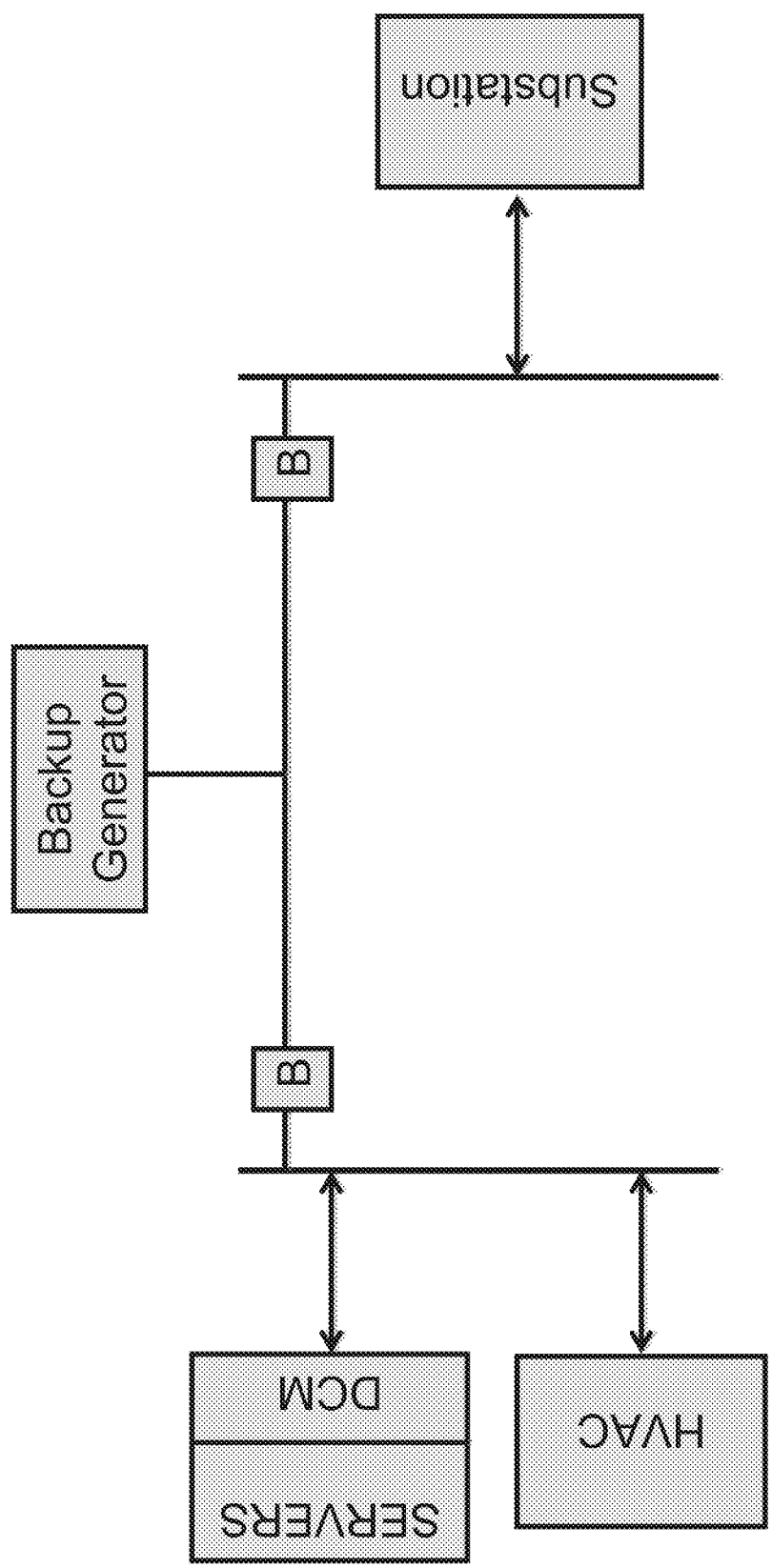
Figure 22:
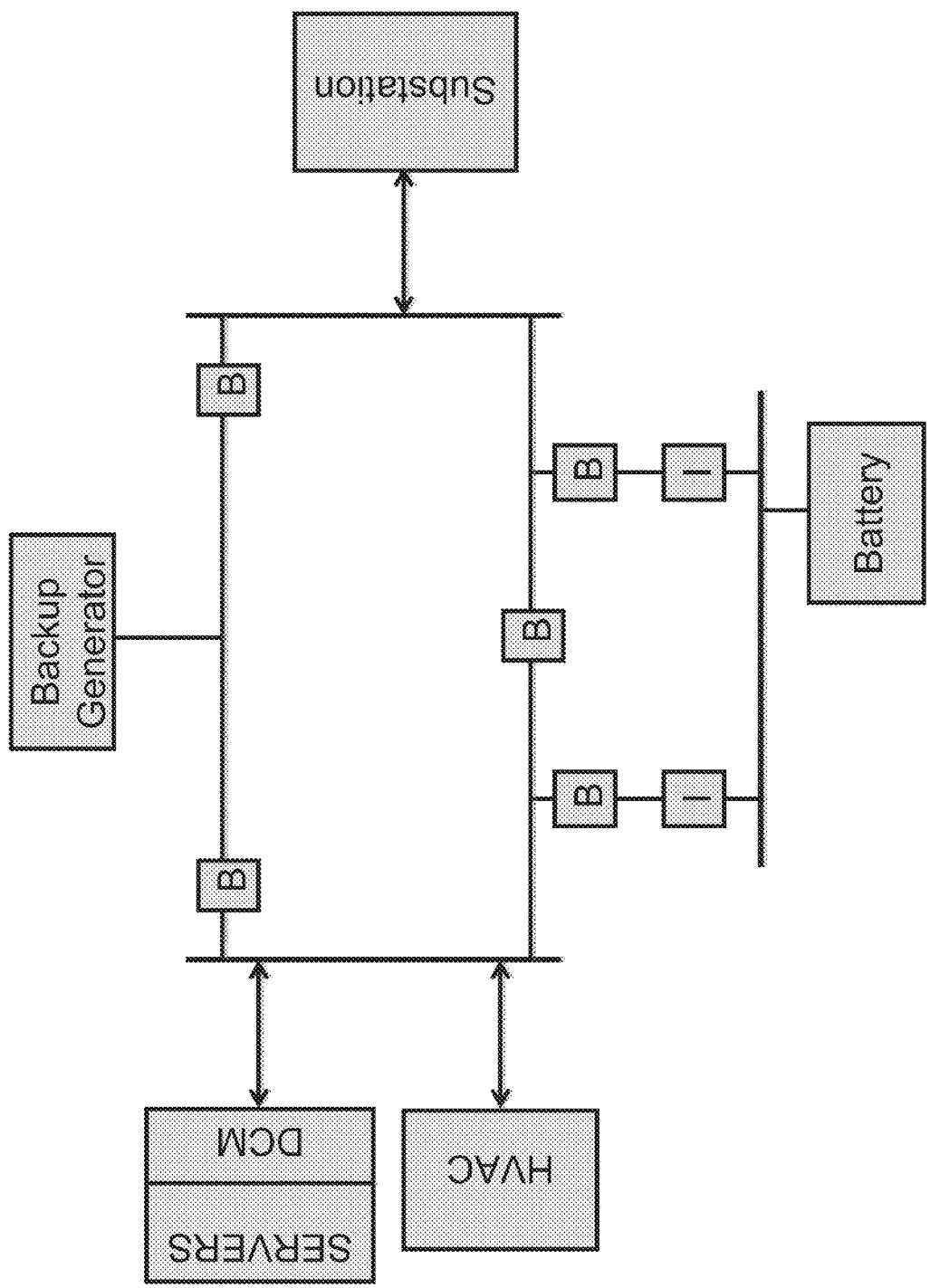
Figure 23:
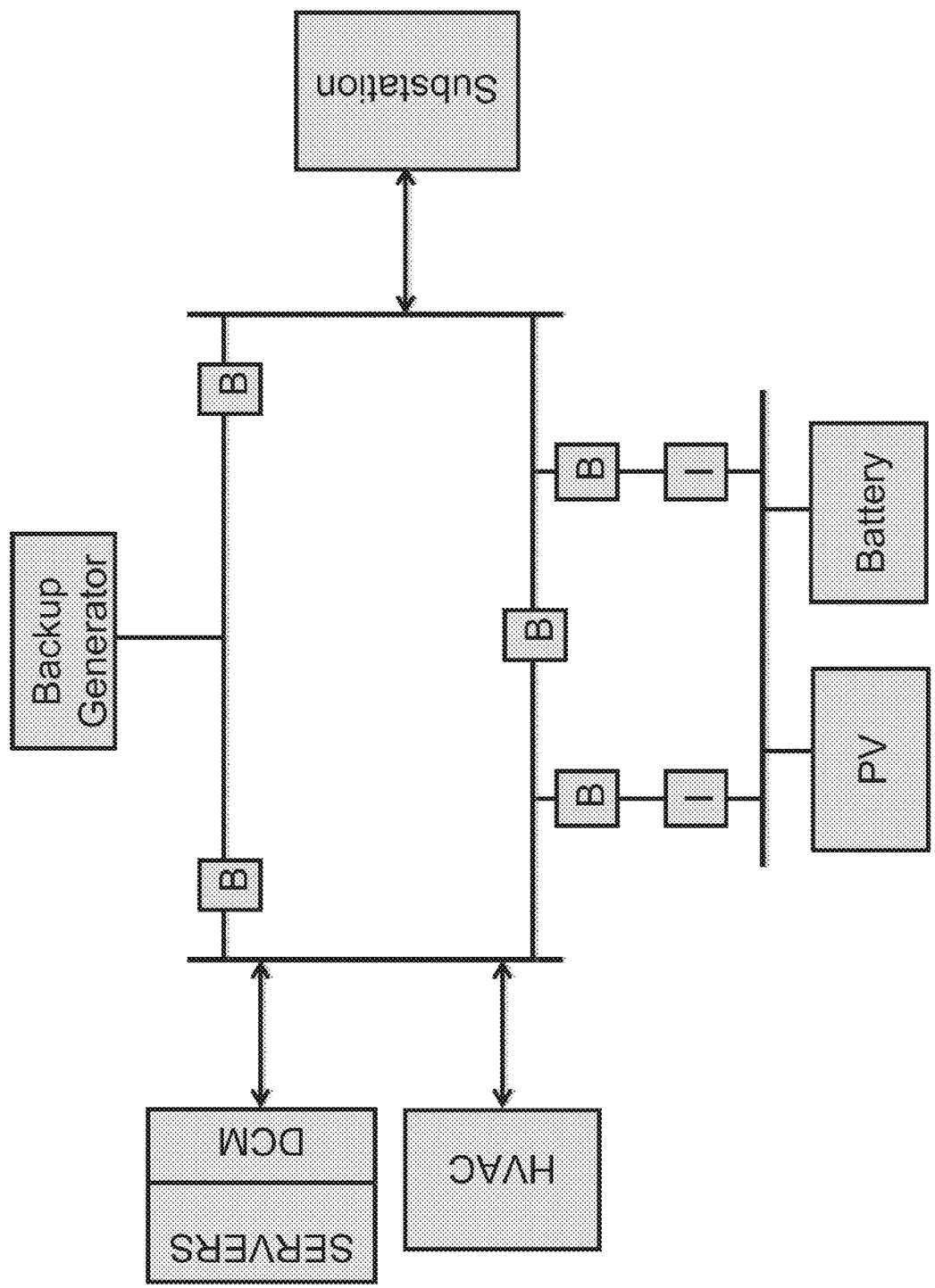

FIGS. 20-23 show non-limiting examples of various combinations of energy assets at a data center site to which the systems, methods and apparatus described herein can be applied. Specifically, the principles of the data center optimization described herein can be applied to the energy assets of any example data center site (e.g., a data center having components as shown in any of FIGS. 20-23) to generate a suggested operating schedule for at least one of the energy assets to derive the energy-related revenue. FIG. 20 shows an example of data center optimization in which the systems, methods and apparatus described herein are applied to at least the server(s), DCM, backup generator, and substation of the example data center site. FIG. 21 shows an example of data center optimization in which the systems, methods and apparatus described herein are applied to at least the server(s), DCM, backup generator, substation and HVAC of the example data center site. FIG. 22 shows an example of data center optimization in which the systems, methods and apparatus described herein are applied to at least the server(s), DCM, backup generator, substation, HVAC and battery of the example data center site. FIG. 23 shows an example of data center optimization in which the systems, methods and apparatus described herein are applied to at least the server(s), DCM, backup generator, substation, HVAC, battery, and photovoltaic system of the example data center site.

In an example implementation, the data center optimization for a data center site that includes server(s), DCM, backup generator, substation, HVAC, battery, and a photovoltaic system can be performed in a staged process. In a first stage, the data center optimization can be performed initially based on the server(s), DCM, backup generator and substation. In a second stage, the data center optimization is updated to encompass the HVAC. In a third stage, the data center optimization from the second stage is updated to encompass the battery as well. In a fourth stage, the data center optimization from the third stage is updated to encompass the photovoltaic system.

The different types of energy assets available at a data center site can determine the types of energy markets in which the data center may participate. Table 18 below shows the example of the types of energy assets of an example data center site that can be committed to different types of markets (e.g., capacity market, energy market, or synchronized reserve market). For example, the capacity of a backup generator, battery and HVAC can be committed for economic demand response or a capacity market, according to any of the principles described herein. In another example, the capacity of a battery or the DCM can be committed to a regulation market, according to any of the principles described herein. As another example, the capacity a backup generator and a battery can be committed for a demand response, according to any of the principles described herein. As yet another example, the capacity a battery and a HVAC can be committed for power quality, according to any of the principles described herein.

TABLE 18

| | Economic Demand Response | Regulation | Synchronized Reserve | Capacity | Power Quality |
|---|---|---|---|---|---|
| Backup Generator | ✓ | | ✓ | ✓ | |
| PV | | | | | |
| Battery | ✓ | ✓ | ✓ | ✓ | ✓ |
| DCM | | ✓ | | | |
| HVAC | ✓ | | | ✓ | ✓ |

To generate the suggested operating schedule, the optimizer 140 can perform computations over various parameters, such as but not limited to the forecast wholesale market price over time period T for each geographic location of each data center site for participating in the energy market, the regulation market price available to each data center and over what time interval, other potential energy-related revenue (including synchronized reserve markets and capacity markets), and the energy responsive behavior of each energy asset of the data center. Table 18 illustrates how the energy responsive behavior of different energy assets of a data center can determine the type of market that the data center participates in according to the generated operating schedule. For example, the suggested operating schedule may include processor-executable instructions that cause the backup generator of a data center to be committed to an economic demand response market, a synchronized reserve market, or a capacity market as a part of the overall optimization over the time period T. In another example, the building of the data center itself, the occupancy of the building, the HVAC systems; chillers; ventilators; heaters; lighting; or other similar energy assets can exhibit thermal inertia, i.e., it can take longer time scales for such energy assets to respond to a change in signal to reach a change of state (e.g., get to a lower temperature). The operating schedule can include processor-executable instructions to commit these types of energy assets to respond to an economic demand response market, a capacity market and/or a power quality market at some time interval during time period T based on the modulation of use of these energy assets. In other examples, the state of charge of a battery at a given point in the day determines whether it has sufficient capacity to be committed to any of the economic demand response market, regulation market, synchronized reserve market, capacity market or power quality market. As another example, the suggested operating schedule can include processor-executable instructions that cause the servers to be committed to a regulation market based on modulating the CPU utilization (or computing load), since the servers can respond on a fast timescale (e.g., according to regulation signals that can change potentially at 2-second time intervals). Given that increased CPU utilization (or computing load) of servers can cause them to heat, and as a result may also require increased cooling, there can be an interaction term between the server utilization and the usage of energy assets such as HVAC systems; chillers; ventilators; or heaters. As a result, implementation of servers in, e.g., the regulation market, can affect how energy assets such as HVAC systems; chillers; ventilators; or heaters are implemented in the energy markets, through time-based interaction terms. The systems, methods and apparatus described herein perform optimization that evaluate the types of energy assets in each data center site, the state of each of the various energy assets at each data center site, the markets available to each different data center site and the forecast prices for each such market, and the behavior of each energy asset, all over a specified time period T. The result is generation of a suggested operating schedule for the various energy assets (and/or for the controller of each energy asset), that, when executed, can generate energy-related revenue, over a time period T, associated with operation of the energy assets according to the operating schedule.

Following is a description of the different markets, including energy markets and regulation markets, to illustrate how each market can affect the operation of any of the energy assets described herein.

Dynamic Virtualization

Dynamic virtualization is an integrated solution for energy generation and storage involving energy assets, such as batteries and solar generators. This uses a version of examples with virtual partitioning of an energy storage asset. Dynamic virtualization can be used to co-optimize energy storage assets and solar generation across different energy markets or other uses. These markets or uses may include (1) electric energy provided over the grid to the energy market, and (2) the ancillary services market (which may include regulation, which is focused on regulation of power frequency and voltage on the grid) or (3) use of the storage device to maintain power quality at the owners' facilities.

Dynamic virtualization uses examples of systems with the virtual partitioning of the battery or other type of energy storage asset into virtual separate batteries, each virtual energy storage asset being allocated to separate markets or functions, such as participating in the energy market, and the ancillary services (regulation) market or use to maintain power quality at the premise. The virtual partition of the batteries is not physical, but is instead an allocation of energy storage asset capacity to various markets or uses. This virtual partition by allocation is dynamic in that it can be constantly changed in response to changing price points and performance requirements during the day.

There are rapid swings in load on the spot electric energy market. In order to maintain electrical balance on the grid and regulate consistent power and voltage on the grid over short periods of time, for example, over periods of four seconds, fifteen seconds, or one minute, the grid operator sends out signals to change generation to match the load changes. Batteries are particularly well suited to respond to these short response time signals.

With examples of the principles herein, energy storage assets such as batteries can be applied to swing between the markets for energy and ancillary services for regulation of the grid or for the maintenance of power quality at the energy storage asset owner's facility. In the past, batteries were not purchased and installed for the purpose of providing regulation services, because batteries tend to be too expensive for this purpose alone. Most regulation services now come from gas powered generators providing about 1-10 megawatts, and these energy assets take time to turn on and off. Industrial batteries, however, are instant on and off and usually provide power in the 1 megawatt range—and can respond to grid operator signals in milliseconds.

In the past, energy storage and energy storage asset facilities were usually purchased with the intent to provide backup power for the owners, in case the electric power grid goes down or temporarily provides inadequate power. However, once the battery or other type of energy storage assets are installed to satisfy backup capacity for the owner, they may also to some extent be active in the regulation market to regulate the power and voltage on the grid, and in the energy market, to sell power into the grid in response to real-time pricing changes (or to cut the user's demand on the grid). For example, energy storage assets may discharge to the grid during high LMP price hours.

Energy storage assets may include batteries, ice units, compressed air, or other technologies to store energy on site by users and generators of power. Batteries may be of any type, including lithium ion, lead acid, flow batteries, dry cell batteries, or otherwise.

Solar generators of power may include solar panels, solar cells, any other photovoltaic power generator, or any means for generating power from sunlight. This may also include generation of electricity from steam or similar use of liquid to gas phase generation from sunlight, to generate electricity.

The energy market involves generating power, distributing power into the grid, and drawing power out of the grid, each at a price. This is measured in terms of megawatt hours that are the amount of power delivered. Energy is delivered for sustained periods of time, such as for 15 minutes or more.

The capacity market is measured in terms of megawatts of capacity. In this market, a seller makes their facilities available to generate electricity when needed and holds them in reserve for that purpose, but may never actually distribute energy into the grid rather than just be on-call. This, in effect, pays the seller to be available and impacts the reliability of the grid.

The ancillary market includes regulation of frequency and voltage in the grid, and the provision of an operating reserve. The regulation of the voltage in the grid involves discharging energy into the grid or absorbing energy from the grid in small increments, frequently, for short periods of time, and very rapidly.

Smart grid services increasingly rely on new technologies such as renewable energy and large-scale storage resources. Unfortunately, the life-cycle costs associated with such resources, when taken individually, are still high compared with more traditional forms of energy production. In addition, the desired proliferation of distributed and renewable resources on the power grid introduces new threats to its reliable operation, as they are subject to unpredictable drops in output, such as when the wind stops blowing. Consequently, both economic and reliability issues introduce substantial obstacles to a high penetration of those technologies in the power grid.

By themselves, storage resources such as electrical batteries are presently high cost options. Likewise, photovoltaic generation and wind turbines are comparatively quite expensive and their intermittency creates new strains on the power grid.

However, when optimally managed by various examples disclosed herein to provide timely support to the power grid, the net cost of electrical storage can be substantially reduced, as the result of payments by the grid operator (ISO/RTO) provides for facilities that can be called on to provide such support. Also, combining energy storage with intermittent generation makes technologies such as wind and solar more predictable on the grid, and hence, more valuable.

Examples, including dynamic virtualization, can dramatically improve the economics of renewable generation and storage technologies, by co-optimizing their operation to participate in the various energy and ancillary services (including regulation) markets and thus maximize their economic benefits.

Examples focus on the economics of batteries and energy storage and, by providing energy resource optimization and a gateway to the wholesale markets, can help facility managers deploy a comprehensive energy storage solution that can cost-effectively meet an organization's business objectives.

More broadly, when optimally coupling energy storage with renewable generation, various examples redefine the economics of such resources, while providing firm, dispatchable virtual generation that supports the reliability objectives of the power grid. Thus, by integrating distributed resources into virtual generation via system operator dispatch, examples can help enable the acceleration of renewable energy generation technologies such as solar and wind.

Systems Including Energy Storage Assets

Large-scale storage is widely seen as a necessary piece of the smart grid and a key component of America's electricity future. This recognition is driven by the following factors: (1) the growing adoption of intermittent renewable power sources; (2) state and nationwide budget shortfalls, leading local governments to seek cost-effective solutions for maintaining America's aging infrastructure; and (3) the widespread belief that electric vehicles ("EVs") will materially grow their market share over the next 5 to 15 years.

In this context, stakeholders have been looking for ways to accelerate the development and implementation of grid-level storage. Effective battery and other energy storage asset solutions can take unpredictable energy resources and turn them into reliable power, while matching electricity supply to demand; they play a crucial role in fostering microgrids and distributed generation, viable alternatives to expanding the U.S.'s power infrastructure; and they can address the new and unique concerns created by EVs, such as helping to maintain grid stability and giving utilities and grids more control over energy dispatch.

A key concern with batteries has long been their high upfront cost and long payback periods. Various examples address this by providing battery-owners a robust gateway to the wholesale electricity markets, thus unlocking new streams of revenues that increase their return on investment. This may also apply to other types of energy storage assets.

Various examples provide processor-executable instructions (including software solutions) that optimizes participation in wholesale markets by providing energy storage asset owners with dynamic virtualization, a service that continuously re-partitions the energy storage asset for different markets and uses, chiefly real-time energy, and regulation, and power quality control, in an optimized manner, based on pricing and weather data, retail electricity rates, and characteristics of the energy storage asset and its host site.

For large retailers and supermarkets, backup generation is a necessary but often expensive proposition. The nation's largest big box chains have taken a variety of approaches to minimizing the costs of providing substitute power in the case of an emergency or brownout; but for many stores, their only choice to date has been inefficient and costly diesel generators.

Examples with dynamic virtualization optimally manage an energy storage asset's state of charge based on the revenue producing opportunities in the wholesale market, as well as the organization's business objectives, such as providing backup power to critical loads for a given period of time. Thus, when paired with these examples, the energy storage asset becomes an energy resource that will concurrently: (1) participate in the energy markets by providing a way to shift the net load of a facility from high- to low-price periods; (2) participate in the frequency regulation market by responding to real-time signals from the grid operator; (3) participate in other wholesale markets, such as energy and synchronized reserve; and (4) provide reactive/voltage support to the microgrid/distribution grid.

Examples enable the energy storage asset to maximize revenues from the various wholesale markets, while maintaining its ability to achieve its main objective of providing a reliability service to the organization. To achieve this, examples herein describe virtualization of the energy storage asset and creating dynamic "energy storage asset partitions," in a manner similar to the way computing resources are virtualized. Through its optimization capability, an example determines in hourly increments which portion of the controller output (including its capacity), and hence the energy storage asset capacity (including its SOC), can be allocated to the energy and regulation markets respectively, while maintaining sufficient reserve to meet the forecasted backup requirements. The optimal control (to perform the optimization described herein) can take into account the forecasted and real-time hourly prices for each of the markets, along with the time and weather dependent backup requirements of the facility. When combined with other resources such as renewable generation, backup generation or demand response, the examples described herein can extract the maximum value of all such resources while meeting the organization's reliability, comfort, and sustainability objectives.

Following is a description of the different markets, including energy markets and regulation markets, to illustrate how each market can affect the operation of an energy storage asset.

Regulation Market

In a non-limiting example, capacity of the energy storage asset may be committed to the regulation market to maintain the frequency and/or voltage on the power line. For example, system operators seek to maintain the system frequency at very near to a nominal frequency of around 60 Hz in the U.S. or around 50 Hz in some other countries (including countries in the European Union). If the frequency is too high, there is too much power being generated in relation to load. A system operator would send a signal to participants in the regulation market to increase their load, or ask for generation to be reduced, to keep the system in balance. If the frequency is too low, then there is too much load in the system, and the system operator would send a signal asking for generation to be increased or the load reduced. A grid operator may use a real-time communication signal to call for either a positive correction (referred to in the industry as "regulation up") or negative correction (referred to as regulation down"). If load exceeds generation, the frequency and voltage tend to drop. The ISO/RTO system operator would relay a signal requesting regulation up. If, however, generation exceeds load, the frequency tends to increase. The ISO/RTO system operator would relay a signal requesting regulation down (including asking for reduced generation).

The regulation market may seek commitment of a system on an hourly basis. However, the ISO/RTO system operator may relay regulation signals for regulation up and/or regulation down at much shorter timescales. For example, during the commitment period, the adjustments of regulation may take place minute-by-minute, on the order of a minute or a few minutes, or on the order of a few seconds (e.g., at 2-second or 4-second intervals). Traditional regulation applies to slower responding energy storage assets (e.g., assets with about 5 minutes response time), such as but not limited to chillers. Faster responding energy storage assets, such as but not limited to batteries, can respond within about 2 seconds. In an example, the objective cost function may include a term to performance incentives offered for fast responding energy storage assets. To participate in the regulation market, a resource may receive and may need to respond to a regulation signal generated by the grid operator approximately every 2 seconds. (In some territories, this rule may be relaxed somewhat for batteries.) The energy storage asset responds to this signal with a percentage of its maximum resource capability that is bid into the regulation market. Examples receive and respond to this signal and distribute it among the various resources participating in the regulation market within a given price zone, based on the results produced by an optimizer If the ISO/RTO system operator sizes the regulation signals to adequately balance the signal in the long run, the charge of the energy storage asset may merely fluctuate around its initial state of charge when it started to provide regulation. That is, the proportion of the available state of charge of the energy storage asset that is committed for use to provide regulation may be delivered at variable charge rates or discharge rates. Adequately balanced regulation signals should neither completely deplete nor fill the energy storage asset.

In a non-limiting example, the regulation price may be set at average values of around $30-$45/MW per hour, with hourly rates fluctuating around this average value. Some regulation markets may pay simply for the commitment of an available capacity of the energy storage asset during a time period, such as for an hour, with a separate payment for the total amount of energy ultimately provided. Thus, payment at the regulation price may be made for the period of commitment, even if the system is not called upon to provide regulation during the commitment period.

There may also be additional payment from the energy market for energy generated, based on the wholesale electricity market price (the LMP).

Operating characteristics of the energy storage asset include power (or its instantaneous delivery capability in kW) and the energy stored in the energy storage asset (or the amount of power it can generate over one hour, or kWh). In a non-limiting example, a battery rated at 1.5 MW power and 1.0 MWh energy storage capacity will be able to provide 1.5 MW power for a total period of 40 minutes (60×1/1.5). Thus, if the owner bids 1.5 MW into the regulation market for a given hour, a 50% discharge signal over 2 seconds could decrease the battery's charge level by 0.8 kWh (1.5 MW×1/1800 hrs).

As part of a certification for participating in the regulation market, the ISO/RTO system operator may verify that the energy storage asset is capable of responding to the regulation bid into the market. The ISO/RTO system operator may require that the energy storage asset be able to be charged/discharged at its full enrolled amount, when receiving a +/−100% regulation signal within a duration of 10 minutes. In the 1.5 MW example above, the battery charge would be increased/decreased by +/−250 kWh (1.5 MW×1/6 hr).

For example, assuming that the energy storage asset starts with an initial state of charge of 50% at time t=0. Ideally, the regulation signal is "net zero," meaning that the quantity of charged/discharged energy averages to zero over a given 24-hour period. In reality, the state of charge of the energy storage asset may at times drift to the limits of the energy storage asset's recommended state of charge. If the state of charge exceeds some adjustable maximum or minimum values, various examples include compensating by exiting the regulation market for the next hour and bringing the energy storage asset back to its initial set-point.

In an example, the operating schedule that is generated according to an implementation of an apparatus herein specifies intervals of time when the energy storage asset may be committed to the regulation market. During these time periods, the operating schedule may additionally indicate the points during these intervals of time where energy may be bought to charge the energy storage asset if its state of charge falls below a desirable limit, or where excess energy may be sold if the state of charge is too high. This discharge can contribute to a short-term demand response action in the real-time energy market.

Energy Market

To participate in the energy market, the energy storage asset should to be able to provide the "as bid" energy into the real-time market for the next hour. Various examples compute the optimal charge or discharge signal in anticipation of or in response to the economic signals, while maintaining minimum and maximum constraints on the state of charge of the energy storage asset. When combined with other controllable resources, such as renewable generation or advanced lighting and HVAC systems, examples extract the maximum economic value of each resource, given external factors and constraints. For example, examples can use an energy storage asset to compensate for the intermittency of renewable generation, and can include demand response actions to help maintain the balance.

Figure 24:
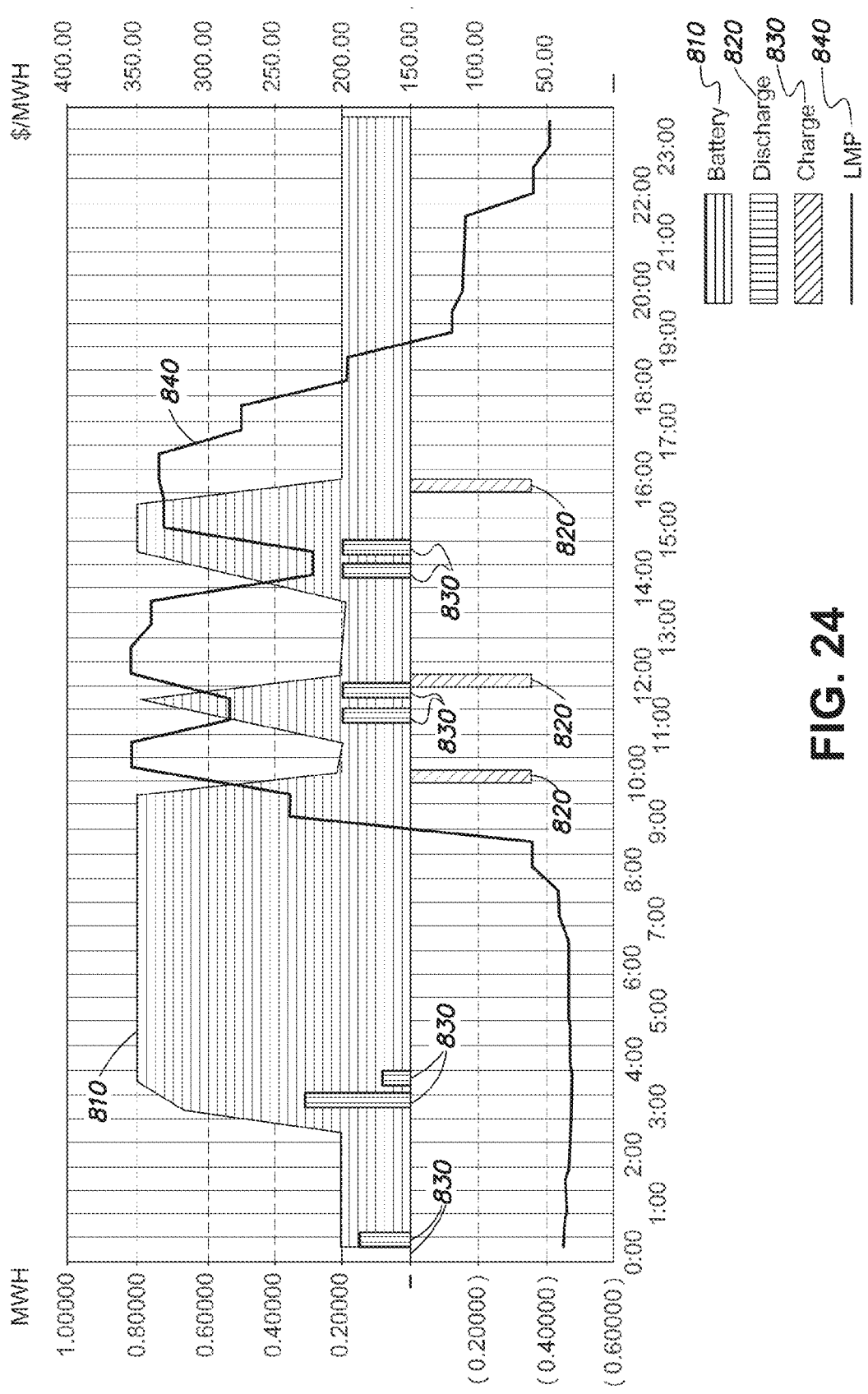
FIG. 24 shows an example of an implementation based on an operating schedule, according to the principles herein.

FIG. 24 shows an example energy storage asset optimization in response to economic signals and performance needs. The horizontal axis is time over a 24 hour cycle. The left vertical axis is megawatt hours. The right vertical axis shows price in dollars per megawatt hours. The volume under the line battery 810 shows the stored capacity in the battery. The three lines below the horizontal axis shows the discharge 820 from the battery. The seven vertical lines 830 above the horizontal axis shows charging to the battery 830. The line 840 shows the LMP energy price throughout the 24-hour cycle to which indicated energy assets are responding. In this example, examples determine the optimized hourly charge and discharge schedule of a 1.5 MW/1.0 MWh battery in response to an LMP price signal. The optimization is further constrained to maintain a 200 kWh minimum capacity for backup purposes, and a maximum capacity of 800 kWh to maintain charge/discharge cycle efficiency.

Spinning Reserve Market

To participate in the spinning reserve market, the energy storage asset should to be able to commit resources to provide power during unplanned outages of base load generators. Spinning reserve is generation capability that can provide power to the grid immediately when called upon by the ISO/RTO and reach full capacity within 10 minutes. The energy storage asset needs to be electrically synchronized with the grid, e.g., through the controller, to participate in this market. Revenue in the spinning reserve market is for capacity rather than energy. It requires quick response but makes low total energy demand. Requests in the spinning reserve market may be made around 20-50 times per year.

Revenue for the spinning reserve market may be determined based on the ability of an energy storage asset to provide power during an unplanned event, such as a generator failure. Revenue may also be derived based on the amount of energy (MWh) that is generated during active participation in the spinning reserve market, such as based on the electricity wholesale price.

Market Based on Voltage/VAR Ancillary Service

To participate in a market based on a voltage/VAR ancillary service, certain resources of the energy asset may be committed to provide for voltage control and/or VAR control.

The voltage/VAR ancillary service seeks to maintain reliability and power quality. It may appear at the microgrid level or feeder level of a distribution system.

A voltage control ancillary service assists in maintaining system voltages within an acceptable range (120 volts±about 5% or 220 volts±about 5%) to customers served by a feeder. For example, if the supply line voltage fluctuates by some amount, resources of the energy asset may be committed to adjust the distribution primary voltage so that the distribution primary voltage also does not drift out of the acceptable range. In another example, if the current (ampere) flowing on the feeder increases during peak load conditions, the voltage along the feeder may decrease due to an increase in current flow, resulting in decreased voltage for customers that are further from the substation end of the feeder. Here, resources of the energy asset may be committed to raise the line voltage under peak load conditions to account for any increased voltage drop. If instead the feeder is lightly loaded, the voltage drop may be lower, and resources of the building asset may be committed to lower the voltage to avoid possible high voltage conditions.

VAR refers to the reactive power (measured in volt-ampere reactive (VARs)). VAR is the electrical energy that energizes capacitive components and inductive components in a power system. A non-limiting example of a capacitive component is overhead conductors, which are continuously charged and discharged by an alternating current (AC) waveform. Non-limiting examples of inductive components are electric motors and transformers, which can store energy in magnetic fields that are used for device operation. By reducing the amount of VARs flowing on the distribution feeder, an electricity supplier can reduce electrical losses and improve the voltage profile along the feeder. Where reactive power varies throughout the day, the capacitive components of a energy asset that are equipped with switches can be placed in or out of service as needs vary during the day. These capacitive components of the energy asset may be equipped with controllers. A system, apparatus, or method may be used to determine when to switch the switches on or off. For example, when the voltage at the location of the capacitive component is low, the operating schedule determined according to a principle herein may include instructions for the controller to close the switch to place the capacitive component in service. When the voltage is high, the operating schedule may include instructions for the controller to open the switch to remove the capacitive component from service.

Revenue from a market based on the voltage/VAR ancillary service may be determined based on the ability of an energy storage asset of the energy asset(s) to be used to provide the voltage controls and/or the VAR controls. In an example, the voltage/VAR control may apply in a microgrid application at the microgrid bus level, which may introduce a reliability cost to the computation of the net-energy-related cost.

Co-Optimization Across Multiple Markets and/or Ancillary Services

As described above, the economic signal can be a driver for the average charge status of the energy storage asset. It responds to price signals that are averaged on an hourly basis. The regulation signal can be seen as having a "bias" effect over the average charge, in response to the regulation commands. Examples co-optimize the energy storage asset charge by first economically optimizing the charge status of the energy storage asset, then allocating the balance of the available power to the regulation market, on an hourly basis.

By adding user-adjustable upper and lower constraints to the optimized energy storage asset charge, examples take into account reliability objectives (e.g. backup) and charge/discharge cycle efficiency. Other constraints can be added, based on the type of energy storage asset technology used, to maximize charge/discharge round trip efficiency, and optimize energy storage asset life versus energy storage asset replacement costs.

In addition to co-optimizing a storage resource at a given location, examples have the capability to perform a global optimization across multiple data center sites within the same price zone, and disaggregate the regulation and economic signals among the various data center sites. In particular, this gives data center sites that do not have the minimum energy storage asset capacity required the ability to participate in the regulation market.

Co-Optimization with Other Distributed Resources

With various examples, distributed resources can earn maximum economic benefit through co-optimization. Co-optimization of various resources on one site results in accelerated payback for all assets, and this, in turn, accelerates the market-wide penetration of these resources.

Figure 25:
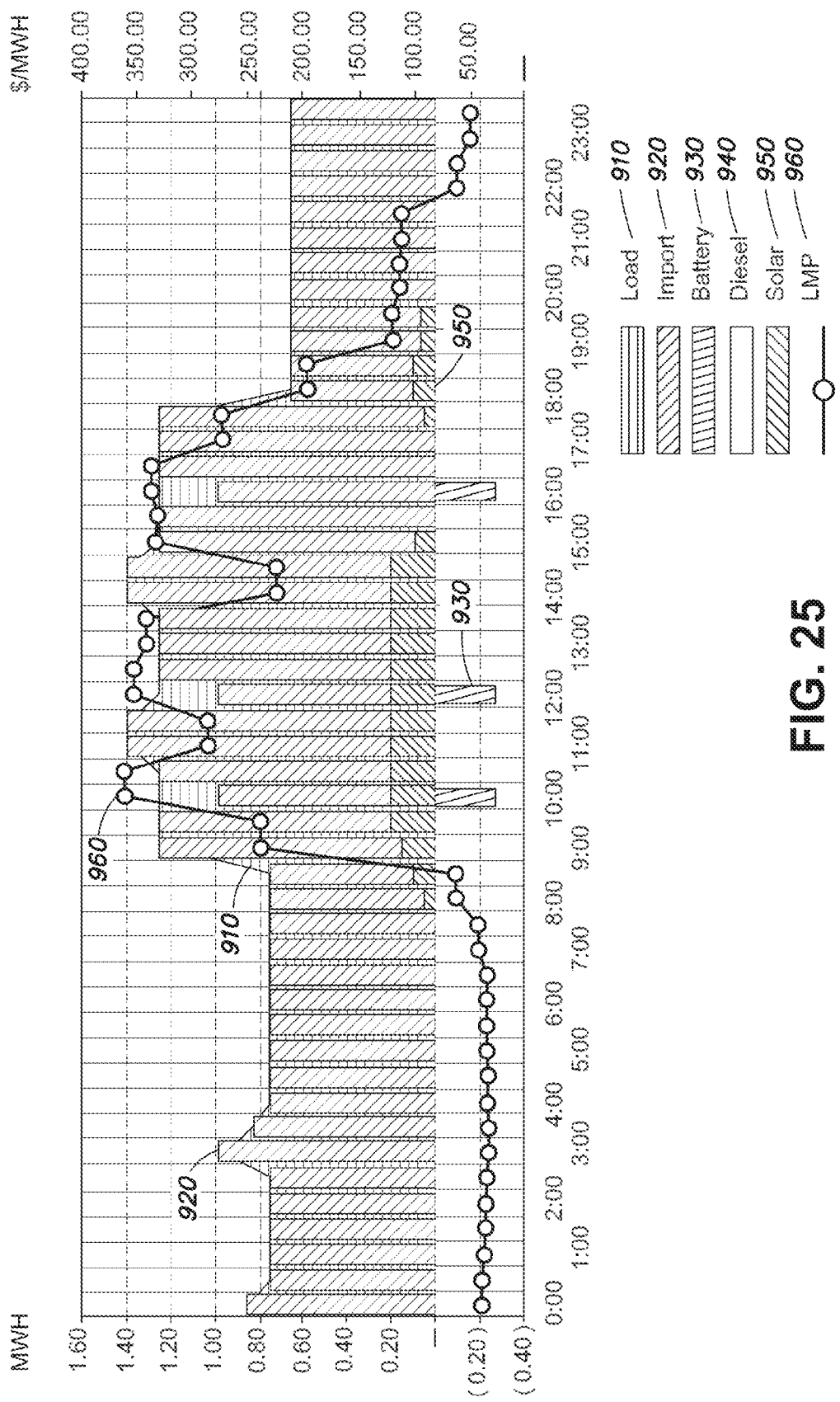
FIG. 25 shows an example energy storage asset co-optimization, according to the principles herein.

FIG. 25 shows an example generation schedule for battery-photovoltaic co-optimization. FIG. 25 shows an example where the same battery used in the example in FIG. 24 is combined with 0.5 MW of PV (solar-photovoltaic) generation. The horizontal axis shows the time in the 24-hour cycle. The left vertical axis shows megawatt hours. The right vertical axis shows price in dollars per megawatt hours. The load 910 is the electric load on the facilities. The import of power 920 shows the power imported into the facilities from the grid. The battery 930 shows the three bars below the horizontal axis for the power discharge from the batteries at specific times. The diesel 940 is not shown because diesel generation is not used in this co-optimization because of its relative price. The solar 950 shows the power used by the system and/or stored in the batteries from the solar generator or photovoltaic generator at various times. The LMP line 960 shows the fluctuating price for electricity during the 24-hour cycle.

Example Energy Storage Assets

Various examples are technology agnostic and can optimize any storage installation. However, certain forms of storage, such as compressed air and ice storage, are currently not recognized as applicable resources for some regulation markets.

Aided by significant private investment, grid-scale batteries have significantly reduced in cost over the past decade. Different technologies appear to have converged around a similar price: with batteries offered at roughly $1-2 per Watt, and $1-2 per Watt-hour, before Balance of Plant ("BoP") costs. (Watts [W, kW, MW] are a measure of power, i.e., the charge and discharge rate of an energy storage asset. Watt-hours [Wh, kWh, MWh] are a measure of energy, i.e., the storage capacity of an energy storage asset.) At these prices, energy storage asset owners and lessees can use examples to achieve a positive return over the installed life while meeting their sites' backup needs.

Below is a brief overview of each different types of energy storage assets:

Lithium-Ion Battery

This "power battery" is well-suited for regulation with high efficiency and hybrid opportunities. However, it has a high cost and little data exists to corroborate lifespan claims Quoted prices include $2 million for a 1 MW/1 MWh unit, and $1.5 million for a 1 MW/250 kWh unit.

Lithium-Ion (Li-Ion) batteries are receiving great attention because they are the preferred battery for electric vehicles. Presently, Li-Ion batteries are among the most expensive of the storage options available. This may change, as many companies are pouring resources into new Li-Ion variants; however, some suggest that the chemical characteristics of Li-Ion cells make it difficult to significantly reduce their cost. Additionally, Li-Ion is a new technology so that no company has empirically demonstrated Li-Ion's lifespan. Companies have tried to allay these concerns through "accelerated testing" that charge/discharge the battery more rapidly, but this does not provide full insight into how well Li-Ion batteries perform over time.

Li-Ion batteries are very dense and therefore very small compared to other technologies. One manufacturer's 1 MW/1 MWh unit, for example, has dimensions of 8'×20'. In comparison, a quoted lead-acid unit with similar specs has dimensions of 40'×70'.

Hybrid opportunities for Li-Ion batteries are discussed in the flow battery section.

Lead-Acid Battery

This battery is the lowest-cost option with long lifespan and proven technology. However, it is physically large with high maintenance and limited depth of discharge.

Quoted prices include $896,000 for a 1 MW/2 MWh unit, and $512,000 for a 1 MW/500 kWh unit.

Lead-Acid batteries, which have the same chemistry as a car battery, are proven for long-lasting grid applications. One manufacturer's 1 MW/1.4 MWh unit lasted for 12 years, from 1996-2008, as both a provider of voltage support and a backup power source, before the battery cells were replaced. The original power electronics of that installation still function, and the unit is running with a new set of lead-acid cells.

A downside of lead-acid batteries is that they are very heavy and very large. This is why they are not being considered as much for EVs, and this poses other logistical challenges for metropolitan installations. Lead-acid batteries are also considered to be high maintenance. They need to be kept within a narrow temperature range, and therefore require their own building (for industrial power uses), as well as periodic upkeep. Also, lead-acid batteries are typically oversized because exceeding the lower bounds of their state of charge can damage the cells. They are best for regulation or voltage support, and as backup if sized explicitly for that purpose.

Flow Batteries

These batteries can be fully charged and discharged without damage to the battery. Also, "hybridization" is possible. However, this "energy battery" limits regulation market opportunities and has low round-trip efficiency.

Quoted prices include $1.15 million for a 1 MW/1 MWh battery.

Flow batteries are energy batteries, i.e., they are best suited for backup electricity, but their chemistry limits their ability to provide high-MW regulation. The typically configured flow battery takes 4 hours to charge/discharge, and flow batteries have lower round-trip efficiencies than other types (roughly 75% in contrast to Li-Ion's 90%). With flow batteries, a tank is filled with electrolyte fluid that flows through solid cell stacks located at the top of the unit. The liquid solution never degrades, but the cells need to be replaced every 5 or 6 years. The cost of cell replacement is 10-15% of the total unit.

The electrochemical characteristics prohibit them from power-dense applications, unless they are oversized and paired with a large inverter, or "hybridized" with another battery technology. Hybridization can be provided by some suppliers in conjunction with a well-established power electronics provider. One manufacturer has created a system that allows its "energy" batteries to be paired with "power" batteries, like lithium-ion, connected through a single inverter. A leading lithium-ion battery manufacturer recently announced a plan to provide a similar Li-Ion/flow battery unit for grid-scale applications.

Dry Cell Technology

This power battery is good for the regulation market. However, it has very small recommended depth of charge/discharge and is expensive.

Quoted prices include $1.5 million for a 1.5 MW/1 MWh battery, plus 30% extra for BoP ("Balance of Plant").

These batteries provide high power-to-energy ratios that make them attractive for regulation, so long as they remain within a fairly narrow range of state of charge. These batteries are not meant to fully charge or discharge and pushing their recommended operating parameters affects their lifespan. Ideal state of charge is 20-80%. Because of these constraints, these batteries would need to be oversized to provide backup. These batteries are more expensive than cheaper options such as lead-acid.

Based on their characteristics, these batteries are likely suited for projects whose primary objective is not backup power, but rather systems support. They provide high-MW regulation, can address voltage sag concerns, and can be recharged by regenerative braking. However, when their state of charge limitations are taken into account, they appear to be a costly technology, even in comparison to lithium-ion.

Ice Units

The thermal storage capacity of an ice unit can be used according to the principles herein as an energy storage asset.

Ice units can be used to modify how a building asset is cooled, including how energy is consumed for cooling/air conditioning. An ice unit generally consists of a thermally-insulated storage tank that attaches to a building asset's air-conditioning system. The unit makes ice (generally at night when supply costs tend to be lower) and uses that ice during the day to deliver cooling directly to the building asset's existing air conditioning system. Storage tanks can be on the order of hundreds of gallons of water (e.g., about 450 gallons) of water. The water is frozen by circulating refrigerant through copper coils within or surrounding the tank. The condensing unit then turns off, and the ice is stored until its cooling energy is needed. During the higher temperature daytime hours, the power consumption of air conditioning and demand levels on the grid, increase. The ice unit may be used to replaces the energy-demanding compressor of a building asset's air conditioning unit. The melting ice of the ice unit, rather than the air conditioning unit, can be piped around the building asset to cool it.

Compressed Air

The storage capacity of compressed air can be used according to the principles herein as an energy storage asset.

For example, compressed air energy storage (CAES) technology provides a way to store compressed air, using energy generated at lower cost at one time, and use that compressed air at another time when energy costs are higher. For example, energy generated during periods of low energy demand periods (such as during off-peak electricity usage as night) may be released at on-peak times to meet higher demand. The CAES system may be located where there is large, accessible air-storage pockets or caverns, such as but not limited to mines and underground formations. The air may be compressed using electrically powered turbo-compressors. The compressed air stored in these pockets may be later fed to, e.g., gas-fired turbine generators to generate electricity during on-peak, higher-priced time periods. In another example, the compressed air is expanded using turbo expanders or air engines that are driving electrical generators to generate electricity.

In another example, the thermal storage capacity of compressed air can be used according to the principles herein as an energy storage asset.

Using a heat exchanger, it is possible to extract waste heat from the lubricant coolers used in types of compressors, and use the waste heat to produce hot water. Depending on its design, a heat exchanger can produce non-potable or potable water. When hot water is not required, the lubricant can be routed to the standard components for lubricant cooling. The hot water can be used in central heating or boiler systems, or any other application where hot water is required. Heat exchangers also offer an opportunity to produce hot air and hot water, and allow the operator some flexibility to vary the hot air to hot water ratio.

Controller for an Energy Storage Asset

The controllers for the energy storage assets described herein can be used to vary the input to or output from the energy storage assets. When the controller functions as a converter, it converts the AC signal to a DC signal. That DC signal may be used to charge the energy storage asset. When the controller functions as an inverter, it converts one type of voltage (direct current (DC)) into another type of voltage (alternating current (AC)). Since the electricity supplier generally supplies 110 or 220 volts AC on the grid, the conversion may typically be from 12 volts DC to 110 or 220 volts AC. In another example, the output of the controller may be different, depending on the type of load on the system. Inverters called utility intertie or grid tie may connect to energy generating assets such as solar panels or wind generator, and can feed their output directly into the inverter. The inverter output can be tied to the grid power.

In a non-limiting example, the inverter takes the DC output from the energy storage asset and runs it into a number of power switching transistors. These transistors are switched on and off to feed opposite sides of a transformer, causing the transformer to think it is getting an AC signal. Depending on the quality and complexity of the inverter, it may put out a square wave, a "quasi-sine" (sometimes called modified sine) wave, or a true sine wave. The quality of the quasi-sine wave can vary among different inverters, and also may vary somewhat with the load.

The virtual partitioning of the energy storage asset described facilitates partitioning between energy and regulation participation. The partitioning can be based on the available capacity of the controller (i.e., the inverter/converter). The SOC of the energy storage asset may be used to provide a constraint within the optimization for determining the optimal charge/discharge strategy for participation in these two different markets. As a non-limiting example, an operating schedule generated according to the principles herein can indicate the optimal charge/discharge strategy for the controller, including on an hourly basis, in response to or anticipation of projected LMPs. The balance of the inverter capacity of the controller may be made available to the regulation market at its shorter timescales (e.g., at the 2-second or minute-by-minute time intervals described above). The proportion of the controller output (and hence the energy storage asset) committed to the energy market and the remaining proportion of the energy storage asset committed to the regulation market are co-optimized based on the economic benefit derived from the two markets, and subject to the SOC constraints. The operating schedules generated based on any of the principles described herein, and in any of the example, can suggest the proportion of the controller output committed to the energy market and to the regulation market in a given time interval t (less than time period T), and for what length of time. the proportion of the controller output committed to the energy market and to the regulation market in a given time interval t (less than time period T). For example, for a controller with a 1 MWatt inverter capacity, the principles herein can be used to generate an operating schedule that suggests the proportion of the controller's 1 MWatt inverter capacity that can be committed to the energy market and to the regulation market in a given time interval t to generate the energy-related revenue.

Energy Generating Assets

Examples of energy generating asset applicable to the apparatus and methods herein include photovoltaic cells, fuel cells, gas turbines, diesel generators, flywheels, electric vehicles and wind turbines.

Electric storage has the potential to address some of the attributes of renewable energy generation. The intermittent nature of energy generating assets, including solar generation, may present some difficulty for grid operators. For example, weather events can make energy output of energy generating assets, including photovoltaic cells or wind turbines, difficult to predict. As renewable generators make up a growing share of regional generation portfolios, grid operators may require greater real-time visibility of distributed generation and benefit from a resource's ability to control bi-directional power flow. Adding storage to distributed generation achieves new levels of responsiveness not seen with existing systems.

According to principles described herein, the operating schedule generated for a system that includes a controller, an energy storage asset and an energy generating asset can firm up intermittent renewable generation into dispatchable generation. The operating schedule can provide for renewable generation forecasting based on the forecasted weather conditions.

Dynamic virtualization can be beneficial to sites that utilize both energy storage assets and energy generating assets. For example, by integrating weather data, price forecasts, and expected site load, examples can accurately predict a solar array's output, determine how much solar generation should be captured by an energy storage asset, and dispatch the energy storage asset at the time of day that optimizes revenues derived from wholesale market participation.

By passing energy through an energy storage asset and exhibiting real-time control, power can be delivered strategically and act as a price-responsive resource in the various wholesale markets. In effect, storage allows the maturation of energy generating assets as a resource that provides discrete power-flow to the grid that is controllable, quantifiable, and dispatchable. Solar power and its generation can be costly. Through dynamic virtualization the value of renewable generation can be increased by improving the resource with electric storage.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments disclosed herein are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the disclosure can be implemented in any of numerous ways. For example, some embodiments may be implemented via one or more controllers, which may employ hardware, software or a combination thereof. In some embodiments discussed herein, one or more controllers may be implemented, at least in part, as a state machine.

When any aspect of an embodiment is implemented at least in part in software, the software code can be executed on any suitable processor or collection of processors, whether provided in a single device or computer or distributed among multiple devices/computers.

In this respect, various aspects of the disclosure, may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in claims, shall have its ordinary meaning as used in the field of patent law.

As used herein in the specification and claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the specification and claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the U.S. Patent Office Manual of Patent Examining Procedures, Section 2111.03.

The invention claimed is:

1. An apparatus for determining a suggested operating schedule over a time period T for at least one data center operated by an energy customer of an electricity supplier, so as to generate energy-related revenue, over a time period T, associated with operation of the at least one data center according to the operating schedule, wherein the energy-related revenue available to the energy customer over the time period T is based at least in part on a wholesale electricity market, the apparatus comprising:
   at least one communication interface;
   at least one memory to store processor-executable instructions and a mathematical model for the at least one data center comprising a plurality of energy assets, wherein the mathematical model specifies at least one function that calculates an energy profile for the at least one data center and the plurality of energy assets based at least in part on an operating schedule for the at least one data center applied to the mathematical model, wherein the operating schedule relates to a CPU utilization or a computing load of at least one energy asset of the plurality of energy assets of the at least one data center; and
   at least one processing unit, communicatively coupled to the at least one communication interface, and the at least one memory, wherein upon execution of the processor-executable instructions, the at least one processing unit:
      A) determines the suggested operating schedule, over the time period T, for the at least one data center based at least in part on the mathematical model and at least one forecast wholesale electricity price associated with the at least one wholesale electricity market, wherein the operating schedule specifies a capacity of at least one energy asset of the plurality of energy assets to be committed, during the time period T, to at least one of an energy market, a regulation market, an ancillary services market, a synchronized reserve market, a capacity market, a demand response market, a day-ahead scheduling reserve market, a real-time dispatched energy market, an emissions market, and a power quality market; and
      B) controls the at least one communication interface to transmit to the energy customer the suggested operating schedule determined in A), and/or controls the at least one memory so as to store the suggested operating schedule.

2. The apparatus of claim 1, wherein the plurality of energy assets comprises at least one controllable energy consuming asset.

3. The apparatus of claim 2, wherein the at least one controllable energy consuming asset is at least one server, and wherein the operating schedule relates to a CPU utilization or a computing load of the at least one server.

4. The apparatus of claim 3, wherein the energy-related revenue available to the energy customer over the time period T is based at least in part on the regulation market, and wherein the suggested operating schedule modulates the CPU utilization or the computing load based on a signal from an operator of the regulation market.

5. The apparatus of claim 2, wherein:
the at least one controllable energy consuming asset includes at least one variable internal temperature controlled by a heating, ventilation and air conditioning (HVAC) system;
the operating schedule also relates to the at least one controllable energy consuming asset; and
the operating schedule specifies a candidate temperature set point for the HVAC system as a function of time.

6. The apparatus of claim 1, wherein the at least one forecast wholesale electricity price includes at least two forecast wholesale electricity prices respectively associated with different geographic regions of the at least one wholesale electricity market.

7. The apparatus of claim 6, wherein:
the at least one data center includes at least two data centers respectively located in the different geographic regions of the at least one wholesale electricity market; and
in A), the suggested operating schedule specifies at least one time period t less than T for shifting of at least a portion of the computing load from one of the at least two data centers to the other, based at least in part on the at least two forecast wholesale electricity prices respectively associated with the different geographic regions.

8. The apparatus of claim 1, wherein upon execution of the processor-executable instructions in A), the at least one processing unit:
A1) generates a first simulated customer baseline (CBL) energy profile for the at least one data center, over the time period T, based on a typical operation of the at least one data center, comprising:
i) controlling the at least one communication interface to provide or receive a business-as-usual (BAU) operating schedule for the at least one data center over the time period T; and
ii) applying the BAU operating schedule to the mathematical model so as to generate the first simulated CBL energy profile; and
A2) determines the suggested operating schedule for the at least one data center based at least in part on the mathematical model, the first simulated CBL energy profile generated in A1), and the forecast wholesale electricity price associated with the wholesale electricity market.

9. The apparatus of claim 8, wherein, upon execution of the processor-executable instructions, the at least one processing unit determines the suggested operating schedule for the at least one data center using an objective function by minimizing a net energy-related cost over the time period T, wherein the objective function includes the mathematical model,
wherein the net-energy related cost is based at least in part on:
the forecast wholesale electricity price associated with the wholesale electricity market;
an electricity consumption by the at least one data center; and
the first simulated CBL energy profile; and
wherein the energy-related revenue available to the energy customer is based at least in part on the minimized net energy-related cost.

10. The apparatus of claim 9, wherein the net energy-related cost is specified as a difference between an electricity supply cost and a demand response revenue over the time period T.

11. An apparatus for determining an operating schedule for at least one data center operated by an energy customer of an electricity supplier, so as to generate energy-related revenue, over a time period T, associated with operation of the at least one data center according to the operating schedule, wherein the energy-related revenue available to the energy customer over the time period T is based at least in part on a wholesale electricity market, the apparatus comprising:
at least one communication interface;
at least one memory to store processor-executable instructions and an objective function for the at least one data center comprising at least one energy consuming asset, wherein the at last one energy consuming asset comprises at least one server, wherein the objective function facilitates a determination of the operating schedule for the at least one data center based at least in part on an operation characteristic of the at least one data center and a forecast wholesale electricity price associated with the wholesale electricity market, and wherein the operating schedule relates to a CPU utilization or a computing load of the at least one data center; and
at least one processing unit, communicatively coupled to the at least one communication interface and the at least one memory, wherein upon execution of the processor-executable instructions, the at least one processing unit:
A) determines the operating schedule, over the time period T, for the at least one data center using the objective function and a customer baseline (CBL) energy profile for at least one energy consuming asset of the energy assets and at least one forecast wholesale electricity price associated with the at least one wholesale electricity market, over the time period T;
wherein the CBL energy profile is computed based on applying a business-as-usual (BAU) operating schedule for the at least one energy consuming asset to a mathematical model of the operation of the at least one energy consuming asset, and
wherein the operating schedule specifies a capacity of at least one energy asset of the plurality of energy assets to be committed, during the time period T, to at least one of an energy market, a regulation market, an ancillary services market, a synchronized reserve market, a capacity market, a demand response market, a day-ahead scheduling reserve market, a real-time dispatched energy market, an emissions market, and a power quality market; and
B) controls the at least one communication interface to transmit to the energy customer the operating schedule for at least one data center determined in A), and/or controls the at least one memory so as to store the determined operating schedule.

12. The apparatus of claim 11, wherein the energy-related revenue available to the energy customer over the time period T is based at least in part on the at least one forecast wholesale electricity price associated with the wholesale electricity market and at least one regulation market price associated with the regulation market, and wherein the suggested operating schedule comprises modulating the CPU utilization or the computing load during a time interval t less than T based on a signal from an operator of the regulation market.

13. The apparatus of claim 11, wherein:

the at least one energy consuming asset includes at least one variable internal temperature controlled by a heating, ventilation and air conditioning (HVAC) system;

the operating schedule also relates to the at least one energy consuming asset;

the operating schedule specifies a candidate temperature set point for the HVAC system as a function of time; and the BAU operating schedule for the at least one controllable energy consuming asset is specified by a business-as-usual (BAU) temperature set point for the HVAC system as a function of time.

14. The apparatus of claim 11, wherein the energy consuming asset comprises a plurality of servers, and wherein the business-as-usual (BAU) operating schedule for the at least one energy consuming asset is based on an aggregate computing load of the at least one server.

15. The apparatus of claim 11, wherein the at least one forecast wholesale electricity price includes at least two forecast wholesale electricity prices respectively associated with different geographic regions of the at least one wholesale electricity market.

16. The apparatus of claim 15, wherein:

the at least one data center includes at least two data centers respectively located in the different geographic regions of the at least one wholesale electricity market; and in A), the suggested operating schedule specifies at least one time period t less than T for shifting of at least a portion of the computing load from one of the at least two data centers to the other, based at least in part on the at least two forecast wholesale electricity prices respectively associated with the different geographic regions.

17. The apparatus of claim 11, wherein, upon execution of the processor-executable instructions, the at least one processing unit determines the operating schedule for the at least one data center using the objective function in A) by minimizing a net energy-related cost over the time period T, wherein the net-energy related cost is based at least in part on:

an electricity consumption by the at least one energy consuming asset; and the CBL energy profile; and wherein the energy-related revenue available to the energy customer is based at least in part on the minimized net energy-related cost.

\* \* \* \* \*